(12) United States Patent
Kawamura et al.

(10) Patent No.: US 12,026,113 B2
(45) Date of Patent: Jul. 2, 2024

(54) PACKET PROCESSING DEVICE AND PACKET PROCESSING METHOD

(71) Applicant: Nippon Telegraph and Telephone Corporation, Tokyo (JP)

(72) Inventors: Tomoaki Kawamura, Tokyo (JP); Shoko Oteru, Tokyo (JP); Yuta Ukon, Tokyo (JP); Shuhei Yoshida, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 183 days.

(21) Appl. No.: 17/436,977

(22) PCT Filed: Apr. 7, 2020

(86) PCT No.: PCT/JP2020/015639
§ 371 (c)(1),
(2) Date: Sep. 7, 2021

(87) PCT Pub. No.: WO2020/217968
PCT Pub. Date: Oct. 29, 2020

(65) Prior Publication Data
US 2022/0171725 A1  Jun. 2, 2022

(30) Foreign Application Priority Data
Apr. 22, 2019 (JP) .................. 2019-080731

(51) Int. Cl.
*G06F 13/28* (2006.01)
*G06F 12/06* (2006.01)
*G06F 13/40* (2006.01)

(52) U.S. Cl.
CPC .............. *G06F 13/28* (2013.01); *G06F 12/06* (2013.01); *G06F 13/4022* (2013.01)

(58) Field of Classification Search
None
See application file for complete search history.

(56) References Cited

U.S. PATENT DOCUMENTS 5,754,436 A * 5/1998 Walsh ................. G06F 9/30083
  700/286
7,062,595 B2 * 6/2006 Lindsay ................. H04L 12/12
  710/105

(Continued)

FOREIGN PATENT DOCUMENTS

| JP | 2006302246 A | 11/2006 |
| JP | 20104262 A | 1/2010 |
| JP | 4468332 B2 | 5/2010 |

*Primary Examiner* — Henry Tsai
*Assistant Examiner* — Christopher A Bartels
(74) *Attorney, Agent, or Firm* — Slater Matsil, LLP

(57) ABSTRACT

A packet processing apparatus includes a packet processor that performs processing on a packet received from a communication line and outputs data that is a result of the processing, a data combiner that concatenates a plurality of pieces of data output from the packet processor to generate a data block, and a combination data transferor that DMA-transfers the data block generated by the data combiner to a data memory. The combination data transferor writes information on an address in the data memory of a beginning of an individual piece of data in the data block to a descriptor that is a data area on a predetermined memory.

18 Claims, 43 Drawing Sheets

(56) References Cited

U.S. PATENT DOCUMENTS

| | | | | |
|---|---|---|---|---|
| 7,213,045 | B2* | 5/2007 | Uzrad-Nali | H04L 69/16 709/200 |
| 7,444,455 | B2* | 10/2008 | Lindsay | G06F 1/30 710/105 |
| 7,627,693 | B2* | 12/2009 | Pandya | H04L 69/323 709/212 |
| 11,321,255 | B2* | 5/2022 | Kawamura | G06F 13/28 |
| 2002/0194415 | A1* | 12/2002 | Lindsay | G06F 1/3203 710/305 |
| 2004/0064815 | A1* | 4/2004 | Uzrad-Nali | H04L 69/163 709/201 |
| 2006/0143344 | A1* | 6/2006 | Lindsay | H04L 41/06 710/105 |
| 2006/0168612 | A1* | 7/2006 | Chapman | H04N 7/17309 725/100 |
| 2006/0215691 | A1 | 9/2006 | Kobayashi et al. | |
| 2019/0265976 | A1* | 8/2019 | Goryavskiy | G06F 9/3016 |
| 2019/0306281 | A1* | 10/2019 | Masputra | G06F 13/1668 |
| 2021/0034559 | A1* | 2/2021 | Kawamura | H04L 49/9047 |
| 2021/0141751 | A1* | 5/2021 | Kawamura | H04L 65/00 |
| 2022/0182340 | A1* | 6/2022 | Kawamura | H04L 49/9057 |

* cited by examiner

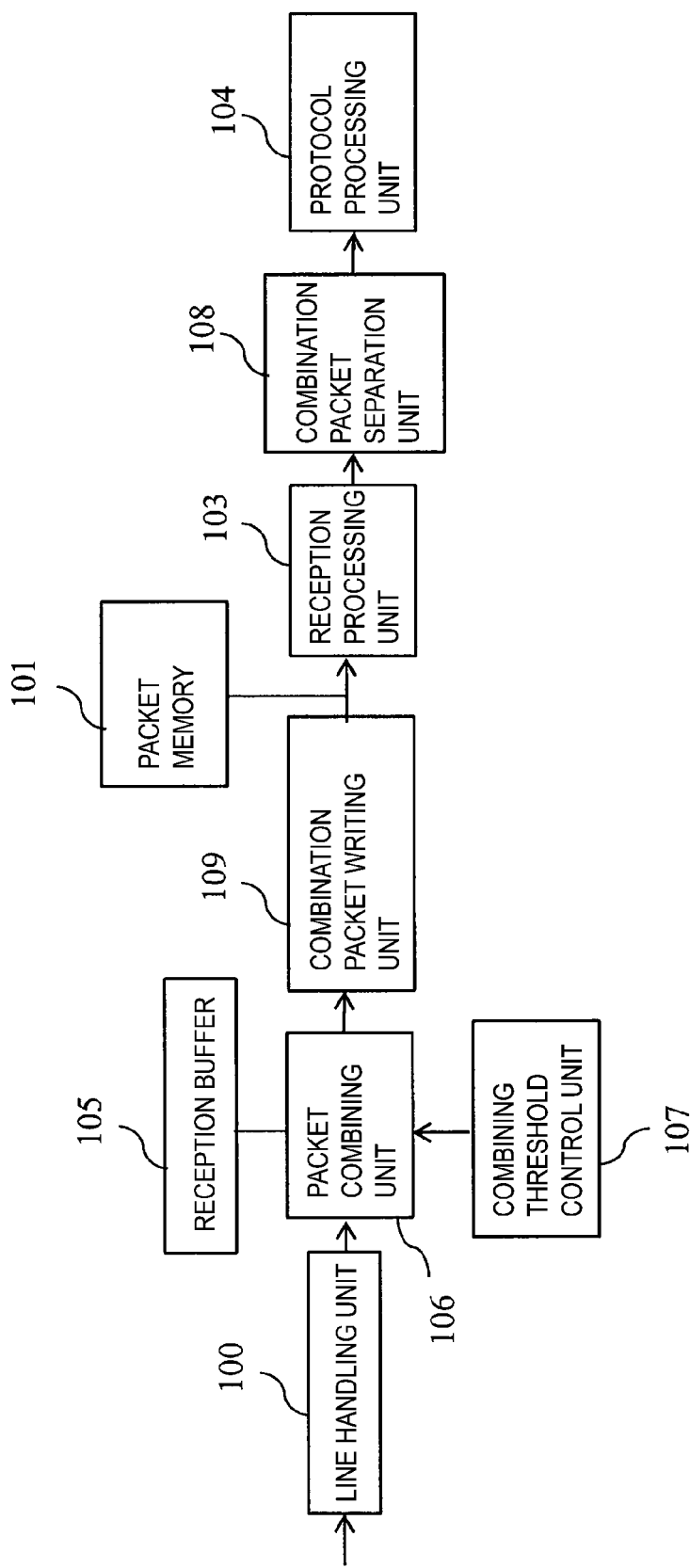

PACKET PROCESSING DEVICE AND PACKET PROCESSING METHOD

CROSS-REFERENCE TO RELATED APPLICATIONS

This application is a national phase entry of PCT Application No. PCT/JP2020/015639, filed on Apr. 7, 2020, which claims priority to Japanese Application No. 2019-080731, filed on Apr. 22, 2019, which applications are hereby incorporated herein by reference.

TECHNICAL FIELD

The present invention relates to a packet processing apparatus and a packet processing method, and more particularly to a packet processing apparatus and a packet processing method for performing packet data transfer processing in a communication system.

BACKGROUND

FIG. 35 is a block diagram illustrating a configuration of a packet processing apparatus of the related scheme. The packet processing apparatus includes a line handling unit 100 that receives packets from a communication line, a packet memory 101 that stores packets received from the communication line, a packet transfer unit 102 that transfers packets received from the communication line to the packet memory 101, a reception processing unit 103 that reads packets from the packet memory 101, and a protocol processing unit 104 that performs protocol processing on packets.

In this packet processing apparatus, the packet transfer unit 102 performs data transfer using direct memory access (DMA) to store a packet in the packet memory 101 when triggered by arrival of the packet at the line handling unit 100 connected to the communication line (not illustrated). At the same time, the packet transfer unit 102 generates a hardware interrupt to notify a processor (not illustrated) of the packet processing apparatus that the packet has been received and issues a request to activate the reception processing unit 103.

The packet transfer unit 102 includes a descriptor 1020 which is a data structure constructed by software executed by the processor of the packet processing apparatus and a DMA controller 1021 which is hardware. FIG. 36 is a diagram illustrating an outline of the descriptor 1020.

An example of FIG. 36 illustrates the case where N packets are stored in the packet memory 101. In this case, the processor of the packet processing apparatus sets addresses and flags corresponding to the N packets in the descriptor 1020. The processor presets in the descriptor 1020 start addresses A #1 to A #N at which to write received packets to the packet memory 101. Usually, the number of addresses that can be set at the same time is predetermined and the order in which the addresses are used is also predetermined.

The processor sets/resets flags AF #1 to AF #N, which indicate whether or not the set addresses A #1 to A #N are valid, in the descriptor 1020. When the processor has set the flags AF #1 to AF #N to valid after setting the addresses A #1 to A #N, packets are allowed to be written to the packet memory 101.

Reception completion flags WF #1 to WF #N indicating whether or not writing of packets to the set addresses A #1 to A #N has been completed and received data sizes L #1 to L #N indicating the packet lengths of packets written to the set addresses A #1 to A #N are also set in the descriptor 1020.

FIG. 37 is a flowchart illustrating an operation of the DMA controller 1021. First, the DMA controller 1021 initializes a variable n indicating the order of reading and writing from and to the descriptor 1020 to 1 (step S100 in FIG. 37) and reads an nth (=1st) flag AF #1 from the descriptor 1020 (step S101 in FIG. 37).

When the flag AF #1 indicates that the start address is valid (yes in step S102 in FIG. 37), the DMA controller 1021 reads an nth (=1st) start address A #1 from the descriptor 1020 (step S103 in FIG. 37) and writes a corresponding nth (=1st) packet to an area starting from the start address A #1 in the packet memory 101 (step S104 in FIG. 37).

After completing writing of the packet, the DMA controller 1021 writes a received data size L #1 indicating the packet length of the nth (=1st) packet and the reception completion flag WF #1 indicating that writing of the packet has been completed to the descriptor 1020 (step S105 in FIG. 37).

Further, the DMA controller 1021 generates a hardware interrupt to notify the processor (not illustrated) of the packet processing apparatus that writing of the packet has been completed and issues a request to activate the reception processing unit 103.

Then, the DMA controller 1021 determines whether or not the variable n is equal to N (step S106 in FIG. 37). When the variable n has not reached N (no in step S106), the DMA controller 1021 increments the variable n by 1 (step S107 in FIG. 37) and returns to step S101. When the variable n has reached N (yes in step S106), the DMA controller 1021 returns to step S100. In this way, N packets are sequentially transferred to the packet memory 101.

Next, the activated reception processing unit 103 passes the received packet transferred to the packet memory 101 to the protocol processing unit 104. At the same time, the reception processing unit 103 secures a new area for the packet memory 101 in the memory of the packet processing apparatus in order to replenish the portion of the packet memory passed to the protocol processing unit 104.

The protocol processing unit 104 to which the received packet has been passed releases the area of the packet memory 101 when necessary protocol processing has been completed.

In the general reception processing as described above, it is known especially that when small packets arrive frequently, the number of hardware interrupts increases, such that load on the processor of the packet processing apparatus increases and the reception performance is lowered. It is also known that the reception performance is lowered due to an overhead associated with DMA transfer control because the number of times a DMA transfer is activated increases.

In order to deal with such a problem, a technique has been proposed in which a plurality of small packets are grouped into one large combination packet until a threshold set in the line handling unit is reached and the combination packet is DMA-transferred collectively to a packet memory when triggered by the size of the combination packet reaching the threshold (see Patent Literature 1).

Use of such a DMA transfer method (hereinafter referred to as collective DMA transfer) in which a plurality of small packets are transferred collectively as one combination packet can reduce the number of hardware interrupts even when small packets arrive at the packet processing apparatus and reduce the overhead of DMA transfer, enabling high-speed reception processing.

FIG. 38 is a block diagram illustrating a configuration of a packet processing apparatus of the related scheme disclosed in Patent Literature 1. This packet processing apparatus includes a line handling unit 100, a packet memory 101, a combination packet transfer unit 102a, a reception processing unit 103, a protocol processing unit 104, a reception buffer 105, a packet combining unit 106, and a combining threshold control unit 107.

In the packet processing apparatus illustrated in FIG. 38, the packet combining unit 106 transfers a packet received by the line handling unit 100 to the reception buffer 105 for packet combining. At this time, the packet combining unit 106 stores the packet received by the line handling unit 100 in the reception buffer 105 such that the received packet and packets already stored in the reception buffer 105 are combined into one combination packet. Then, when the size of the combination packet in the reception buffer 105 has exceeded a threshold preset in the combining threshold control unit 107, the packet combining unit 106 issues a request to transfer the combination packet to the packet memory 101.

Similar to the case of FIG. 35, the combination packet transfer unit 102a includes a descriptor 1020a and a DMA controller 1021a. FIG. 39 is a diagram illustrating an outline of the descriptor 1020a. An example of FIG. 39 illustrates the case where N combination packets are stored in the packet memory 101. In this case, the processor of the packet processing apparatus sets addresses and flags corresponding to the N combination packets in the descriptor 1020a.

The processor presets in the descriptor 1020a start addresses AD #1 to AD #N at which to write combination packets to the packet memory 101. Usually, the number of addresses that can be set at the same time is predetermined and the order in which the addresses are used is also predetermined.

The processor sets/resets flags ADF #1 to ADF #N, which indicate whether or not the set addresses AD #1 to AD #N are valid, in the descriptor 1020a. When the processor has set the flags ADF #1 to ADF #N to valid after setting the addresses AD #1 to AD #N, combination packets are allowed to be written to the packet memory 101.

Reception completion flags WDF #1 to WDF #N indicating whether or not writing of combination packets to the set addresses AD #1 to AD #N has been completed and received data sizes LD #1 to LD #N indicating the lengths (the sums of packet lengths of packets combined) of combination packets written to the set addresses A #1 to A #N are also set in the descriptor 1020a.

FIG. 40 is a flowchart illustrating an operation of the DMA controller 1021a. First, the DMA controller 1021a initializes a variable n indicating the order of reading and writing from and to the descriptor 1020a to 1 (step S200 in FIG. 40) and reads an nth (=1st) flag ADF #1 from the descriptor 1020a (step S201 in FIG. 40).

When the flag ADF #1 indicates that the start address is valid (yes in step S202 in FIG. 40), the DMA controller 1021a reads an nth (=1st) start address AD #1 from the descriptor 1020a (step S203 in FIG. 40) and writes a corresponding nth (=1st) combination packet to an area starting from the start address AD #1 in the packet memory 101 (step S204 in FIG. 40).

After completing writing of the combination packet, the DMA controller 1021a writes a received data size LD #1 indicating the length of the nth (=1st) combination packet and the reception completion flag WDF #1 indicating that writing of the combination packet has been completed to the descriptor 1020a (step S205 in FIG. 40).

Further, the DMA controller 1021a generates a hardware interrupt to notify the processor (not illustrated) of the packet processing apparatus that writing of the combination packet has been completed and issues a request to activate the reception processing unit 103.

Then, the DMA controller 1021a determines whether or not the variable n is equal to N (step S206 in FIG. 40). When the variable n has not reached N (no in step S206), the DMA controller 1021a increments the variable n by 1 (step S207 in FIG. 40) and returns to step S201. When the variable n has reached N (yes in step S206), the DMA controller 1021a returns to step S200. In this way, N combination packets are sequentially transferred to the packet memory 101.

The reception processing unit 103 activated in response to an activation request from the combination packet transfer unit 102a (the DMA controller 1021a) passes the combination packet transferred to the packet memory 101 to the protocol processing unit 104.

According to the configuration illustrated in FIG. 38, because a request to activate reception processing is issued every time a combination packet into which a plurality of packets have been combined is transferred, the number of times the reception processing unit 103 is activated is reduced and the load on the processor of the packet processing apparatus is reduced. Further, because the number of times DMA transfer control is performed is also reduced, the overhead ratio is lowered and high reception performance can be exhibited.

However, in the configuration illustrated in FIG. 38, it is necessary for the protocol processing unit 104 to restore a plurality of original packets from a combination packet. When this restoration processing is realized by hardware of the protocol processing unit 104, it is necessary to provide means for the packet combining unit 106 to notify the protocol processing unit 104 of information required for the restoration processing (the number of packets combined and the size of each packet), which causes a problem of increasing the scale of hardware of the packet combining unit 106 or the like. It is also necessary to hold information required for the restoration processing in the packet memory 101 or the like.

The restoration processing can also be realized by software of the reception processing unit 103 or the like. However, similar to the above, it is necessary to provide means for the packet combining unit 106 to notify the reception processing unit 103 of information required for the restoration processing (the number of packets combined and the size of each packet), which causes a problem of increasing the scale of hardware of the packet combining unit 106 or the like. Further, because the restoration processing is performed by software, there is more software-based processing and the load on the processor increases, and as a result, there is a problem that the improvement of reception performance by the collective DMA transfer is limited.

FIG. 41 is a block diagram illustrating another configuration of a packet processing apparatus. In this packet processing apparatus, a combination packet separation unit 108 that restores a plurality of original packets from a combination packet is inserted between the reception processing unit 103 and the protocol processing unit 104 of the packet processing apparatus of FIG. 38.

Similar to when the packet restoration processing is realized by hardware of the protocol processing unit 104, when the combination packet separation unit 108 is realized by hardware, it is necessary to provide means for the packet combining unit 106 to notify the combination packet separation unit 108 of information required for the restoration processing (the number of packets combined and the size of each packet), which causes a problem of increasing the scale of hardware of the packet combining unit 106 or the like.

The restoration processing can also be realized by software of the combination packet separation unit 108 or the like. However, similar to the above, it is necessary to provide means for the packet combining unit 106 to notify the combination packet separation unit 108 of information required for the restoration processing (the number of packets combined and the size of each packet), which causes a problem of increasing the scale of hardware of the packet combining unit 106 or the like. Further, because the restoration processing is performed by software, there is more software-based processing and the load on the processor increases, and as a result, there is a problem that the improvement of reception performance by the collective DMA transfer is limited.

FIG. 42 is a block diagram illustrating another configuration of a packet processing apparatus. This packet processing apparatus is obtained by providing a packet processing unit 114 that performs processing on a packet received from the communication line and outputs data which is a result of the processing in the packet processing apparatus of FIG. 41 and replacing the packet memory 101, the combination packet transfer unit 102*a*, the reception processing unit 103, the protocol processing unit 104, the reception buffer 105, the packet combining unit 106, and the combination packet separation unit 108 respectively with a data memory 115 for data extracted from packets, a combination data transfer unit 102*b*, a reception processing unit 117, a data processing unit 116, a reception buffer 118, a data combining unit 120, and a combination data separation unit 108*b*.

The data combining unit 120 transfers data output by the packet processing unit 114 to the reception buffer 118 for data combining. At this time, the data combining unit 120 stores a piece of data output by the packet processing unit 114 in the reception buffer 118 such that the piece of data and pieces of data already stored in the reception buffer 118 are concatenated into one data block.

The combination data transfer unit 102*b* DMA-transfers the data block generated by the data combining unit 120 to the data memory 115.

The reception processing unit 117 passes the data block transferred to the data memory 115 to the combination data separation unit 108*b*. The combination data separation unit 108*b* restores a plurality of original pieces of data from the data block. The data processing unit 116 performs necessary processing on the data restored by the combination data separation unit 108*b*.

In the configuration illustrated in FIG. 42, it is necessary for the combination data separation unit 108*b* to restore a plurality of original pieces of data from combined data. When this restoration processing is realized by hardware of the combination data separation unit 108*b*, it is necessary to provide means for the data combining unit 120 to notify the combination data separation unit 108*b* of information required for the restoration processing (the number of pieces of data combined and the size of each piece of data), which causes a problem of increasing the scale of hardware of the data combining unit 120 or the like. It is also necessary to hold information corresponding to a plurality of data blocks (transfer units) (such as the size of each piece of data) in the data memory 115 or the like.

The combination data separation unit 108*b* can also be realized by software, but this causes a problem that there is more software-based processing as compared to when data combining is not performed.

FIG. 43 is a block diagram illustrating another configuration of a packet processing apparatus. This packet processing apparatus is obtained by replacing the combination packet transfer unit 102*a* in the packet processing apparatuses of FIGS. 38 and 41 with a combination packet writing unit 109 implemented by software. The packet processing apparatus which does not use DMA transfer may improve the effective throughput of writing to the packet memory 101 by collectively writing a plurality of packets to the packet memory 101 (hereinafter referred to as collectively writing) by software in some cases (such as when the packet memory 101 is made of a DRAM). The packet processing apparatus that performs collective writing in this way also has problems similar to the above when restoring a plurality of original packets from a combination packet.

Further, when the entire processing of FIG. 43 (excluding hardware processing in the packet memory 101 and the line handling unit 100) is performed by software, it is necessary to store information required for the restoration processing (the number of packets combined and the size of each packet) in the packet memory 101 or the like and there is a problem that it is necessary to increase the capacity (the number of writable bits) of the packet memory 101 or the like as compared to when collective writing is not performed.

CITATION LIST

Patent Literature

Patent Literature 1: JP 4468332 B.

SUMMARY

Technical Problem

Embodiments of the present invention have been made to solve the problems in the related scheme and it is an object of embodiments of the present invention to provide a technology that can reduce the scale of hardware required for the processing of restoring a plurality of original pieces of data from a data block into which the plurality of pieces of data have been combined in a packet processing apparatus which uses collective DMA transfer by hardware or collective writing by software and can also achieve high reception performance due to the effects of collective DMA transfer or collective writing.

Means for Solving the Problem

A packet processing apparatus of embodiments of the present invention includes a packet processing unit configured to perform processing on a packet received from a communication line and output data that is a result of the processing, a data combining unit configured to concatenate a plurality of pieces of data output from the packet processing unit to generate a data block, a data memory configured to store data output from the packet processing unit, and a combination data transfer unit configured to DMA-transfer the data block generated by the data combining unit to the data memory or write the data block to the data memory through a processor, wherein the combination data transfer unit is configured to write information on an address in the data memory of a beginning of an individual piece of data in the data block to a descriptor that is a data area on a predetermined memory.

A packet processing apparatus of embodiments of the present invention includes a packet processing unit configured to perform processing on a packet received from a communication line and output data that is a result of the processing, a data combining unit configured to concatenate a plurality of pieces of data output from the packet processing unit to generate a data block, a data memory configured to store data output from the packet processing unit, and a combination data transfer unit configured to DMA-transfer the data block generated by the data combining unit to the data memory or write the data block to the data memory through a processor, wherein the combination data transfer unit is configured to determine an address in the data memory of a beginning of an individual piece of data in the data block, write information on the address to a descriptor that is a data area on a predetermined memory, and DMA-transfer the data block to the data memory or write the data block to the data memory through a processor.

In a first exemplary configuration of the packet processing apparatus of embodiments of the present invention, the combination data transfer unit is configured to write information on a received data size indicating a data length of the individual piece of data in the data block to the descriptor.

The first exemplary configuration of the packet processing apparatus of embodiments of the present invention further includes a processing unit configured to read data stored in the data memory, wherein the processing unit is configured to read data from the data memory based on information written to the descriptor and perform processing on the read data.

A packet processing method of embodiments of the present invention includes a first step of performing processing on a packet received from a communication line and outputting data that is a result of the processing, a second step of concatenating a plurality of pieces of data obtained in the first step to generate a data block, a third step of DMA-transferring the data block to a data memory, from which data reading is performed by a processing unit that performs processing on data obtained in the first step, or writing the data block to the data memory through a processor, and a fourth step of writing information on an address in the data memory of a beginning of an individual piece of data in the data block to a descriptor that is a data area on a predetermined memory.

A packet processing method of embodiments of the present invention includes a first step of performing processing on a packet received from a communication line and outputting data that is a result of the processing, a second step of concatenating a plurality of pieces of data obtained in the first step to generate a data block, a third step of determining an address of a beginning of an individual piece of data in the data block in a data memory from which data reading is performed by a processing unit that performs processing on data obtained in the first step, a fourth step of writing information on the address to a descriptor that is a data area on a predetermined memory, and a fifth step of DMA-transferring the data block to the data memory or writing the data block to the data memory through a processor.

Effects of Embodiments of the Invention

According to embodiments of the present invention, the combination data transfer unit DMA-transfers the data block generated by the data combining unit to the data memory or writes the data block to the data memory through a processor and writes information on an address in the data memory of a beginning of each piece of data in the data block to a descriptor that is a data area on a predetermined memory. Compared to the configurations of the related scheme, the packet processing apparatus provided with the combination data transfer unit of embodiments of the present invention can reduce the scale of hardware required for the processing of restoring a plurality of original pieces of data from a data block into which the plurality of pieces of data have been combined and can also achieve high reception performance due to the effects of collective DMA transfer or collective writing.

Further, in embodiments of the present invention, the combination data transfer unit determines an address in the data memory of the beginning of each piece of data in the data block and writes information on the address to the descriptor, such that it is possible to reduce the size of a buffer area for data blocks that needs to be secured in the data memory as compared to the configurations of the related scheme.

When the processing of restoring a plurality of original pieces of data from a data block which the plurality of pieces of data have been combined is implemented by hardware in the configuration of embodiments of the present invention, there is an advantage that the reception performance is improved (the number of pieces of data that can be processed per unit time increases) because the processing of the processor required to process one piece of data becomes lighter as compared to when the processing of restoring a plurality of original pieces of data from a data block into which the plurality of pieces of data have been combined is implemented by software in the configuration of the related scheme of FIG. 42. Also, there is an advantage that power consumption of the processor required to process one piece of data is reduced.

BRIEF DESCRIPTION OF THE DRAWINGS

FIG. 43 is a block diagram illustrating another configuration of a packet processing apparatus of the related scheme.

DETAILED DESCRIPTION OF ILLUSTRATIVE EMBODIMENTS

First Reference Example

Figure 1:
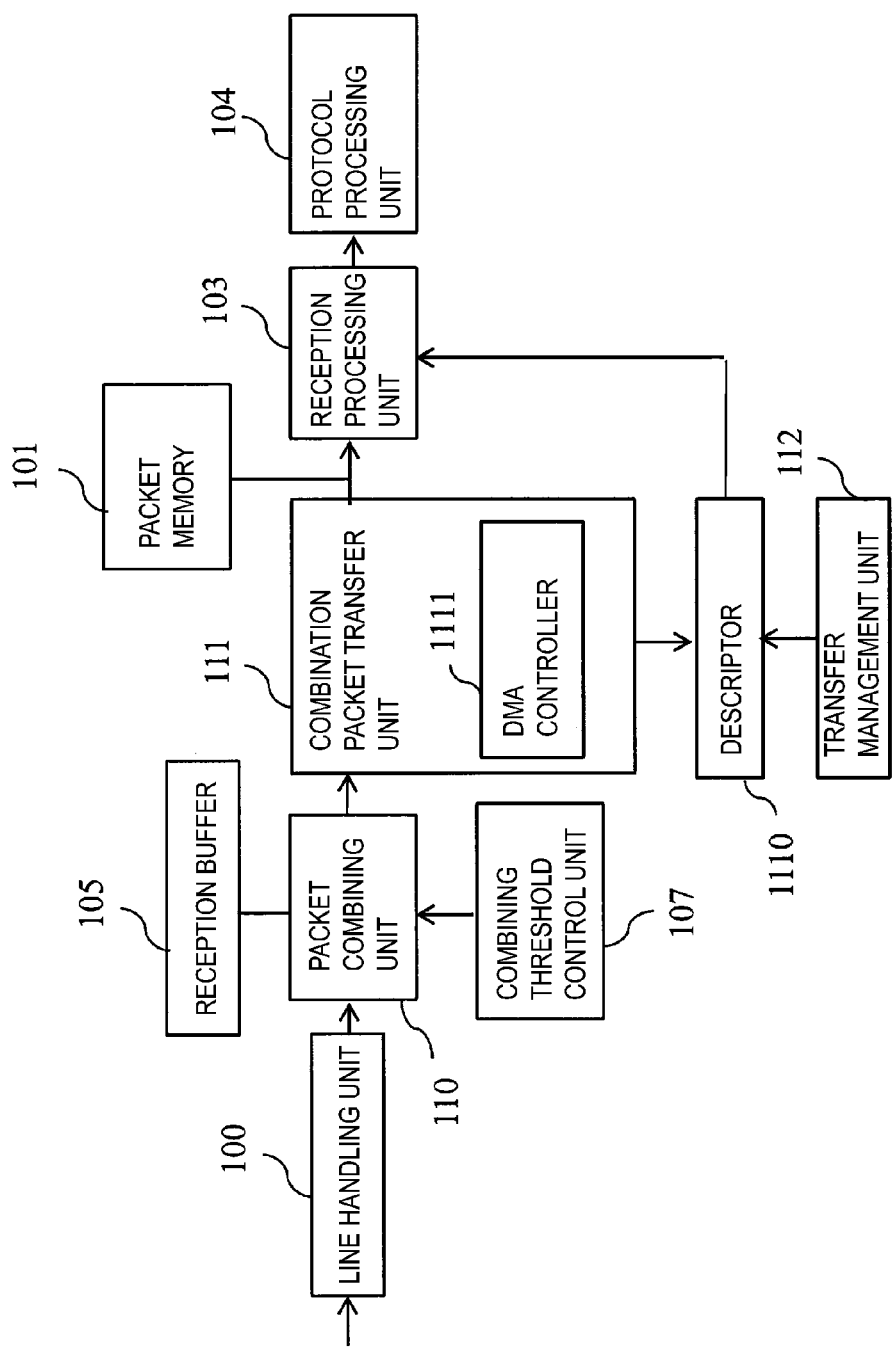
FIG. 1 is a block diagram illustrating a configuration of a packet processing apparatus according to a first reference example of the present invention.

Hereinafter, reference examples on which embodiments of the present invention are based will be described. In all drawings for explaining the reference examples and embodiments, those having the same function are denoted by the same reference signs and repeated description thereof will be omitted. FIG. 1 is a block diagram illustrating a configuration of a packet processing apparatus according to a first reference example of the present invention.

Figure 38:
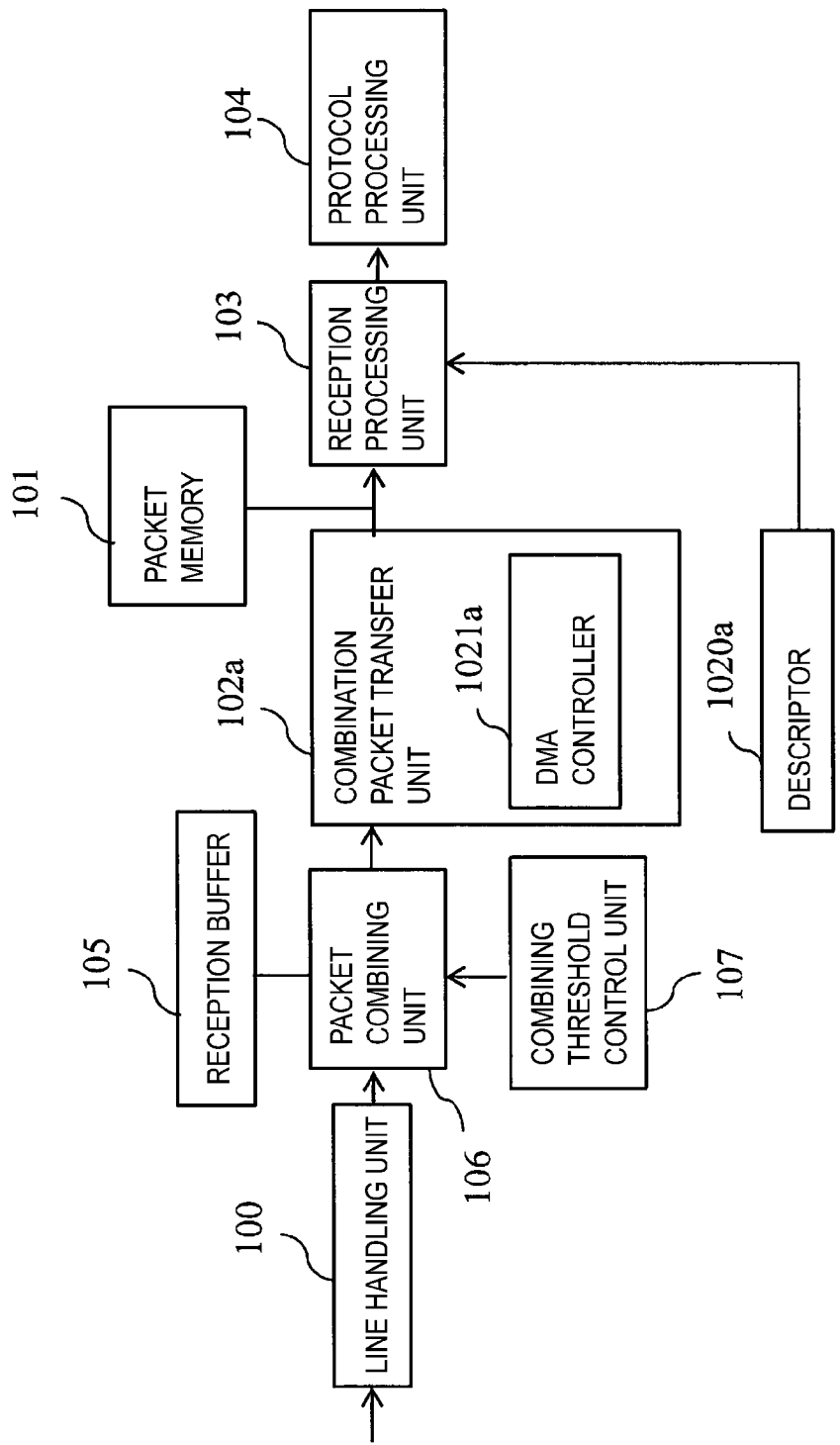
FIG. 38 is a block diagram illustrating another configuration of a packet processing apparatus of the related scheme.
Figure 39:
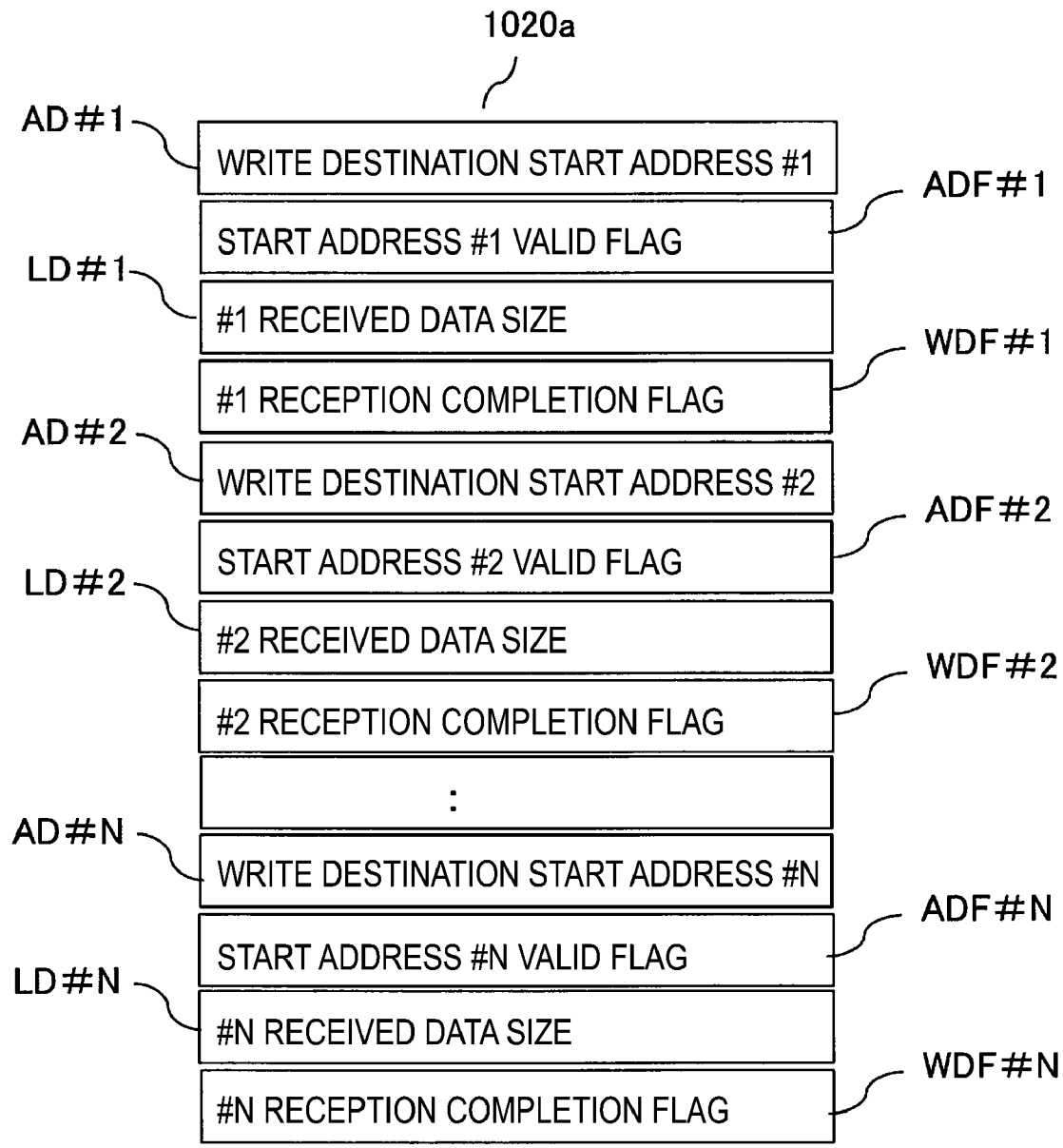
FIG. 39 is a diagram illustrating an outline of a descriptor for the packet processing apparatus of FIG. 38.
Figure 40:
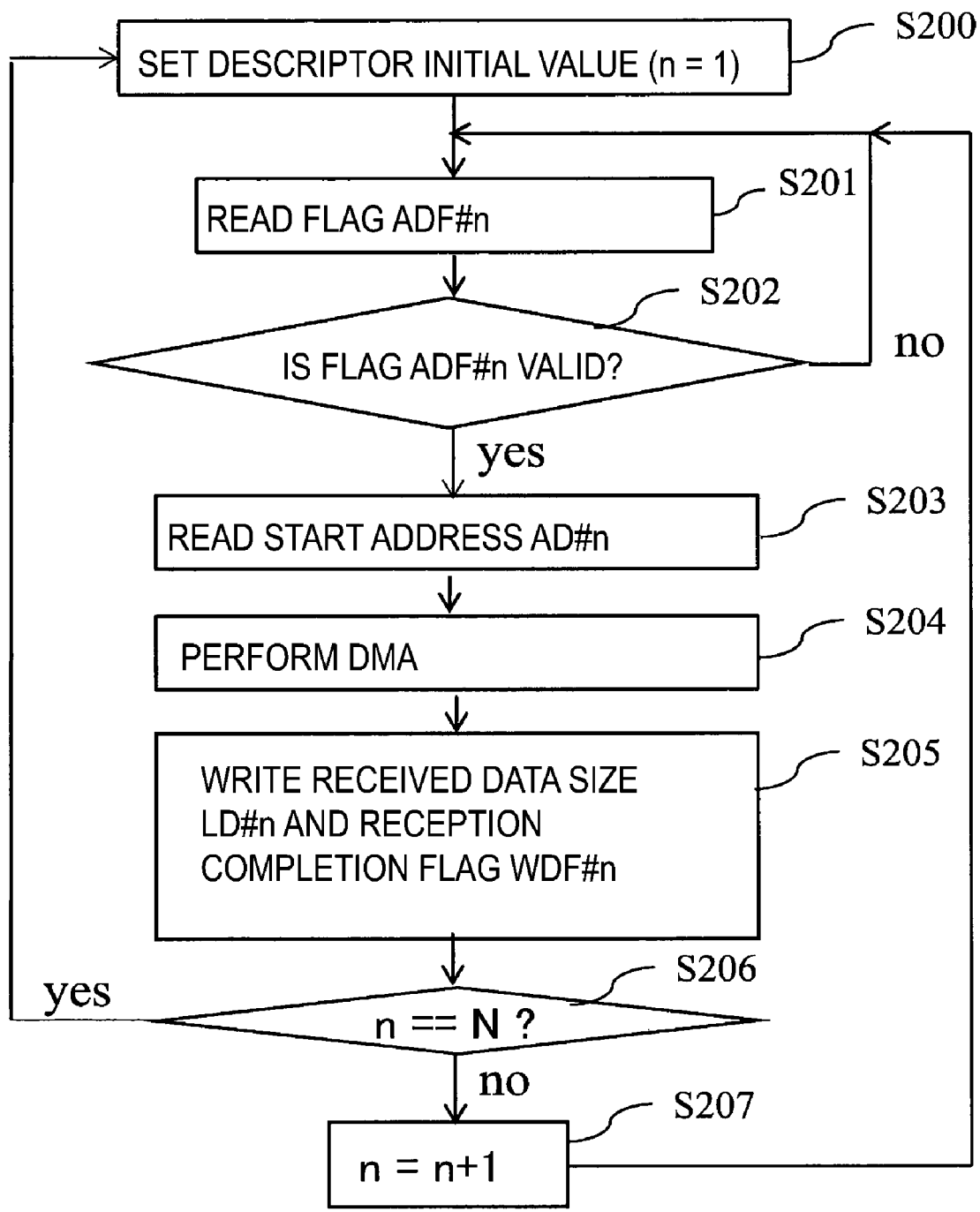
FIG. 40 is a flowchart illustrating an operation of a DMA controller in the packet processing apparatus of FIG. 38.

Similar to the configuration of FIG. 38, the packet processing apparatus of FIG. 1 is connected to a communication line (not illustrated) and includes a line handling unit 100, a packet memory 101, a reception processing unit 103, a protocol processing unit 104, a reception buffer 105, a combining threshold control unit 107, a packet combining unit 110, a combination packet transfer unit 111, and a transfer management unit 112. The line handling unit 100 receives data from the communication line. Packets received from the communication line are stored in the packet memory 101. The reception processing unit 103 passes packets stored in the packet memory 101 to the protocol processing unit 104. The protocol processing unit 104 performs protocol processing of packets. The reception buffer 105 is a reception buffer for packet combining. A threshold for regulating the size of each combination packet is preset in the combining threshold control unit 107. The packet combining unit 110 concatenates a plurality of packets received from the communication line in the reception buffer 105 to generate one combination packet. The combination packet transfer unit 111 DMA-transfers the combination packet generated by the packet combining unit 110 to the packet memory 101. The transfer management unit 112 performs initial setting of a descriptor 1110 which is a predetermined data area in a memory. The transfer management unit 112 may be configured as a part of the reception processing unit 103.

Of these components, the line handling unit 100, the reception buffer 105 for packet combining, and the combining threshold control unit 107 are equivalent to those in the configuration of FIG. 38.

The packet combining unit 110 transfers a packet received by the line handling unit 100 to the reception buffer 105 for packet combining. At this time, the packet combining unit 110 stores a packet received by the line handling unit 100 in the reception buffer 105 such that the received packet and packets already stored in the reception buffer 105 are concatenated into one combination packet. Then, when the size of the combination packet in the reception buffer 105 has exceeded the threshold set in the combining threshold control unit 107, the packet combining unit 110 issues a request to transfer the combination packet to the packet memory 101.

Here, the packet combining unit 110 may also issue a transfer request when a timeout has occurred (such as when the reception interval between packets has exceeded a predetermined period) before the size of the combination packet in the reception buffer 105 has exceeded the threshold.

The packet combining unit 110 records the number of packets combined in the reception buffer 105 and the size of each packet and notifies the combination packet transfer unit 111 of the number of packets combined and the size of each packet when issuing a request to transfer the combination packet.

The combination packet transfer unit 111 includes a DMA controller 1111. The combination packet transfer unit 111 transfers the combination packet to the packet memory 101 through one DMA transfer, generates a hardware interrupt, and issues a request to activate the reception processing unit 103.

Here, the combination packet transfer unit 111 may not generate a hardware interrupt to the processor (not illustrated) of the packet processing apparatus.

The combination packet transfer unit 111 writes the size of each packet and the like to the descriptor 1110 which has been prepared for each packet by the transfer management unit 112 (software executed by the processor) using information on the number of packets combined and the size of each packet of which the packet combining unit 110 has notified. Details of the configuration of the descriptor 1110 and the operation of the combination packet transfer unit 111 will be described later.

Upon detecting an activation request, the reception processing unit 103 reads a packet from the packet memory 101 based on address information and size information written to the descriptor 1110 prepared for each packet and passes the packet to the protocol processing unit 104. The operation of the reception processing unit 103 is equivalent to that of the configuration of FIG. 35.

The protocol processing unit 104 performs necessary protocol processing on the packet received from the reception processing unit 103. Then, when the necessary protocol processing has been completed, the protocol processing unit 104 releases an area of the packet memory 101 in which the packet passed from the reception processing unit 103 is stored. The operation of the protocol processing unit 104 is equivalent to that of the configuration of FIG. 35.

When the necessary protocol processing has been completed and the area of the packet memory 101 in which the packet passed from the reception processing unit 103 is stored has been released, it is determined that processing in S503 of FIG. 6 which will be described later has been completed.

The reception processing unit 103, the protocol processing unit 104, and the transfer management unit 112 can be realized by software that runs on a general-purpose personal computer or a workstation or can be realized by hardware such as a field programmable gate array (FPGA) that runs in cooperation with a program.

The packet memory 101 can be configured as a memory on a personal computer, a communication device, or a communication board.

The line handling unit 100, the combining threshold control unit 107, and the packet combining unit no can be made of an FPGA or the like on a communication device or a communication board.

The reception buffer 105 can be made of a storage area included in an FPGA or the like on a communication device or a communication board or a storage circuit such as a first-in first-out (FIFO).

Figure 2:
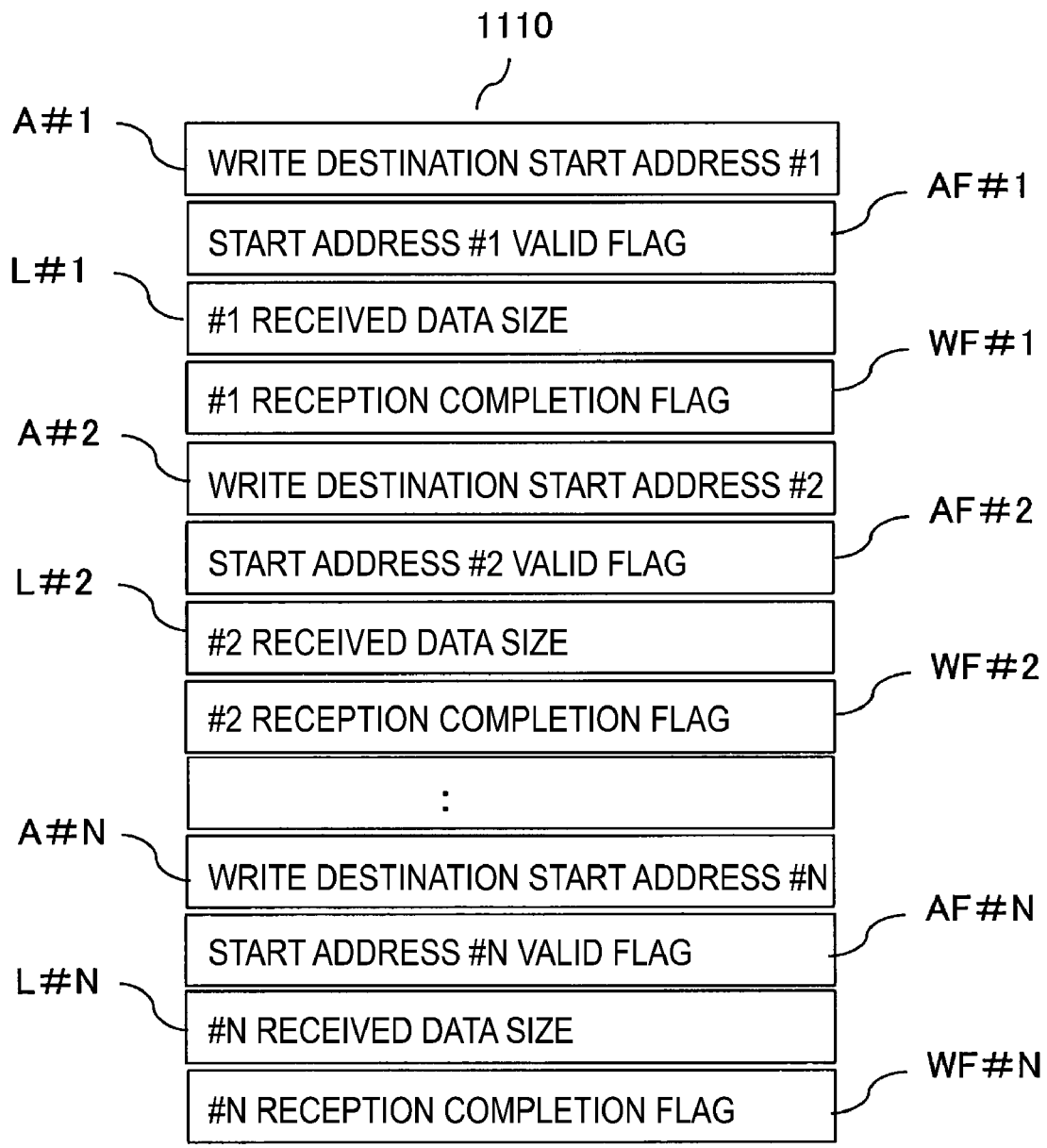
FIG. 2 is a diagram illustrating an outline of a descriptor for the packet processing apparatus according to the first reference example of the present invention.

FIG. 2 illustrates an exemplary configuration of the descriptor 1110 used by the combination packet transfer unit in of the present embodiment. Generally, a data structure that records the addresses and the like of the packet memory 101 for reception processing is called a descriptor 1110. The example of FIG. 2 illustrates the case when N packets are stored in the packet memory 101.

The descriptor 1110 of FIG. 2 is a data structure in which a plurality (N sets) of start addresses A #1 to A #N of the write destinations of received packets, valid flags AF #1 to AF #N indicating whether or not the start addresses A #1 to A #N are valid, received data sizes L #1 to L #N indicating the packet lengths of packets written to the start addresses A #1 to A #N, and reception completion flags WF #1 to WF #N indicating whether or not the writing of packets to the start addresses A #1 to A #N has been completed can be written. The configuration of the descriptor 1110 is equivalent to that of the descriptor 1020 for reception processing generally used in the configuration of FIG. 35.

The descriptor 1110 is actually arranged in a memory on a personal computer, a communication device, or a communication board, similar to the packet memory 101.

The descriptor 1110 can be arranged in the same memory as the packet memory 101, in which case the purpose can be distinguished by the address in the memory.

Figure 36:
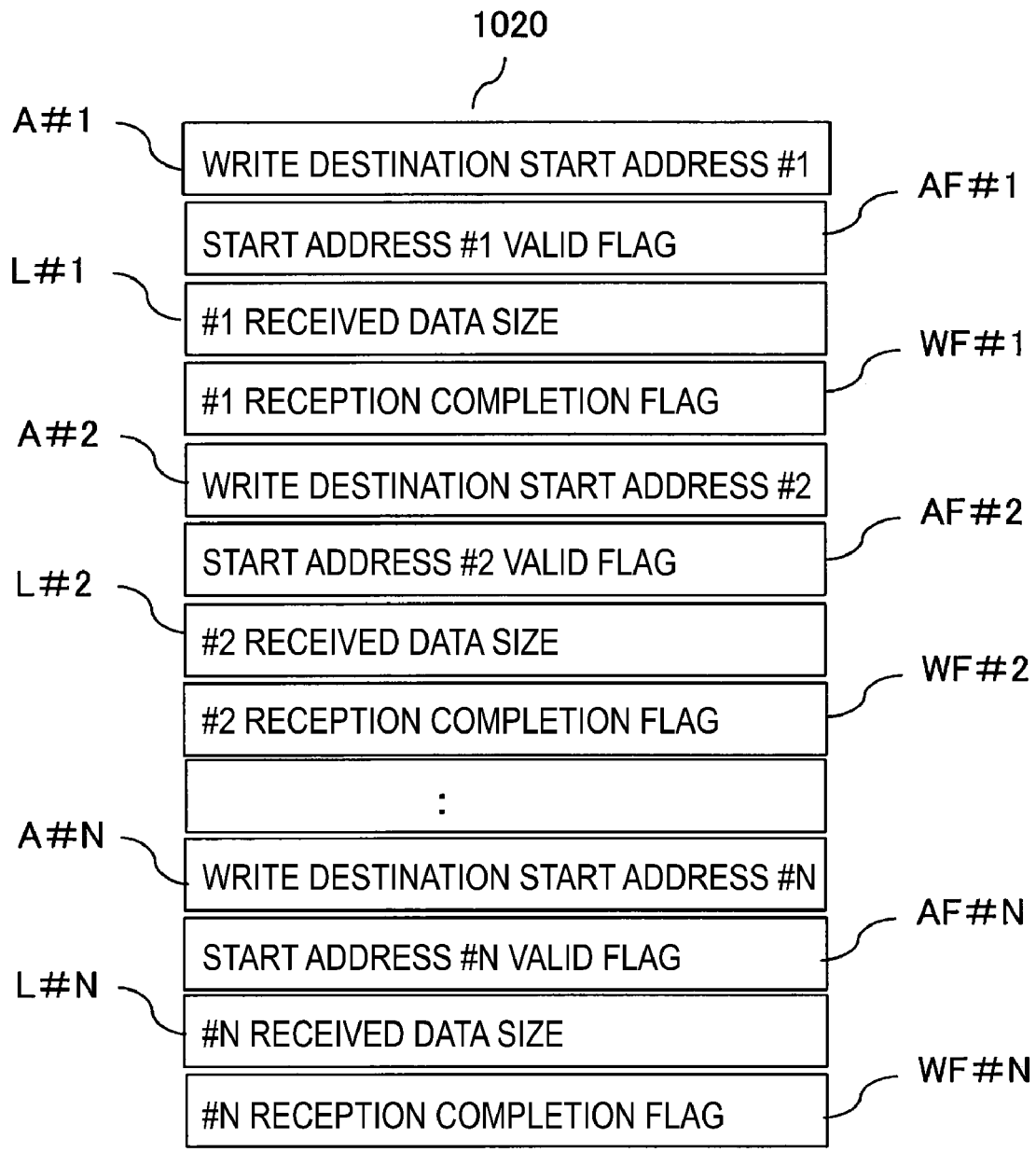
FIG. 36 is a diagram illustrating an outline of a descriptor for the packet processing apparatus of FIG. 35.

Here, an exemplary operation of DMA transfer of the related scheme using the descriptor 1020 of the related scheme will be described in detail again with reference to FIGS. 36 and 37.

First, the processor of the packet processing apparatus determines and writes start addresses A #1 to A #N of the write destinations of packets to the descriptor 1020 and further rewrites valid flags AF #1 to AF #N indicating whether or not the start addresses A #1 to A #N are valid from "invalid" to "valid."

The descriptor 1020 has N sets of areas for writing information such as the start addresses, while the order of writing to the areas is predetermined. For example, in the example of FIG. 36, the processor writes the start addresses in the order of the first start address A #1, the second start address A #2, . . . , and the Nth start address A #N.

When it becomes possible to transfer the first packet again after all start addresses are written, starts addresses are written to the descriptor 1020 in order from the first start address A #1. Whether or not a start address A #n (where n is 1 to N) can be written may be determined, for example, such that it is determined that the start address A #n can be written if a valid flag AF #n corresponding to the start address A #n is "invalid."

Figure 37:
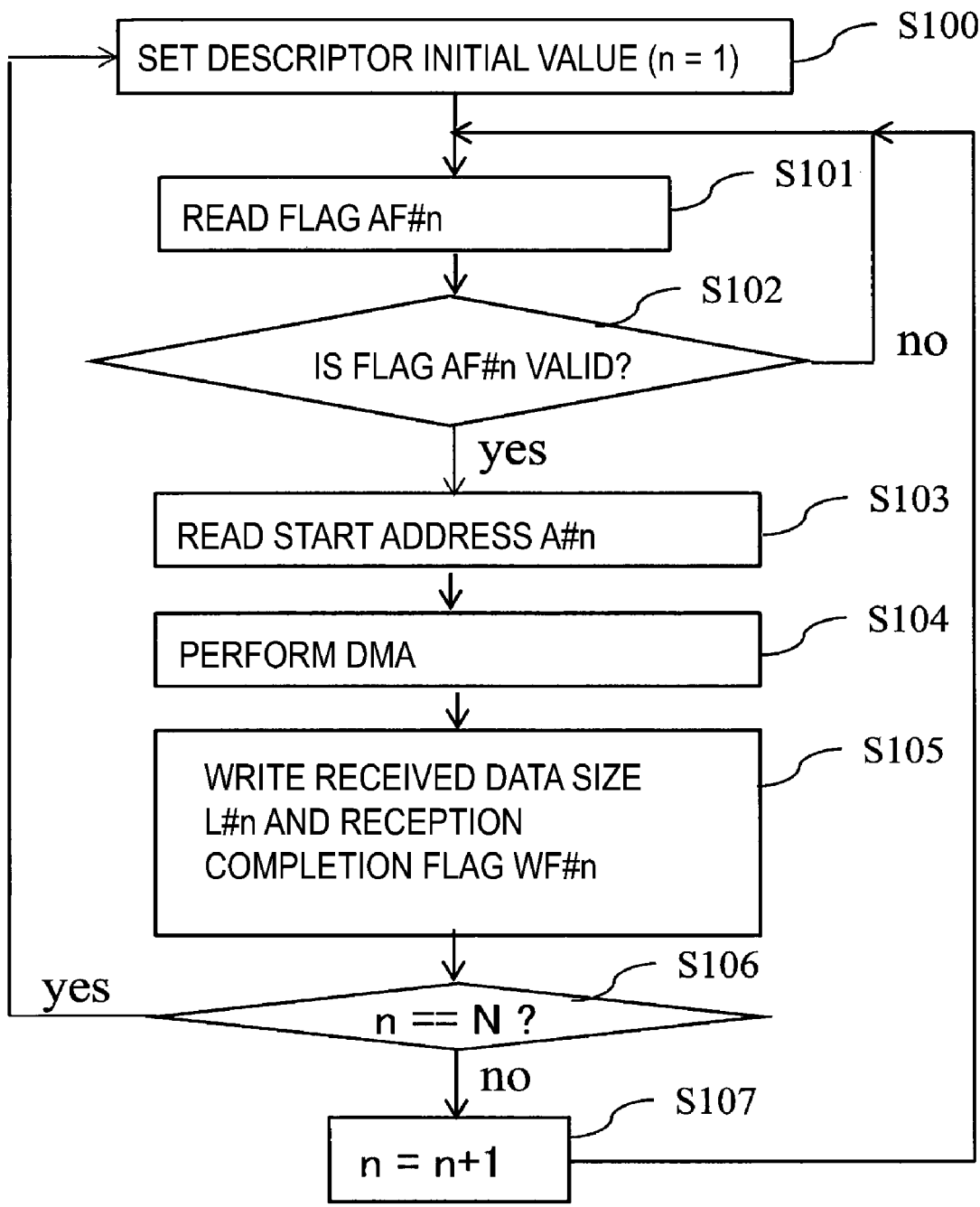
FIG. 37 is a flowchart illustrating an operation of a DMA controller in the packet processing apparatus of FIG. 35.

Next, the DMA controller 1021 checks a valid flag AF #n in the descriptor 1020, and when the valid flag AF #n indicates that a start address A #n is "valid" (yes in FIG. 37 step S102), reads the start address A #n from the descriptor 1020 (step S103 in FIG. 37), and writes a corresponding nth packet to an area starting from the start address A #n in the packet memory 101 (step S104 in FIG. 37).

After completing this DMA transfer, the DMA controller 1021 writes a received data size L #n indicating the packet length of the nth packet to the descriptor 1020 and rewrites a reception completion flag WF #n set in the descriptor 1020 indicating that writing of the nth packet has been completed from "not completed" to "completed" (step S105 in FIG. 37).

As described above, the descriptor 1020 has (a set of) N areas of valid flags AF #1 to AF #N, while the order in which the valid flags AF #1 to AF #N are checked is predetermined. For example, in the examples of FIGS. 36 and 37, the DMA controller 1021 checks the valid flags in the order of the first valid flag AF #1, the second valid flag AF #2, . . . , and the Nth valid flag AF #N. After checking all valid flags, the DMA controller 1021 checks again the valid flags in order from the first valid flag AF #1.

The descriptor 1020 also has N sets of prepared areas for writing the received data sizes L #1 to L #N and the reception completion flags WF #1 to WF #N. The DMA controller 1021 writes a reception data size L #n and a reception completion flag WF #n to areas of a number corresponding to an nth valid flag AF #n which has been confirmed as indicating that an nth start address A #n is "valid."

Next, the processor of the packet processing apparatus periodically checks the reception completion flags WF #n in the descriptor 1020, and when a reception completion flag WF #n indicates "completed," reads an nth packet from the packet memory 101 using information on a corresponding nth start address A #n and a corresponding nth received data size L #n and performs necessary processing (for example, protocol processing) on the read nth packet.

Then, the processor rewrites an nth valid flag AF #n in the descriptor 1020 corresponding to the nth packet for which the processing has been completed from "valid" to "invalid" and rewrites the nth reception completion flag WF #n in the descriptor 1020 from "completed" to "not completed."

The descriptor 1020 has (a set of) N areas of reception completion flags WF #1 to WF #N, while the order in which the reception completion flags WF #1 to WF #N are checked is predetermined. For example, in the examples of FIGS. 36 and 37, the processor checks the reception completion flags in the order of the first reception completion flag WF #1, the second reception completion flag WF #2, . . . , and the Nth reception completion flag WF #N. After checking all reception completion flags, the processor checks the reception completion flags again in order from the first reception completion flag WF #1.

In the above operation, the DMA controller 1021 may issue an interrupt processing request to the processor after completing a DMA transfer and check reception completion flags WF #1 to WF #N upon receiving the interrupt processing request from the DMA controller 1021 instead of the processor periodically checking the reception completion flags WF #1 to WF #N.

Figure 3:
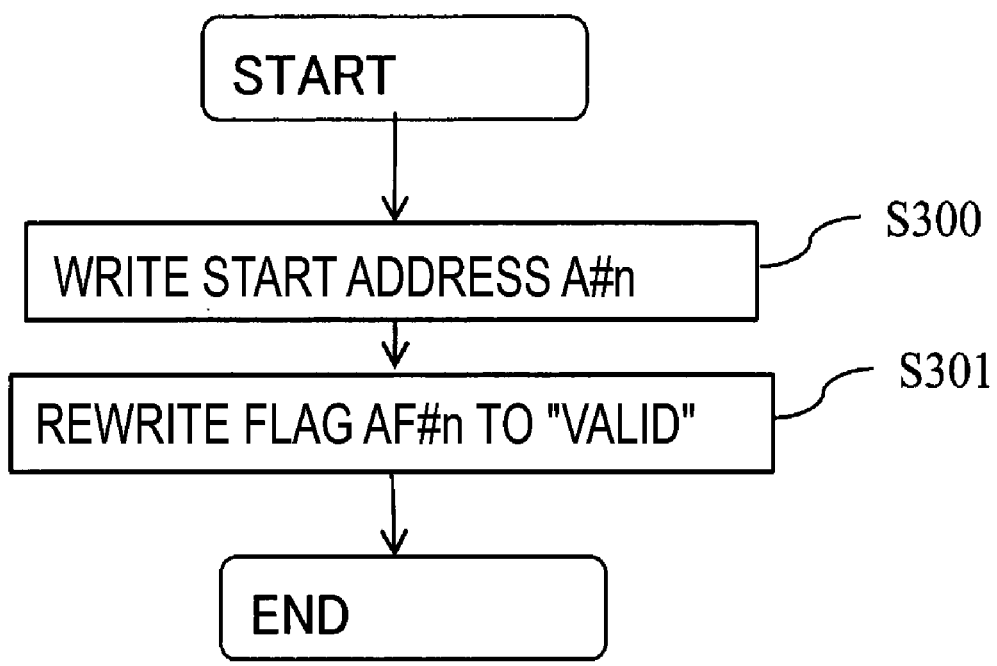
FIG. 3 is a flowchart illustrating an operation of a transfer management unit in the packet processing apparatus according to the first reference example of the present invention.
Figure 4:
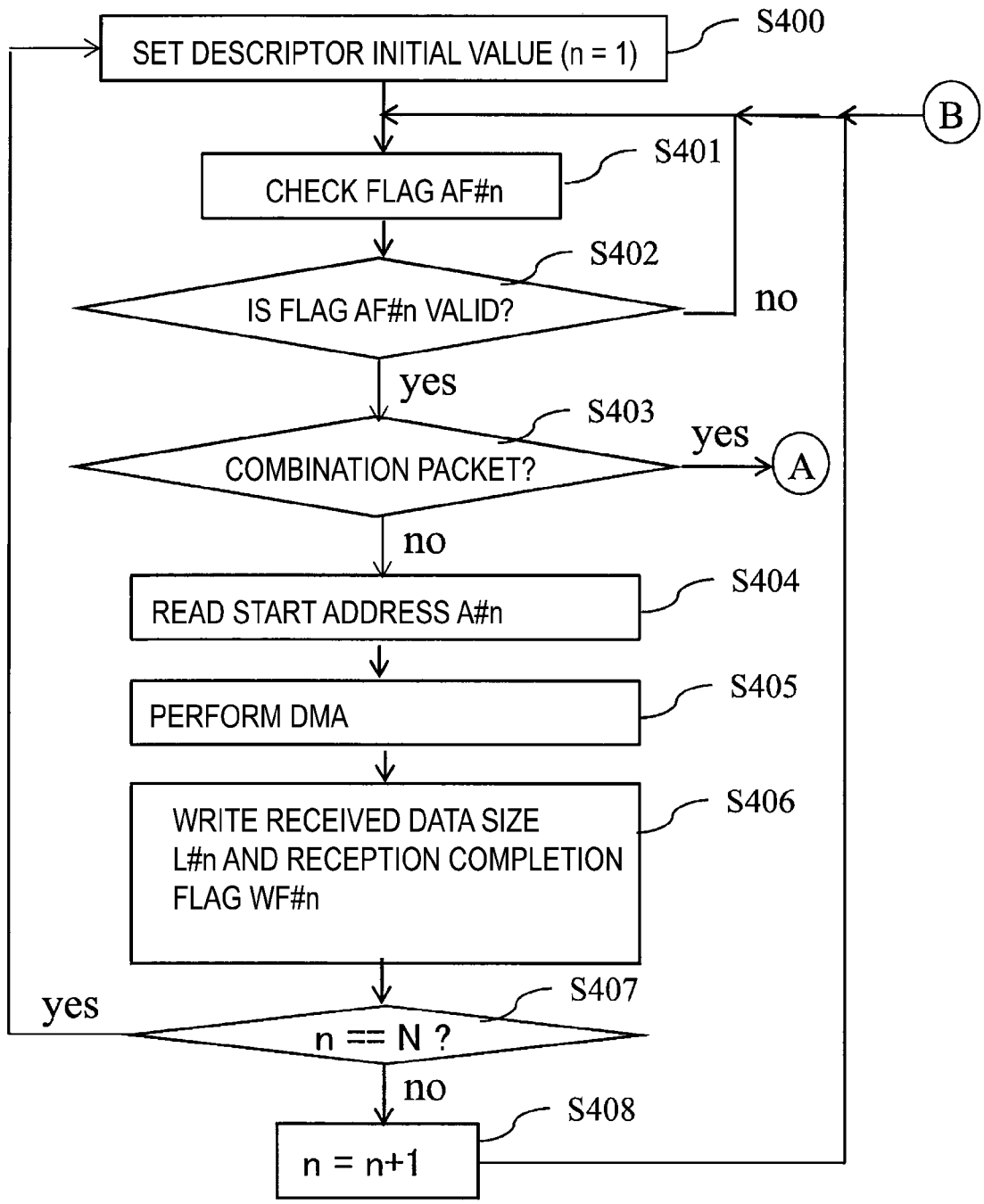
FIG. 4 is a flowchart illustrating an operation of a DMA controller in the packet processing apparatus according to the first reference example of the present invention.
Figure 5:
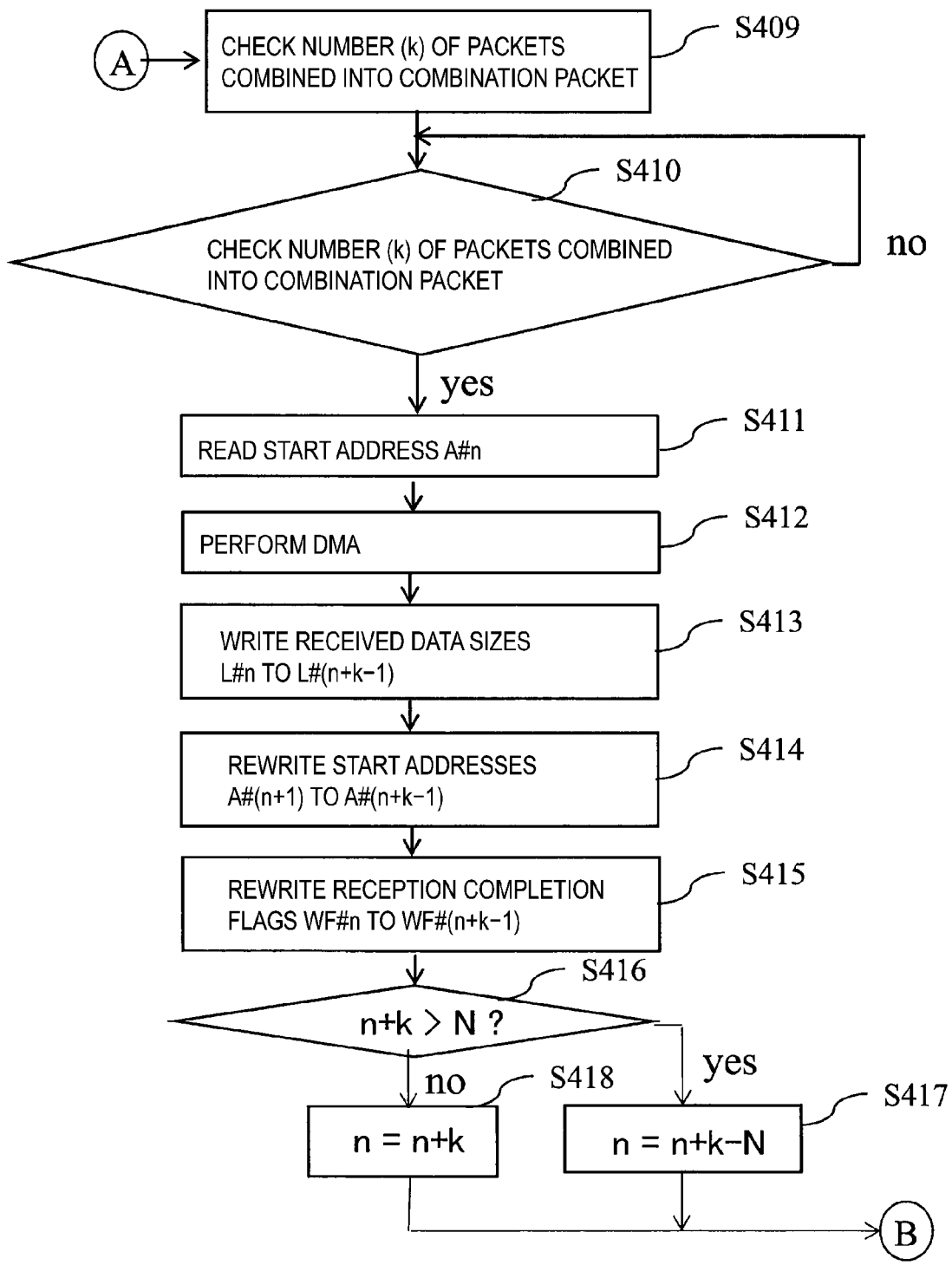
FIG. 5 is a flowchart illustrating an operation of the DMA controller in the packet processing apparatus according to the first reference example of the present invention.

Next, an exemplary operation of the present embodiment using the descriptor 1110 having the configuration of FIG. 2 will be described with reference to FIGS. 1 to 6. FIG. 3 is a flowchart illustrating an operation of the transfer management unit 112, FIGS. 4 and 5 are flowcharts illustrating operations of the DMA controller 1111, and FIG. 6 is a flowchart illustrating an operation of the reception processing unit 103.

First, the transfer management unit 112 (software executed by the processor) determines addresses of beginning data of N packets in the packet memory 101, that is, start addresses A #n (where n is 1 to N) of write destinations of the packets, and writes the determined addresses to the descriptor 1020 as an initial setting of the packet processing apparatus (step S300 in FIG. 3). Further, the transfer management unit 112 rewrites the valid flags AF #n indicating whether or not the start addresses A #n are valid from "invalid" to "valid" (step S301 in FIG. 3).

The descriptor 1110 has N sets of prepared areas for writing information such as the start addresses, while the order of writing to the areas is predetermined. For example, in the example of FIG. 2, the transfer management unit 112 writes the start addresses in the order of the first start address A #1, the second start address A #2, . . . , and the Nth start address A #N.

When it becomes possible to transfer the first packet again after all start addresses are written, starts addresses are written to the descriptor 1110 in order from the first start address A #1. Whether or not a start address A #n can be written may be determined, for example, such that it is determined that the start address A #n can be written if a valid flag AF #n corresponding to the start address A #n is "invalid." This operation is equivalent to that of the related scheme.

First, the DMA controller 1111 in the combination packet transfer unit 111 initializes a variable n indicating the order of reading and writing from and to the descriptor 1110 to 1 (step S400 in FIG. 4).

Then, when the packet combining unit 110 has issued a transfer request, the DMA controller 1111 checks an nth valid flag AF #n in the descriptor 1110 (step S401 in FIG. 4).

When the valid flag AF #n indicates that the nth start address A #n is "valid" (yes in step S402 of FIG. 4), the DMA controller 111 checks information from the packet combining unit 110 (the number of packets combined and the size of each packet) and checks whether data to be transferred to the packet memory 101 is a single packet which has not been combined or a combination packet (step S403 in FIG. 4).

When the data to be transferred to the packet memory 101 is not a combination packet (when the number of packets combined is 1), the DMA controller 1111 reads the nth start address A #n confirmed as "valid" by the corresponding valid flag AF #n from the descriptor 1110 (step S404 in FIG. 4) and performs a DMA transfer to write a corresponding nth packet to an area starting from the start address A #n in the packet memory 101 (step S405 in FIG. 4).

After completing this DMA transfer, the DMA controller 1111 writes a received data size L #n indicating the packet length of the nth packet to the descriptor 1110 and rewrites a reception completion flag WF #n set in the descriptor 1110 indicating that writing of the nth packet has been completed from "not completed" to "completed" (step S406 in FIG. 4).

The DMA controller 1111 determines whether or not the variable n is equal to N (step S407 in FIG. 4). When the variable n has not reached N (no in step S407), the DMA controller 1111 increments the variable n by 1 (step S408 in FIG. 4) and returns to step S401. When the variable n has reached N (yes in step S407), the DMA controller 1111 returns to step S400.

As described above, the descriptor 1110 has (a set of) N prepared areas of valid flags AF #1 to AF #N, while the order in which the valid flags AF #1 to AF #N are checked is predetermined. For example, in the examples of FIGS. 2 and 4, the DMA controller 1111 checks the valid flags in the order of the first valid flag AF #1, the second valid flag AF #2, . . . , and the Nth valid flag AF #N. After checking all valid flags, the DMA controller 1111 initializes the variable n to 1 (step S400) and checks again the valid flags in order from the first valid flag AF #1.

The descriptor 1110 also has N sets of prepared areas for writing the received data sizes L #1 to L #N and the reception completion flags WF #1 to WF #N. The DMA controller 1111 writes a reception data size L #n and a reception completion flag WF #n to areas of a number corresponding to an nth valid flag AF #n which has been confirmed as indicating that an nth start address A #n is "valid."

On the other hand, when the data to be transferred to the packet memory 101 is a combination packet (when the number k of packets combined is 2 or more), the DMA controller 1111 checks the number k of packets combined (step S409 in FIG. 5) and checks "k−1" valid flags AF #(n+1) to AF #(n+k−1) in the descriptor 1110 (step S410 in FIG. 5). Here, the reason for checking the "k−1" valid flags is that the nth valid flag AF #n has already been checked in step S402.

When n=N, the DMA controller 1111 checks the valid flags AF #1 to AF #(k−1). When n<N and n+k−1>N, the DMA controller 1111 checks the valid flags AF #(n+1) to AF #N and AF #1 to AF #(k−1−(N−n)).

When all k valid flags checked in the processing of steps S402 and S410 are "valid" (yes in step S410), the DMA controller 1111 reads an nth start address A #n corresponding to the first valid flag AF #n among the k checked valid flags from the descriptor 1110 (step S411 in FIG. 5) and performs a DMA transfer to write a corresponding combination packet to an area starting from the start address A #n in the packet memory 101 (step S412 in FIG. 5).

After completing this DMA transfer, the DMA controller 1111 writes to the descriptor 1110 received data sizes L #n to L #(n+k−1) indicating the packet lengths of packets constituting the combination packet DMA-transferred to the packet memory 101 based on information of which the packet combining unit 110 has notified (the size of each packet combined) (step S413 in FIG. 5).

When n=N, the DMA controller 1111 writes the received data sizes L #n and L #1 to L #(k−1) to the descriptor 1110. When n<N and n+k−1>N, the DMA controller 1111 writes the received data sizes L #n, L #(n+1) to L #N, and L #1 to L #(k−1−(N−n)) to the descriptor 1110.

Subsequently, the DMA controller 1111 rewrites "k−1" start addresses A #(n+1) to A #(n+k−1) in the descriptor 1110 according to the packet lengths of the first "k−1" packets among the k packets constituting the combination packet (step S414 in FIG. 5).

Specifically, the DMA controller 1111 rewrites the start address A #(n+1) to a value obtained by adding the start address A #n and the packet length of the first packet among the k packets constituting the combination packet (a value indicated by the received data size L #n). Further, the DMA controller 1111 rewrites the start address A #(n+k−1) to a value obtained by adding the start address A #(n+k−2) and the packet length of the "k−1"th packet among the k packets constituting the combination packet (a value indicated by the received data size L #(n+k−2)).

In this way, the DMA controller 1111 rewrites a start address A #i to a value obtained by adding an immediately previous start address A #(i−1) and the packet length of an "i−1"th packet among the packets constituting the combination packet.

Next, the DMA controller 1111 rewrites reception completion flags WF #n to WF #(n+k−1) corresponding to the packets constituting the combination packet DMA-transferred to the packet memory 101 from "not completed" to "completed" (step S415 in FIG. 5).

When n=N, the DMA controller 1111 rewrites the reception completion flags WF #n and WF #1 to WF #(k−1) from "not completed" to "completed." When n<N and n+k−1>N, the DMA controller 1111 rewrites the reception completion flags WF #n, WF #(n+1) to WF #N, and WF #1 to WF #(k−1−(N−n)) to "completed."

Then, the DMA controller 1111 checks whether or not n+k>N is satisfied (step S416 in FIG. 5), and when n+k is larger than N, sets the variable n such that n=n+k−N (step S417 in FIG. 5) and returns to step S401. When n+k is N or less, the DMA controller 1111 sets the variable n such that n=n+k (step S418 in FIG. 5) and returns to step S401.

In the DMA transfer of the present embodiment, a combination packet into which k packets have been concatenated is collectively transferred to the packet memory 101 and information on start addresses in the descriptor 1110 is partially rewritten in the above manner, thereby notifying the processor of the packet processing apparatus (the reception processing unit 103 and the protocol processing unit 104) of addresses where the beginnings of the packets have been written.

Figure 6:
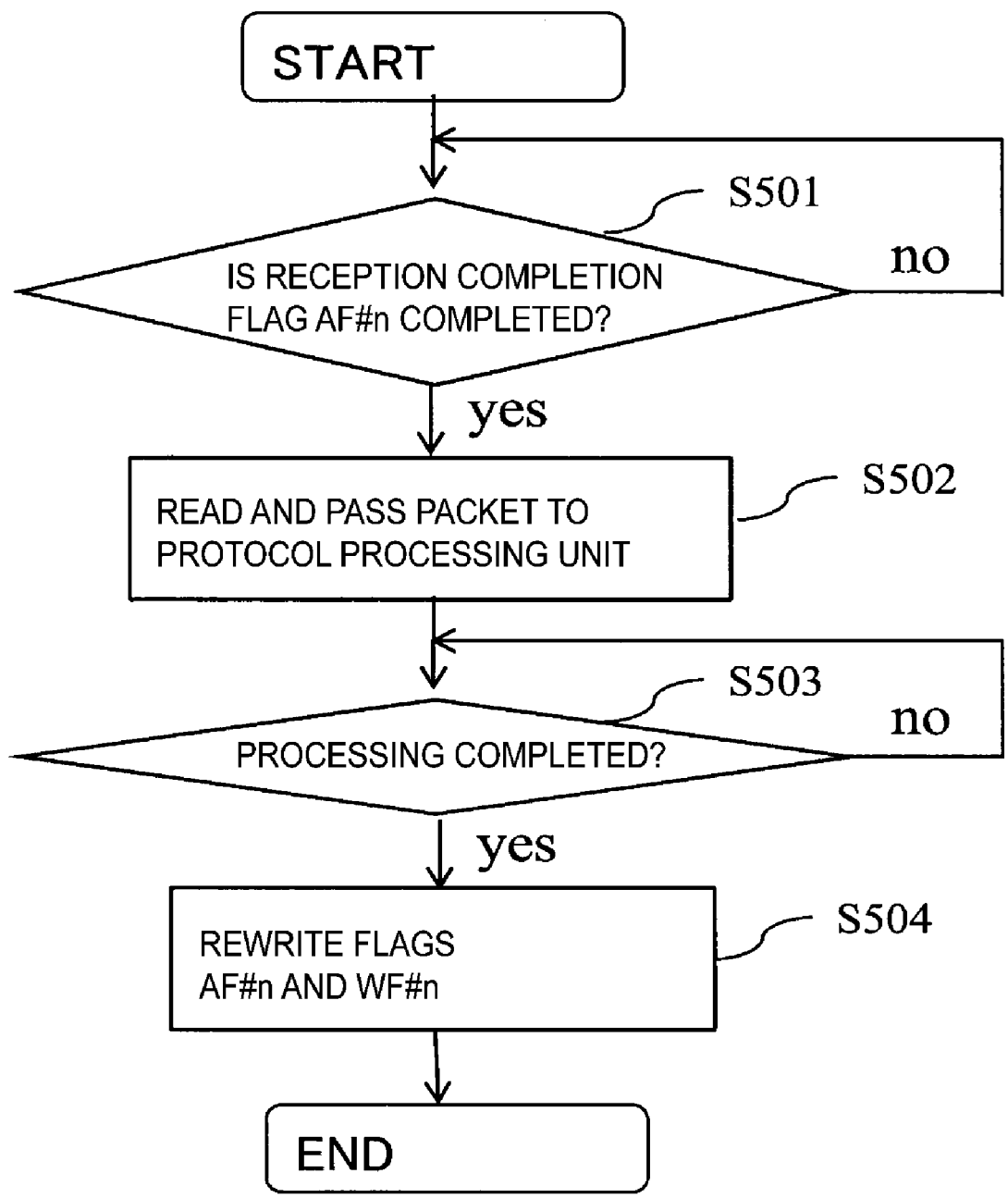
FIG. 6 is a flowchart illustrating an operation of a reception processing unit in the packet processing apparatus according to the first reference example of the present invention.

The reception processing unit 103 (software executed by the processor) periodically checks the reception completion flags WF #n (where n is 1 to N) of the descriptor 1110, and when a reception completion flag WF #n indicates "completed" (yes in step S501 in FIG. 6), reads an nth packet from the packet memory 101 based on information on a corresponding nth start address A #n and a corresponding received data size L #n and passes the read nth packet to the protocol processing unit 104 (step S502 in FIG. 6).

After necessary processing has been performed by the protocol processing unit 104 (yes in step S503 in FIG. 6), the reception processing unit 103 (software executed by the processor) rewrites an nth valid flag AF #n in the descriptor 1110 corresponding to the nth packet for which the protocol processing has been completed from "valid" to "invalid" and rewrites the nth reception completion flag WF #n in the descriptor 1110 from "completed" to "not completed" (step S504 in FIG. 6).

The descriptor 1110 has (a set of) N areas of reception completion flags WF #1 to WF #N, while the order in which the reception completion flags WF #1 to WF #N are checked is predetermined. For example, the reception processing unit 103 (software executed by the processor) checks the reception completion flags in the order of the first reception completion flag WF #1, the second reception completion flag WF #2, . . . , and the Nth reception completion flag WF #N. After checking all reception completion flags, the reception processing unit 103 checks again the reception completion flags in order from the first reception completion flag WF #1.

Instead of periodically checking the reception completion flags WF #n in the descriptor 1110, the DMA controller 1111 may issue an interrupt processing request to the processor after completion of a DMA transfer and the reception processing unit 103 (software executed by the processor) may check the reception completion flags WF #n (where n is 1 to N) of the descriptor 1110 in response to the interrupt processing request.

Figure 35:
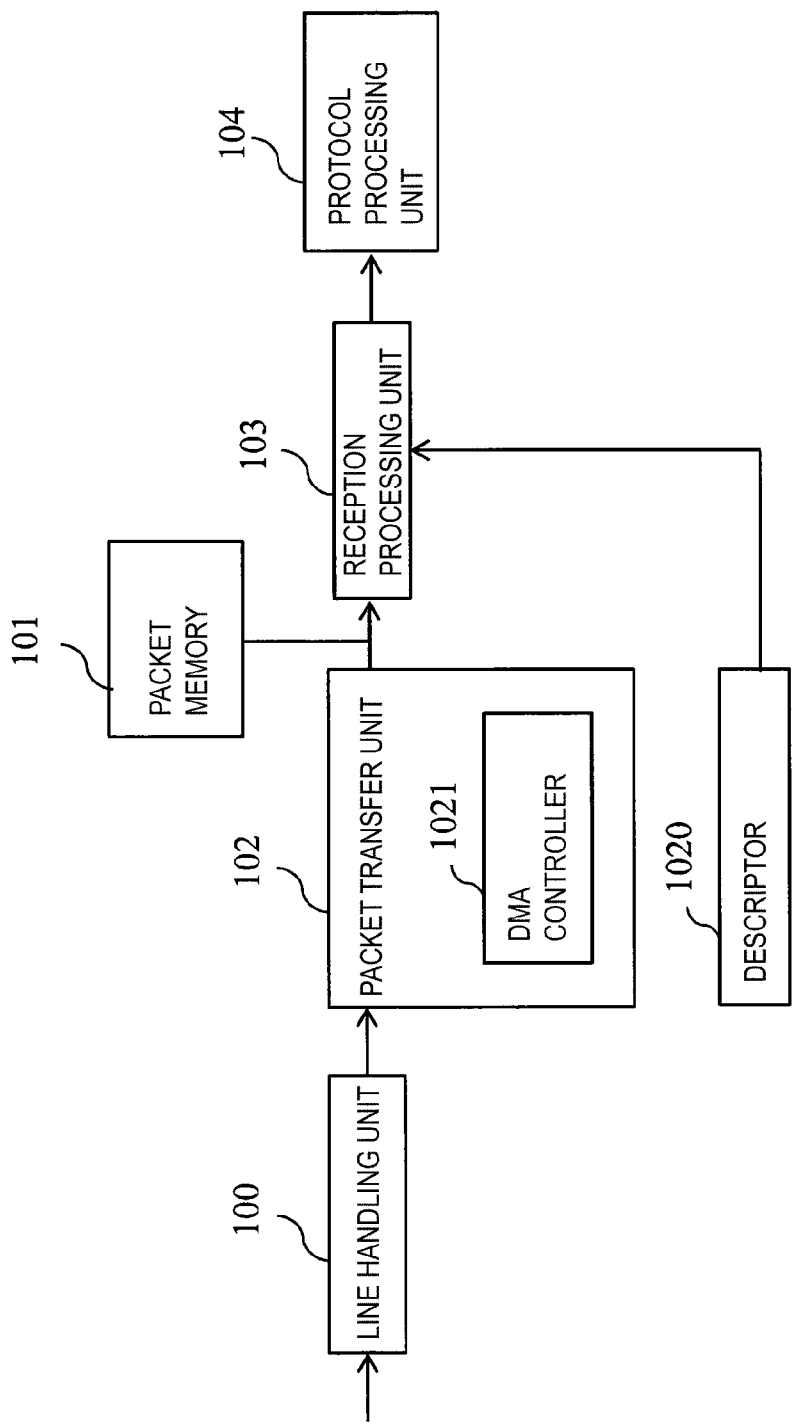
FIG. 35 is a block diagram illustrating a configuration of a packet processing apparatus of the related scheme.

The above operation of the processor (software) is equivalent to the operation of the processor (software) of the related scheme having the configuration of FIG. 35 and it is not necessary to realize the processing of restoring a plurality of original packets from a combination packet by software for reception processing. That is, the reception processing unit 103 and the protocol processing unit 104 may perform the same processing as in the related scheme even when a combination packet is written to the packet memory 101 as in the present reference example.

As described above, the packet processing apparatus of the present reference example includes the combination packet transfer unit 11 having built-in means (the DMA controller 1111) which can realize collective DMA transfer and writes information for restoring a plurality of original packets from a combination packet to the descriptor 1110. Because the DMA controller 1111 can be implemented by hardware, it is not necessary to execute the restoration processing by software and it is possible to achieve high reception performance due to the effects of collective DMA transfer.

Figure 41:
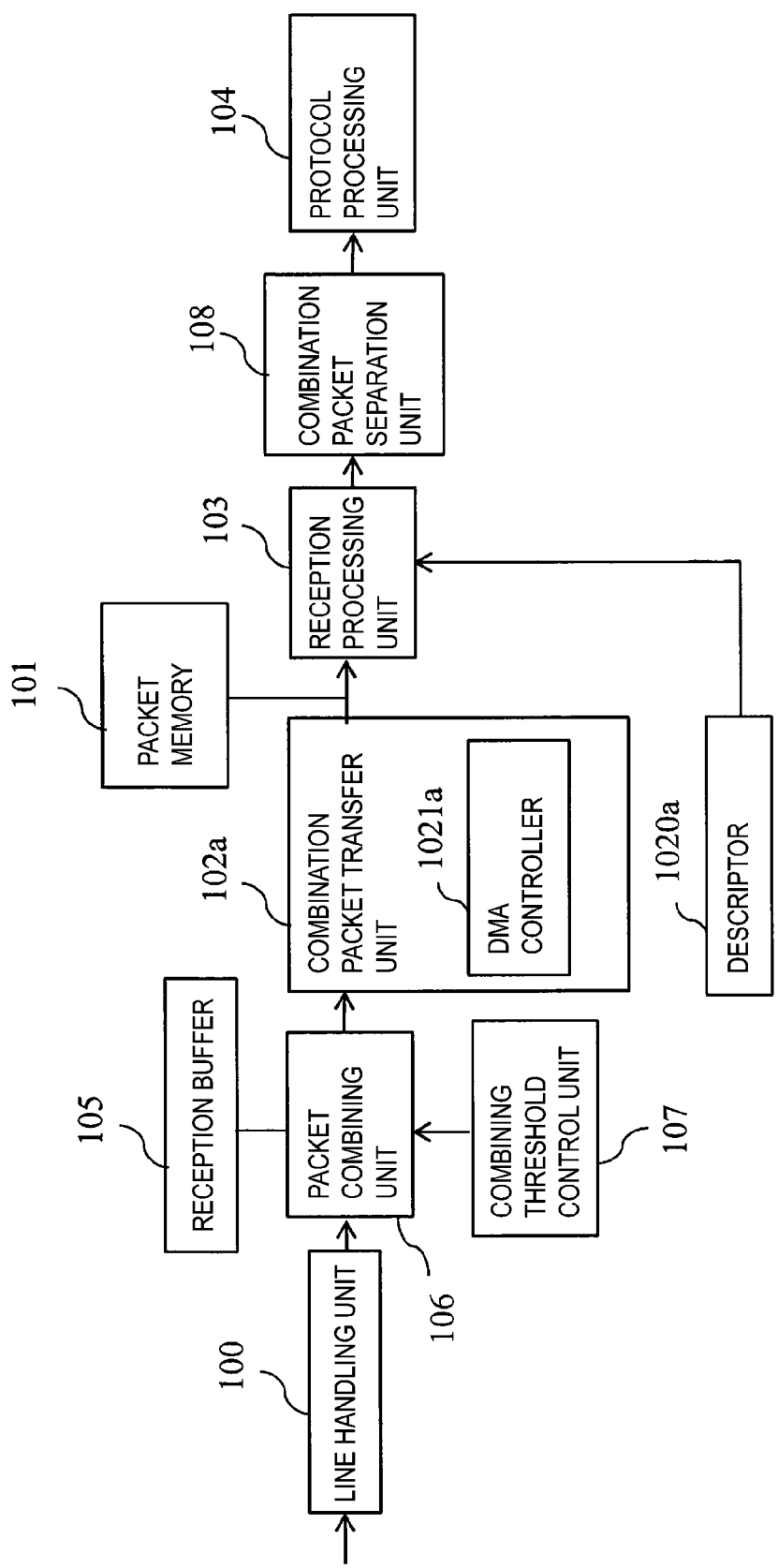
FIG. 41 is a block diagram illustrating another configuration of a packet processing apparatus of the related scheme.

Compared to when the processor (software) executes the processing of restoring a plurality of original packets from a combination packet in the packet processing apparatus of the related scheme having the configuration of FIG. 38 or the configuration of FIG. 41, the present reference example has advantages that the processing of the processor required to process one packet becomes lighter and the reception performance is improved (the number of packets that can be processed per unit time increases) because the restoration processing does not need to be performed by the processor (software). The present reference example also has an advantage that power consumption of the processor required to process one packet is reduced.

Further, in the present reference example, the software for the reception processing unit 103 and the protocol processing unit 104 in the configuration of FIG. 35 can be used as it is in the packet processing apparatus of the present reference example. This indicates that the improvement of the reception performance through collective DMA can be achieved simply by changing the hardware (DMA controller 1111).

Meanwhile, in the present reference example, an addressed area in the packet memory 101 prepared by the processor (software) is shared by a plurality of packets, such that the addressed area cannot be reused until the reception processing (transfer to the protocol processing unit 104) of all shared packets is completed.

The transfer management unit 112 (software executed by the processor) needs to prepare and set in the descriptor 1110 an addressed area having a size that allows writing of a maximum size of combination packet. The maximum size of a combination packet is a value obtained by adding a maximum allowable packet length to the threshold set in the combining threshold control unit 107.

In order to properly perform the collective DMA transfer in the packet processing apparatus of the present reference example, the transfer management unit 112 (software executed by the processor) needs to secure a buffer area of size N×DB_mux (where DB_mux is the maximum size of a combination packet) in the packet memory 101 in advance. This area securing is equivalent to that in the case of the configuration of FIG. 38.

In the present reference example, for example, when the buffer area is prepared as a continuous area in the packet memory 101, the start address of the buffer area is the start address A #1 in FIG. 2 set by the transfer management unit 112 (software executed by the processor). On the other hand, the final address of the buffer area is the start address A #1+(N×DB_mux)−1. In this case, the start address A #N in FIG. 2 set by the transfer management unit 112 (software executed by the processor) is the start address A #1+(N−1)× DB_mux.

Even when the transfer destination address of a DMA transfer of a combination packet is A #N, such area securing allows the combination packet to be reliably written to a continuous area of size DB_mux ranging from that address A #N to the final address of the buffer area because the continuous area of size DB_mux has been secured in the packet memory 101.

If the area ranging from the address A #N to the final address of the buffer area is smaller than DB_mux, a part of the combination packet to be written may sometimes be written to an area where its writing is forbidden.

When the buffer area secured in the packet memory 101 is not prepared as a continuous area, but for example, as N discrete areas, N areas of size DB_mux are prepared in advance and the transfer management unit 112 (software executed by the processor) sets start addresses of the areas as A #1 to A #N, such that a combination packet can be reliably written to a continuous area of size DB_mux, avoiding the problem that the combination packet is written to an area where its writing is forbidden.

In the packet processing apparatus of the present reference example, the DMA controller 1111 rewrites information of the descriptor 1110 (such as start addresses, received data sizes, and reception completion flags) after a DMA transfer, thus eliminating the need for the restoration processing by software.

When the restoration processing is realized by hardware of the reception processing unit 103, the protocol processing unit 104, or the combination packet separation unit 108 of FIG. 41, it is necessary to provide means for the packet combining unit 106 to notify the reception processing unit 103, the protocol processing unit 104, or the combination packet separation unit 108 of FIG. 41 of information required for the restoration processing (the number of packets combined and the size of each packet).

Further, when the restoration processing is realized by hardware of the reception processing unit 103, the protocol processing unit 104, or the combination packet separation unit 108 of FIG. 41, there is a need to take into account that it is sometimes necessary to hold information required for the restoration processing for a plurality of combination packets until reception processing is activated after a DMA transfer is completed.

On the other hand, in the packet processing apparatus of the present reference example, it is not necessary to hold information on a plurality of combination packets because the restoration processing for a combination packet has already been completed when a DMA transfer of the combination packet has been completed. Thus, the scale of hardware in the present reference example is smaller than that when the restoration processing is realized by hardware of the reception processing unit 103, the protocol processing unit 104, or the combination packet separation unit 108 of FIG. 41.

Writing information required for the restoration processing to a portion of a combination packet may also be applied as the means for the packet combining unit 106 to notify the reception processing unit 103, the protocol processing unit 104, or the combination packet separation unit 108 of FIG. 41 of information required for the restoration processing. Specifically, a method can be considered in which, for example, a header in which a packet size or the like is written is added in front of each packet combined and the added header is DMA-transferred together with packet data in order to notify of the size of each packet combined.

However, if information required for the restoration processing is written to a portion of a combination packet, a part of the bandwidth of a bus used for the DMA transfer is occupied by the information required for the restoration processing, such that the effective bandwidth originally available for transfer of packet data is reduced, and as a result, a problem arises that the performance of the DMA transfer deteriorates.

In the packet processing apparatus of the present reference example, such effective bandwidth deterioration does not occur because it is not necessary to write information required for the restoration processing to a combination packet.

In the present reference example, an example in which the combination packet transfer unit 111 is realized by hardware has been illustrated. However, at least a part of the processing of the combination packet transfer unit 111 may be implemented by software and a processor other than the processor used for the reception processing. When at least a part of the processing of the combination packet transfer unit 111 is realized by software in this way, it is also not necessary for the reception processing unit 103 or the protocol processing unit 104 to perform the processing of restoring a plurality of original packets from a combination packet, such that it is possible to achieve high reception performance due to the effects of collective DMA transfer.

When at least a part of the processing of the combination packet transfer unit 111 is realized by software, it is also possible to achieve the advantage of reducing the scale of hardware required for the processing of restoring a plurality of original packets from a combination packet (which is an advantage due to not having to hold information on a plurality of combination packets) and the advantage of not deteriorating the effective bandwidth available for packet data transfer (which is an advantage due to not adding information required for the restoration processing to a portion of a combination packet), similar to when the combination packet transfer unit 111 is realized by hardware.

As a modification of the present reference example, areas for rewrite execution flags indicating whether or not start addresses have been rewritten may be added to the descriptor 1110. For example, when the processor that implements the transfer management unit 112 that performs initial setting of the start addresses A #1 to A #N has a cache memory, the start addresses A #1 to A #N written to the descriptor 1110 are copied into the cache memory.

However, when a start address in the descriptor 1110 is rewritten by the DMA controller 1111, corresponding information in the cache memory of the processor that implements the transfer management unit 112 may not be rewritten. Even in such a case, the processor can refer to a rewrite execution flag because the processor reads information in the descriptor 1110 rather than information in the cache memory.

Specifically, the processor reads and uses information in the cache memory upon determining that the start address in the descriptor 1110 has not been rewritten as a result of referring to the rewrite execution flag and temporarily disables the cache and directly reads and uses the start address in the descriptor 1110 upon determining that the start address in the descriptor 1110 has been rewritten.

When start addresses in the descriptor 1110 have been rewritten through the processing of step S414 of FIG. 5, the combination packet transfer unit 111 rewrites the corresponding rewrite execution flags in the descriptor 1110 from "not rewritten" to "rewritten."

As another modification of the present reference example, the DMA controller 1111 may prepare areas for writing changed start addresses in the descriptor 1110 separately from the areas for start addresses written by the transfer management unit 112 (software executed by the processor). In this case, the reception processing unit 103 (software executed by the processor) refers to the areas where the changed start addresses are written. Also, the processing described with reference to step S414 of FIG. 5 becomes processing of writing changed start addresses rather than processing of rewriting start addresses.

Further, the present reference example may have a configuration in which a plurality of DMA controllers 1111 and a plurality of descriptors 1110 corresponding to the DMA controllers 1111 are provided. The present reference example may also have a configuration in which the packet combining unit 110 determines the types of packets and groups packets of the same type into a combination packet or a configuration in which a plurality of DMA controllers 1111 and a plurality of descriptors 1110 are selectively used according to the packet type.

With a configuration in which a DMA controller 1111 and a descriptor 1110 are prepared for each packet type and a plurality of DMA controllers 1111 and a plurality of descriptors 1110 are selectively used according to the packet type, it becomes easier to perform different reception processing for each packet type.

The present reference example may also have a configuration in which a plurality of DMA controllers 1111 and a plurality of descriptors 1110 are selectively used for each core of a processor which has a plurality of CPU cores or a configuration in which a plurality of DMA controllers 1111 and a plurality of descriptors 1110 are selectively used for each virtual machine.

With the configuration in which a plurality of DMA controllers 1111 and a plurality of descriptors 1110 are selectively used for each CPU core or each virtual machine, it is possible to improve the performance of reception processing by software as compared to when there is only one DMA controller or the like.

Second Reference Example

Next, a second reference example of the present invention will be described. The first reference example has been described with reference to the case where DMA transfer is used. However, a packet processing apparatus that does not use DMA transfer can also increase the effective throughput of writing to the packet memory using the collective writing such that a combination packet into which a plurality of packets have been concatenated is collectively written to the packet memory in some cases (such as when the packet memory is made of a dynamic random access memory (DRAM)).

Figure 7:
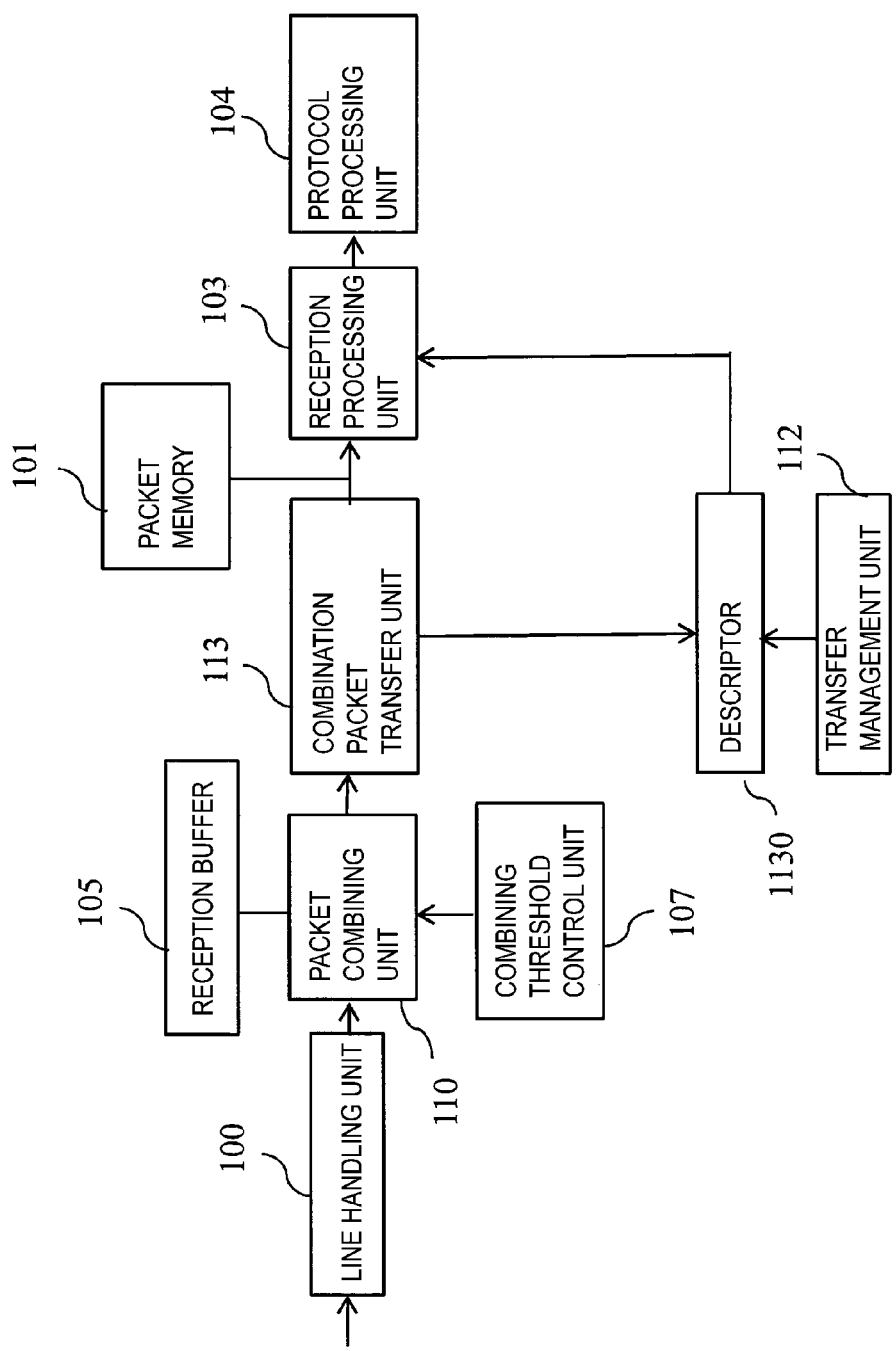
FIG. 7 is a block diagram illustrating a configuration of a packet processing apparatus according to a second reference example of the present invention.

FIG. 7 is a block diagram illustrating a configuration of a packet processing apparatus according to a second reference example of the present invention. The packet processing apparatus of FIG. 7 includes a line handling unit 100, a packet memory 101, a reception processing unit 103, a protocol processing unit 104, a reception buffer 105, a combining threshold control unit 107, a packet combining unit 110, a transfer management unit 112, and a combination packet transfer unit 113.

The configuration of FIG. 7 differs from that of FIG. 1 in that the transfer means in FIG. 1 is replaced with writing means implemented by the processor (software) of the packet processing apparatus. That is, in the present reference example, the combination packet transfer unit 111 of FIG. 1 is replaced with the combination packet transfer unit 113 implemented by software.

The line handling unit 100, the packet memory 101, the reception processing unit 103, the protocol processing unit 104, the reception buffer 105, the combining threshold control unit 107, and the transfer management unit 112 are equivalent to those in the configuration of FIG. 1.

The packet combining unit 110 of FIG. 7 transfers a packet received by the line handling unit 100 to the reception buffer 105 for packet combining. At this time, the packet combining unit 110 stores a packet received by the line handling unit 100 in the reception buffer 105 such that the received packet and packets already stored in the reception buffer 105 are combined into one combination packet. Then, when the size of the combination packet in the reception buffer 105 has exceeded the threshold set in the combining threshold control unit 107, the packet combining unit 110 issues a request to transfer the combination packet to the packet memory 101.

Here, the packet combining unit 110 may also issue a transfer request when a timeout has occurred (such as when the interval between packets has exceeded a predetermined period) before the size of the combination packet in the reception buffer 105 has exceeded the threshold.

The packet combining unit 110 records the number of packets combined in the reception buffer 105 and the size of each packet and notifies the combination packet transfer unit 113 of information on the number of packets combined and the size of each packet when issuing a request to transfer the combination packet.

The combination packet transfer unit 113 (software executed by the processor) writes a combination packet into which a plurality of packets have been combined to the packet memory 101 and issues a request to activate the reception processing unit 103. The combination packet transfer unit 113 (software executed by the processor) writes information such as the size of each packet to the descriptor 1130 which has been prepared for each packet by the transfer management unit 112 (software executed by the processor) using information on the number of packets combined and the size of each packet of which the packet combining unit 110 has notified.

Figure 8:
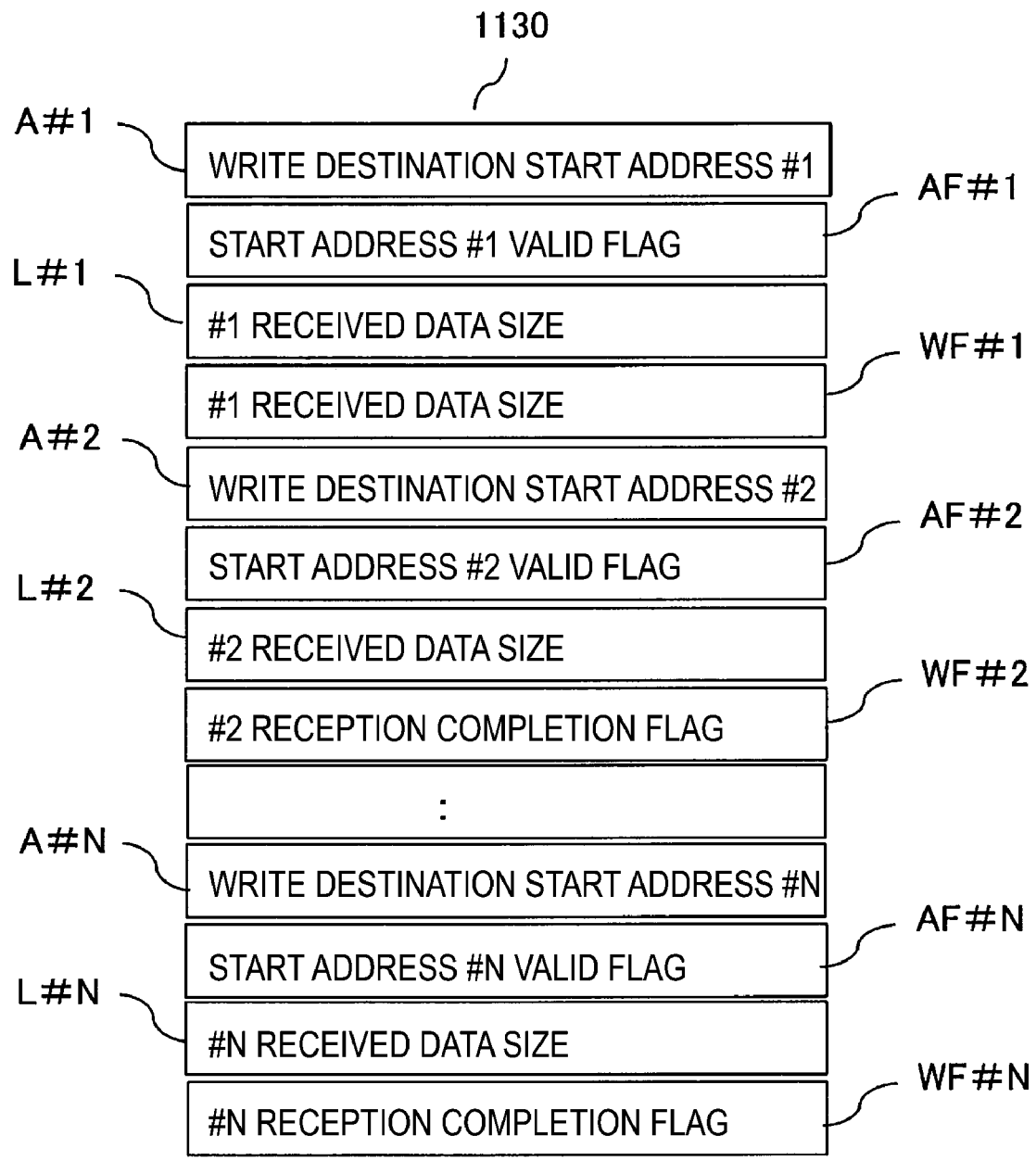
FIG. 8 is a diagram illustrating an outline of a descriptor for the packet processing apparatus according to the second reference example of the present invention.

As illustrated in FIG. 8, the configuration of the descriptor 1130 is equivalent to that of the descriptor 1110 of the first reference example. However, the present reference example differs in that the combination packet transfer unit 113 (software executed by the processor), instead of the combination packet transfer unit 111, performs writing to the descriptor 1130.

Figure 9:
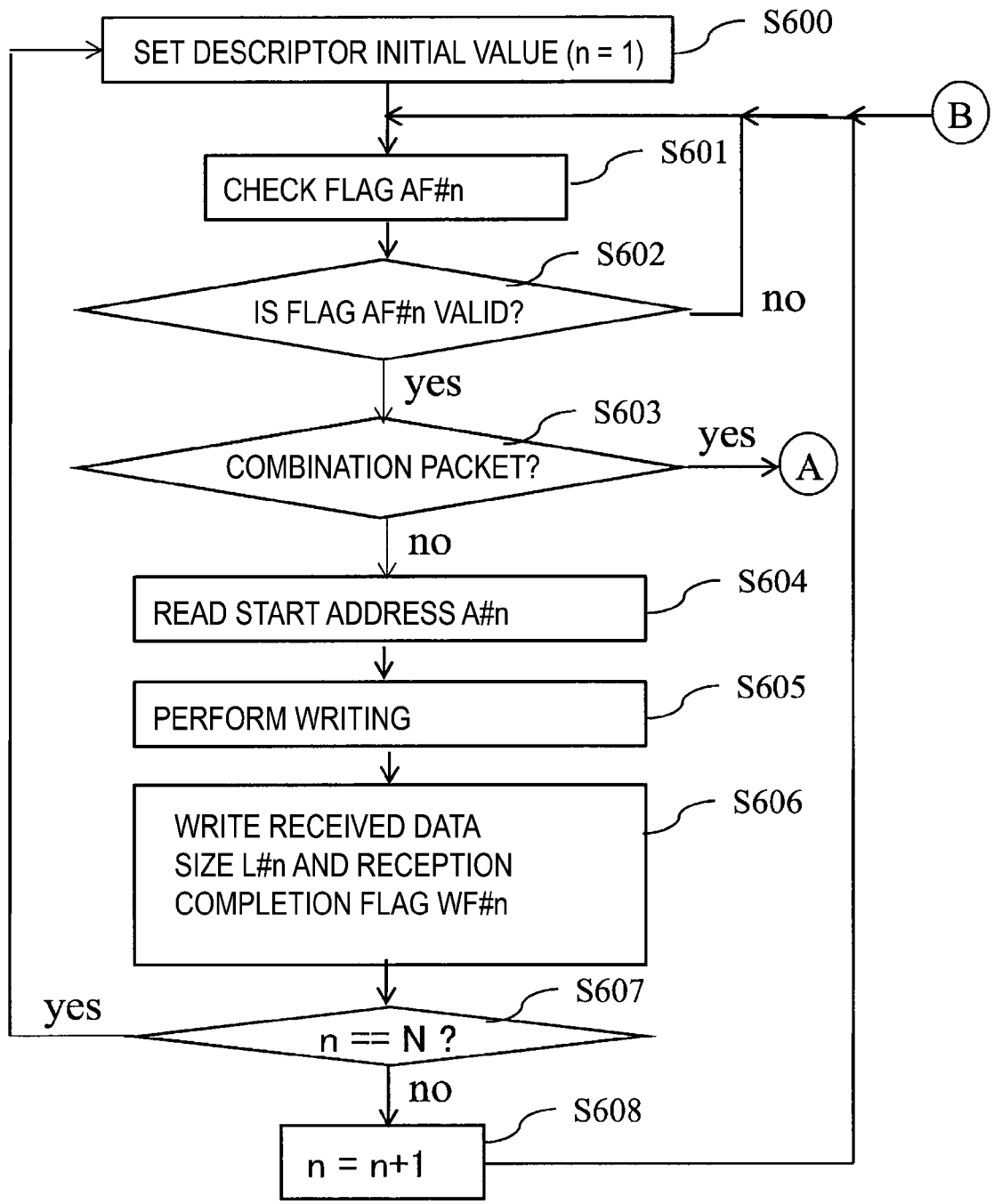
FIG. 9 is a flowchart illustrating an operation of a combination packet transfer unit in the packet processing apparatus according to the second reference example of the present invention.
Figure 10:
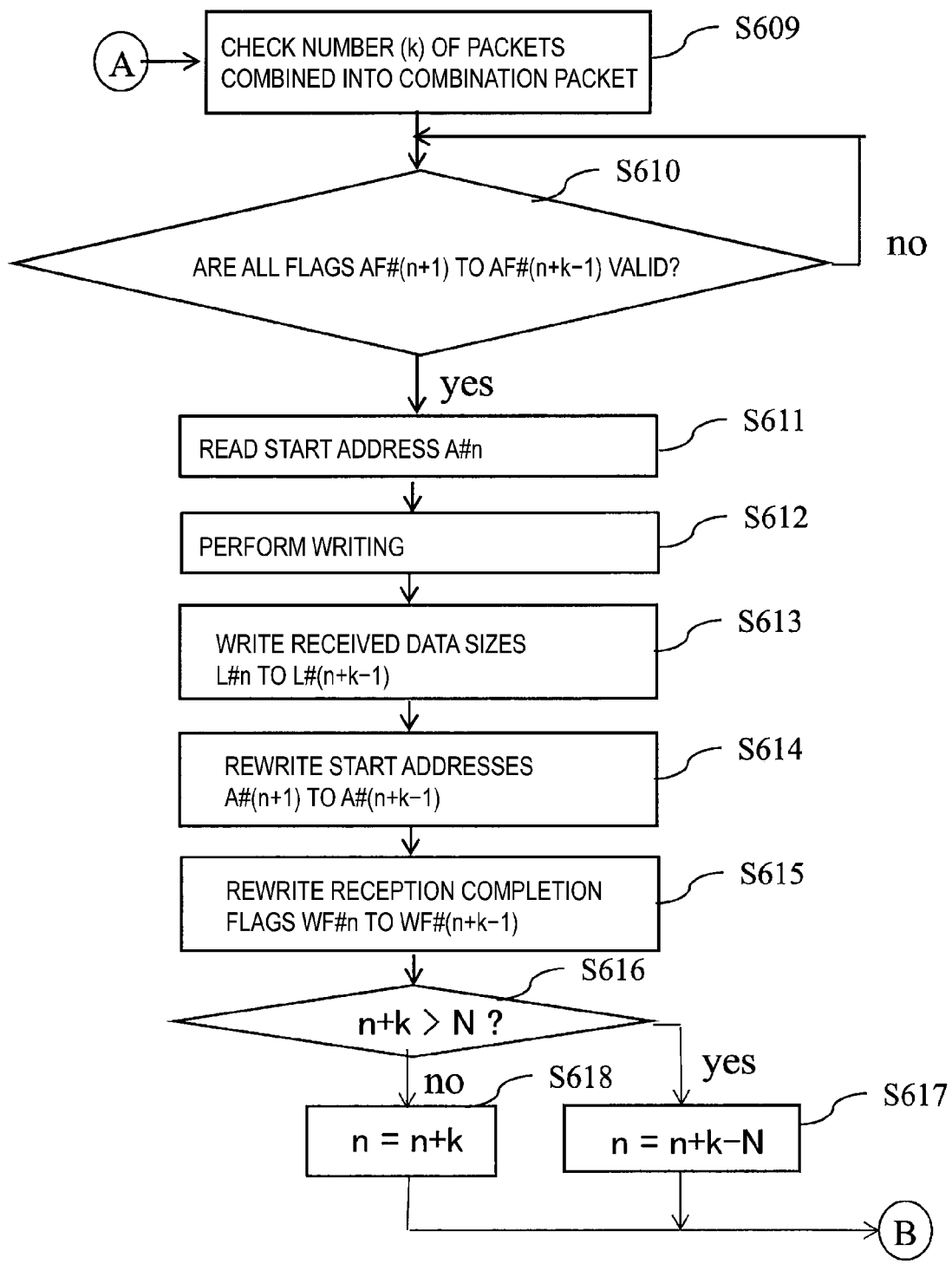
FIG. 10 is a flowchart illustrating an operation of the combination packet transfer unit in the packet processing apparatus according to the second reference example of the present invention.

FIGS. 9 and 10 are flowcharts illustrating operations of the combination packet transfer unit 113 (software executed by the processor). First, the combination packet transfer unit 113 initializes a variable n to 1 (step S600 in FIG. 9), and checks a valid flag AF #n in the descriptor 1130 (step S6o*i* in FIG. 9) after a transfer request is issued from the packet combining unit 110.

When the valid flag AF #n indicates that a start address A #n is "valid" (yes in step S602 of FIG. 9), the combination packet transfer unit 113 checks information from the packet combining unit 110 and checks whether data to be transferred to the packet memory 101 is a single packet or a combination packet (step S603 in FIG. 9).

When the data to be transferred to the packet memory 101 is not a combination packet, the combination packet transfer unit 113 reads the start address A #n confirmed as "valid" by the valid flag AF #n from the descriptor 1130 (step S604 in FIG. 9) and writes a corresponding nth packet to an area starting from the start address A #n in the packet memory 101 (step S605 in FIG. 9).

After completing this writing, the combination packet transfer unit 113 writes a received data size L #n to the descriptor 1130 and rewrites a reception completion flag WF #n set in the descriptor 1130 from "not completed" to "completed" (step S606 in FIG. 9). The above processing of steps S600 to S606 and steps S607 and S608 is equivalent to the processing of steps S400 to S408 of FIG. 4.

On the other hand, when the data to be transferred to the packet memory 101 is a combination packet, the combination packet transfer unit 113 checks the number k of packets combined (step S609 in FIG. 10) and checks "k−1" valid flags AF #(n+1) to AF #(n+k−1) in the descriptor 1130 (step S610 in FIG. 10).

When all checked k valid flags are "valid" (yes in step S610), the combination packet transfer unit 113 reads a start address A #n corresponding to the first valid flag AF #n among the k checked valid flags from the descriptor 1130 (step S611 in FIG. 10) and writes a corresponding combination packet to an area starting from the start address A #n in the packet memory 101 (step S612 in FIG. 10).

After completing this writing, the combination packet transfer unit 113 writes to the descriptor 1130 received data sizes L #n to L #(n+k−1) indicating the packet lengths of packets constituting the combination packet written to the packet memory 101 (step S613 in FIG. 10).

Subsequently, the combination packet transfer unit 113 rewrites "k−1" start addresses A #(n+1) to A #(n+k−1) in the descriptor 1130 according to the packet lengths of the first "k−1" packets among the k packets constituting the combination packet (step S614 in FIG. 10).

Next, the combination packet transfer unit 113 rewrites reception completion flags WF #n to WF #(n+k−1) corresponding to the packets constituting the combination packet written to the packet memory 101 from "not completed" to "completed" (step S615 in FIG. 10).

The above processing of steps S609 to S615 and steps S616 to S618 is equivalent to the processing of steps S409 to S418 of FIG. 5. In steps S610, S613 and S615, processing described in steps S410, S413 and S415 is executed when n=N or when n<N and n+k−1>N.

Thus, the packet processing apparatus of the present reference example includes means (the combination packet transfer unit 113) which can realize collective writing and writes information for restoring a plurality of original packets from a combination packet to the descriptor 1130. According to the present reference example, it is possible to eliminate the need to execute the restoration processing in the reception processing unit 103, the protocol processing unit 104, or the combination packet separation unit 108 in FIG. 41 and it is possible to achieve high reception performance due to the effects of collective writing.

Further, in the present reference example, the software for the reception processing unit 103 and the protocol processing unit 104 in the configuration of FIG. 35 can be used as it is in the packet processing apparatus of the present reference example.

In order to properly perform the collective writing described with reference to FIGS. 9 and 10 in the packet processing apparatus of the present reference example, the transfer management unit 112 (software executed by the processor) needs to secure a buffer area of size N×DB_mux (where DB_mux is the maximum size of a combination packet) in the packet memory 101 in advance. This area securing is equivalent to that in the case of the configuration of FIGS. 38 and 1.

In the packet processing apparatus of the present reference example, the combination packet transfer unit 113 rewrites information of the descriptor 1130 (such as start addresses, received data sizes, and reception completion flags) after collective writing is completed, thus eliminating the need for the restoration processing.

When the restoration processing is realized by the reception processing unit 103, the protocol processing unit 104, or the combination packet separation unit 108 of FIG. 43, it is necessary to provide means for the packet combining unit 106 to notify the reception processing unit 103, the protocol processing unit 104, or the combination packet separation unit 108 of FIG. 43 of information required for the restoration processing (the number of packets combined and the size of each packet).

Further, when the restoration processing is realized by the reception processing unit 103, the protocol processing unit 104, or the combination packet separation unit 108 of FIG. 43, there is a need to take into account that it is sometimes necessary to hold information required for the restoration processing for a plurality of combination packets until reception processing is activated after collective writing is completed.

On the other hand, in the packet processing apparatus of the present reference example, it is not necessary to hold information on a plurality of combination packets because the restoration processing for a combination packet has already been completed when collective writing of the combination packet has been completed. Thus, the scale of hardware in the present reference example is smaller than that when the restoration processing is realized by the reception processing unit 103, the protocol processing unit 104, or the combination packet separation unit 108 of FIG. 43. The same is true for comparison when the processing of restoring a plurality of original packets from a combination packet is implemented by software.

For example, when all components other than the packet memory 101 and the line handling unit 100 are realized by software in the configuration of FIG. 43, it is necessary to hold information required for the restoration processing for a plurality of combination packets (the number of packets combined and the size of each packet) in the packet memory 101 or the like.

On the other hand, when all components other than the packet memory 101 and the line handling unit 100 are realized by software in the configuration of the present reference example, it is not necessary to hold information on a plurality of combination packets (the number of packets combined and the size of each packet). That is, it is only necessary to hold information (the number of packets combined and the size of each packet) required for the restoration processing for only one combination packet in the packet memory 101 or the like.

Namely as compared to the configuration of FIG. 43, the configuration of the present reference example can reduce the capacity (the number of writable bits) of the packet memory 101 or the like for use in holding information required for the restoration processing (the number of packets combined and the size of each packet), thus reducing the scale of required hardware.

Writing information required for the restoration processing to a portion of a combination packet may also be applied as the means for the packet combining unit 106 to notify the reception processing unit 103, the protocol processing unit 104, or the combination packet separation unit 108 of FIG. 43 of information required for the restoration processing. Specifically, a method can be considered in which, for example, a header in which a packet size or the like is written is added in front of each packet combined and the added header is written together with packet data in order to notify of the size of each packet combined. However, in this case, a part of the bandwidth of a bus used for the collective writing is occupied by the information required for the restoration processing, such that the effective bandwidth originally available for writing of packet data is reduced, and as a result, the performance of the collective writing deteriorates.

In the packet processing apparatus of the present reference example, information required for the restoration processing can be held in a memory other than the packet memory 101 which does not use the bus to which the packet memory 101 is connected (a memory which permits only writing by the packet combining unit 110 and reading by the combination packet transfer unit 113), such that the deterioration of the effective bandwidth described above does not occur.

As a modification of the present reference example, areas for rewrite execution flags indicating whether or not start addresses have been rewritten may be added to the descriptor 1130, similar to the first reference example. In this case, upon rewriting start addresses in the descriptor 1130 through the processing of step S614 of FIG. 10, the combination packet transfer unit 113 changes the corresponding rewrite execution flags in the descriptor 1130 from "not rewritten" to "rewritten."

The combination packet transfer unit 113 may also prepare areas for writing changed start addresses in the descriptor 1130 separately from the areas for start addresses written by the transfer management unit 112 (software executed by the processor), similar to the first reference example.

The present reference example may also have a configuration in which the packet combining unit 110 determines the types of packets and groups packets of the same type into a combination packet or a configuration in which a plurality of descriptors 1130 are selectively used according to the packet type. With a configuration in which a descriptor 1130 is prepared for each packet type and a plurality of descriptors 1130 are selectively used according to the packet type, it becomes easier to perform different reception processing for each packet type.

The present reference example may also have a configuration in which a plurality of descriptors 1130 are selectively used for each core of a processor which has a plurality of CPU cores or a configuration in which a plurality of descriptors 1130 are selectively used for each virtual machine. The configuration in which a plurality of descriptors 1130 are selectively used for each CPU core or each virtual machine improves the performance of write and read processing by software as compared to when there is only one descriptor 1130 or the like.

First Embodiment

Hereinafter, embodiments of the present invention will be described with reference to the drawings. The first and second reference examples have been described assuming the case where received packets are transferred to the packet memory. However, in a packet processing apparatus according to embodiments of the present invention, when data which is a result of certain processing performed on a received packet is transferred to a memory, instead of when received packets are transferred to the packet memory, a plurality of pieces of data which are results of the processing are concatenated and collectively DMA-transferred or collectively written to the memory.

Figure 11:
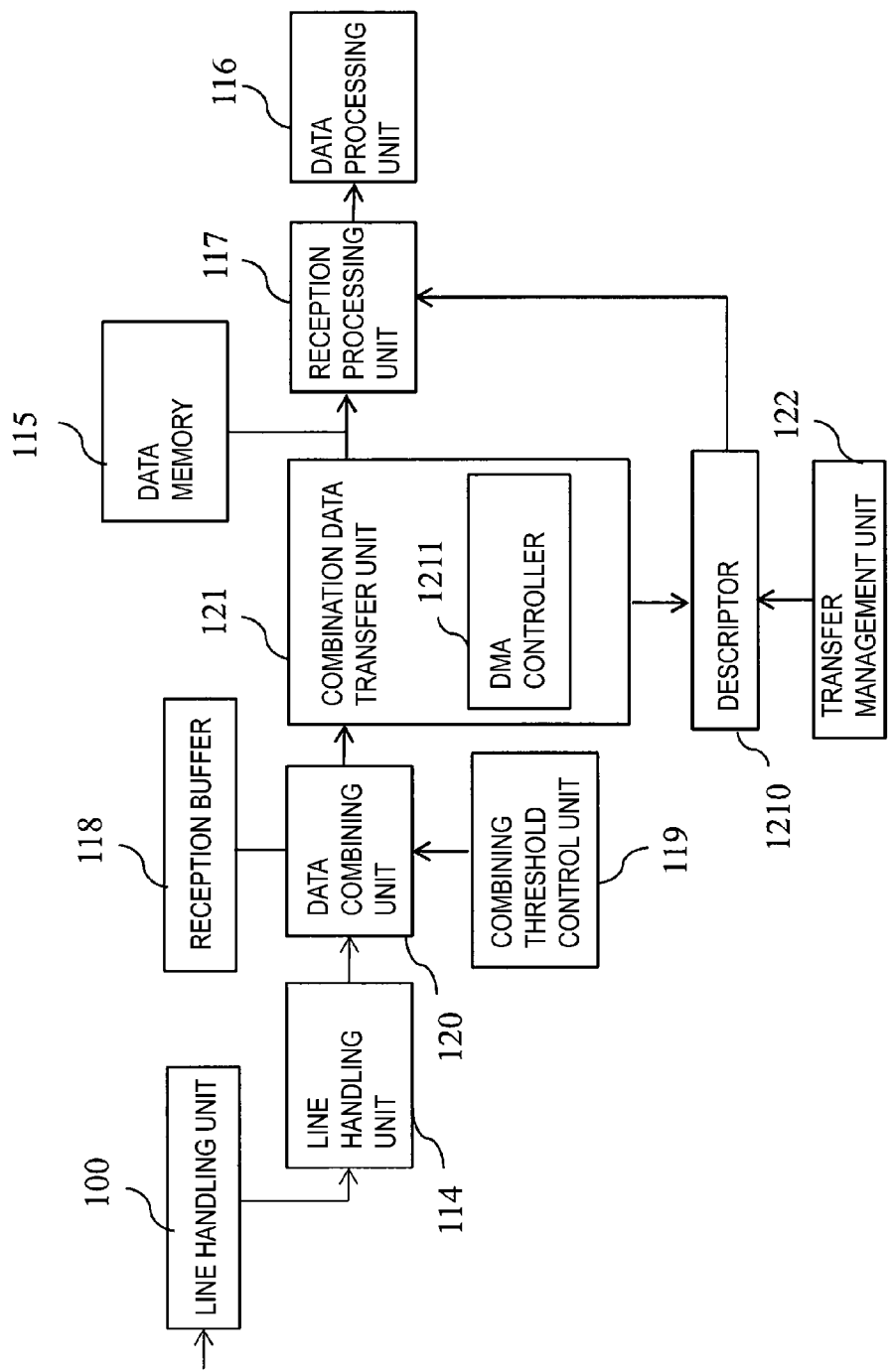
FIG. 11 is a block diagram illustrating a configuration of a packet processing apparatus according to a first embodiment of the present invention.

FIG. 11 is a block diagram illustrating a configuration of a packet processing apparatus according to a first embodiment of the present invention. The packet processing apparatus of FIG. 11 includes a line handling unit 100, a packet processing unit 114, a data memory 115, a data processing unit 116, a reception processing unit 117, a reception buffer 118, a combining threshold control unit 119, a data combining unit 120, a combination data transfer unit 121, and a transfer management unit 122. The line handling unit 100 is connected to a communication line (not illustrated) and receives data from the communication line. The packet processing unit 114 performs processing on a packet received from the communication line and outputs data which is a result of the processing. The data output from the packet processing unit 114 is stored in the data memory 115. The data processing unit 116 performs processing on the data stored in the data memory 115. The reception processing unit 117 passes the data stored in the data memory 115 to the data processing unit 116. The reception buffer 118 is a reception buffer for data combining. A threshold for regulating the size of each data block is preset in the combining threshold control unit 119. The data combining unit 120 concatenates a plurality of pieces of data output from the packet processing unit 114 to generate a data block. The combination data transfer unit 121 DMA-transfers the data block generated by the data combining unit 120 to the data memory 115. The transfer management unit 122 performs initial setting of a descriptor 1210 which is a predetermined data area in a memory. The transfer management unit 122 may be configured as a part of the reception processing unit 117.

The configuration of FIG. 11 differs from that of FIG. 1 in that the packet processing unit 114 is added and the packet memory 101, the reception processing unit 103, the protocol processing unit 104, the reception buffer 105, the combining threshold control unit 107, the packet combining unit 110, the combination packet transfer unit 11, and the transfer management unit 112 are replaced respectively with the data memory 115, the reception processing unit 117, the data processing unit 116, the reception buffer 118, the combining threshold control unit 119, the data combining unit 120, the combination data transfer unit 121, and the transfer management unit 122.

The line handling unit 100 is equivalent to that in the configuration of FIG. 1.

The packet processing unit 114 performs processing on a packet output by the line handling unit 100 and outputs data which is a result of the processing. Content of processing that can be considered here includes various processing such as, for example, processing of extracting and outputting data of a predetermined size measured from the beginning of a packet when the length of the packet has exceeded a predetermined size, processing of extracting and outputting specific data such as an Internet Protocol (IP) header, and processing of counting up the number of packets for each packet type and outputting updated counter information.

The data combining unit 120 transfers data output by the packet processing unit 114 to the reception buffer 118 for data combining. At this time, the data combining unit 120 stores a piece of data output by the packet processing unit 114 in the reception buffer 118 such that the piece of output data and pieces of data already stored in the reception buffer 118 are concatenated into one data block. Then, when the size of the data block in the reception buffer 118 has exceeded the threshold set in the combining threshold control unit 119, the data combining unit 120 issues a request to transfer the data block to the data memory 115.

Here, the data combining unit 120 may also issue a transfer request when a timeout has occurred (such as when the reception interval between packets has exceeded a predetermined period) before the size of the data block in the reception buffer 118 has exceeded the threshold.

The data combining unit 120 records the number of pieces of data combined in the reception buffer 118 and the size of each piece of data and notifies the combination data transfer unit 121 of the number of pieces of data combined and the size of each piece of data when issuing a request to transfer the data block.

Here, notification of the size of data can be omitted if the size of each piece of data output by the packet processing unit 114 is a predetermined constant value (does not change for each packet). However, in that case, it is still necessary to notify of the number of pieces of data combined, for example, when a transfer has occurred due to a timeout.

The combination data transfer unit 121 includes a DMA controller 1211. The combination data transfer unit 121 transfers a data block into which a plurality of pieces of data have been combined to the data memory 115 through one DMA transfer, generates a hardware interrupt, and issues a request to activate the reception processing unit 117.

Here, the combination data transfer unit 121 may not generate a hardware interrupt to the processor (not illustrated) of the packet processing apparatus.

The combination data transfer unit 121 writes the size of each piece of data and the like to the descriptor 1210 which has been prepared for each piece of data by the transfer management unit 122 (software executed by the processor) using information on the number of pieces of data combined and the size of each piece of data of which the data combining unit 120 has notified. The configuration of the descriptor 1210 corresponds to that of the descriptor 1110 in FIG. 2 described above with "packet" replaced with "data." Thus, the reference signs of FIG. 2 will be used in the following description.

Upon detecting an activation request, the reception processing unit 117 reads data from the data memory 115 based on address information and size information written to the descriptor 1210 prepared for each piece of data and passes the data to the data processing unit 116. At the same time, the reception processing unit 117 secures a new area for the data memory 115 in the memory of the packet processing apparatus in order to replenish the portion of the data memory passed to the data processing unit 116. The operation of the reception processing unit 117 is equivalent to that of the configuration of FIG. 42 and it is not necessary to implement the combination data separation unit 108b required in the configuration of FIG. 42 (the processing of restoring a plurality of original pieces of data from a data block into which the plurality of pieces of data have been combined is performed by the combination data transfer unit 121).

The data processing unit 116 performs necessary processing on the data received from the reception processing unit 117. Then, when the necessary processing has been completed, the data processing unit 116 releases an area of the data memory 115 in which the data passed from the reception processing unit 117 is stored.

The reception processing unit 117, the data processing unit 116, and the transfer management unit 122 can be realized by software that runs on a general-purpose personal computer or a workstation or can be realized by hardware such as an FPGA that runs in cooperation with a program.

The data memory 115 can be configured as a memory on a personal computer, a communication device, or a communication board.

The line handling unit 100, the packet processing unit 114, the combining threshold control unit 119, the data combining unit 120, and the combination data transfer unit 121 can be made of an FPGA or the like on a communication device or a communication board.

The reception buffer 118 can be made of a storage area included in an FPGA or the like on a communication device or a communication board or a storage circuit such as a FIFO.

Figure 12:
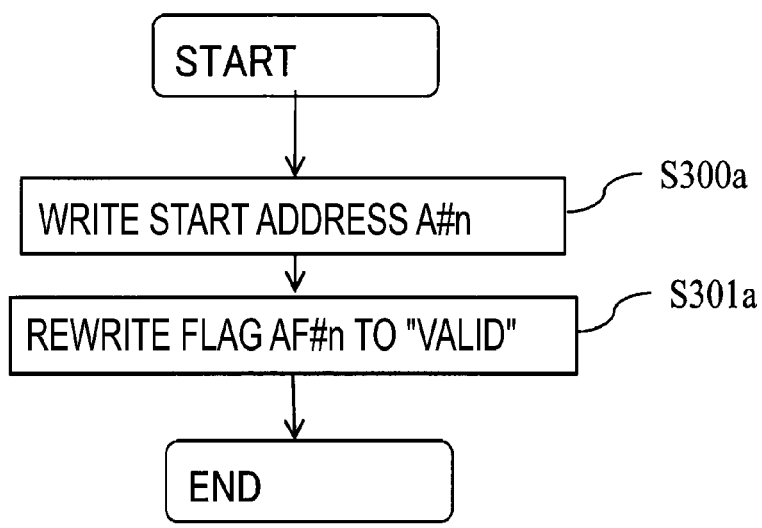
FIG. 12 is a flowchart illustrating an operation of a transfer management unit in the packet processing apparatus according to the first embodiment of the present invention.
Figure 14:
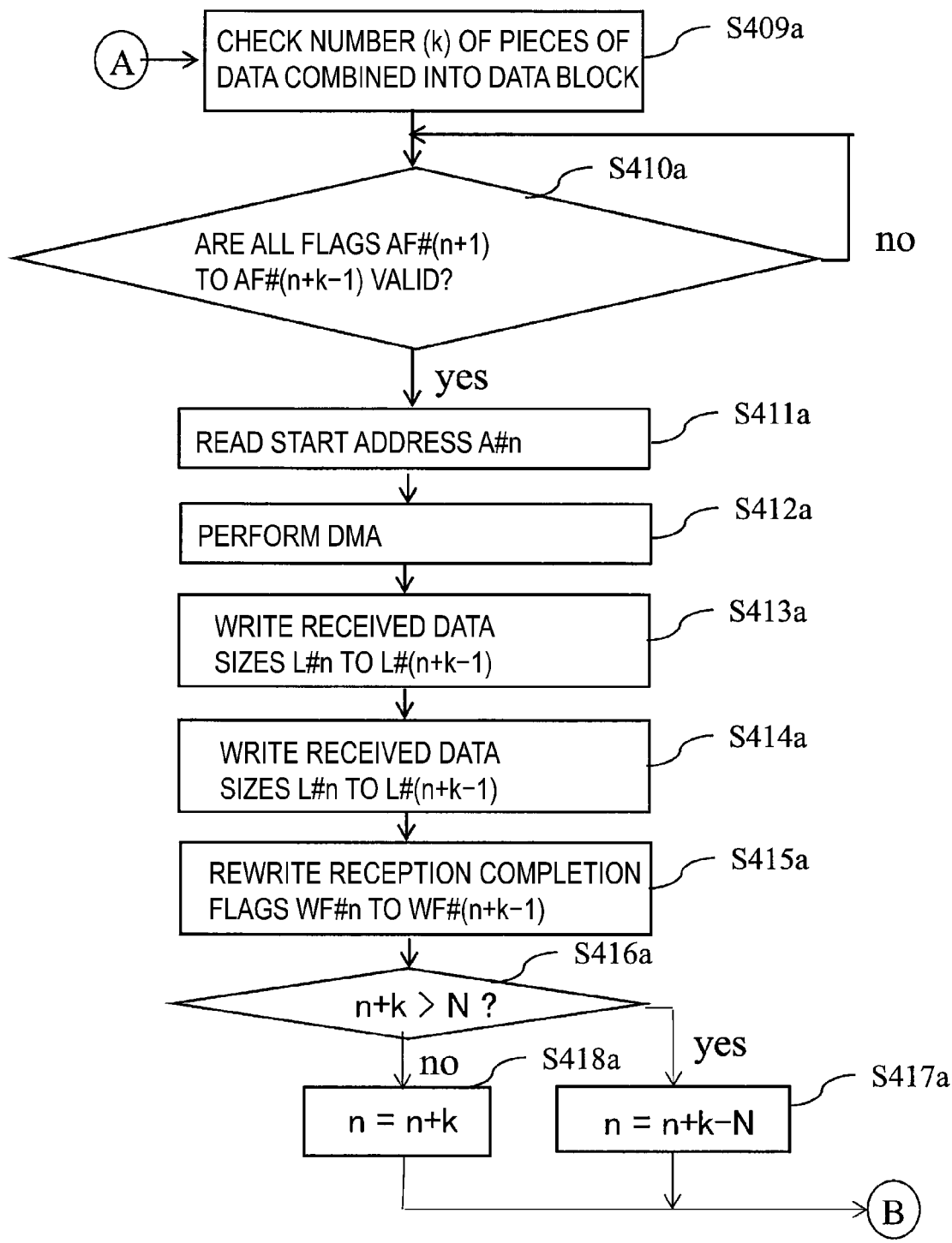
FIG. 14 is a flowchart illustrating an operation of the DMA controller in the packet processing apparatus according to the first embodiment of the present invention.
Figure 15:
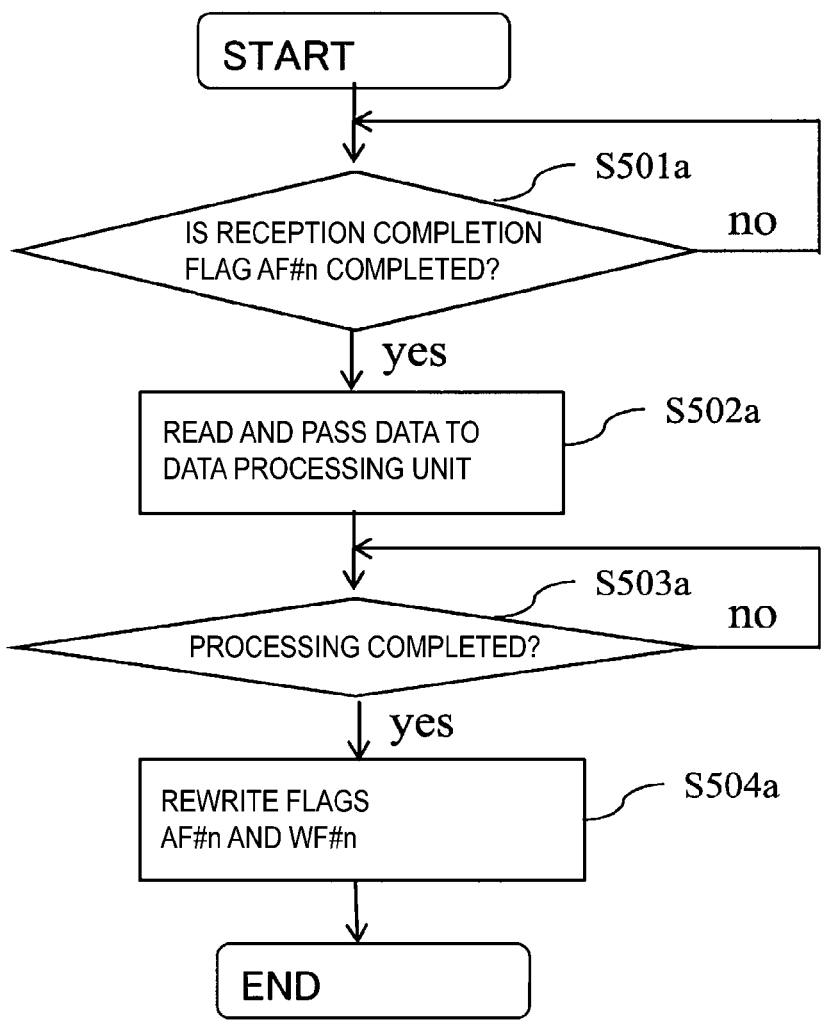
FIG. 15 is a flowchart illustrating an operation of a reception processing unit in the packet processing apparatus according to the first embodiment of the present invention.

Next, an exemplary operation of the present embodiment using the descriptor 1210 will be described with reference to FIGS. 11 to 15. FIG. 12 is a flowchart illustrating an operation of the transfer management unit 122, FIGS. 13 and 14 are flowcharts illustrating operations of the DMA controller 1211, and FIG. 15 is a flowchart illustrating an operation of the reception processing unit 117.

First, the transfer management unit 122 (software executed by the processor) determines addresses of beginnings of N pieces of data in the data memory 115, that is, start addresses A #n (where n is 1 to N) of write destinations of the pieces of data, and writes the determined addresses to the descriptor 1210 as an initial setting of the packet processing apparatus (step S300a in FIG. 12). Further, the transfer management unit 122 rewrites the valid flags AF #n indicating whether or not the start addresses A #n are valid from "invalid" to "valid" (step S301a in FIG. 12). Similar to the descriptor 1110, the descriptor 1210 has N sets of prepared areas for writing information such as the start addresses.

Figure 13:
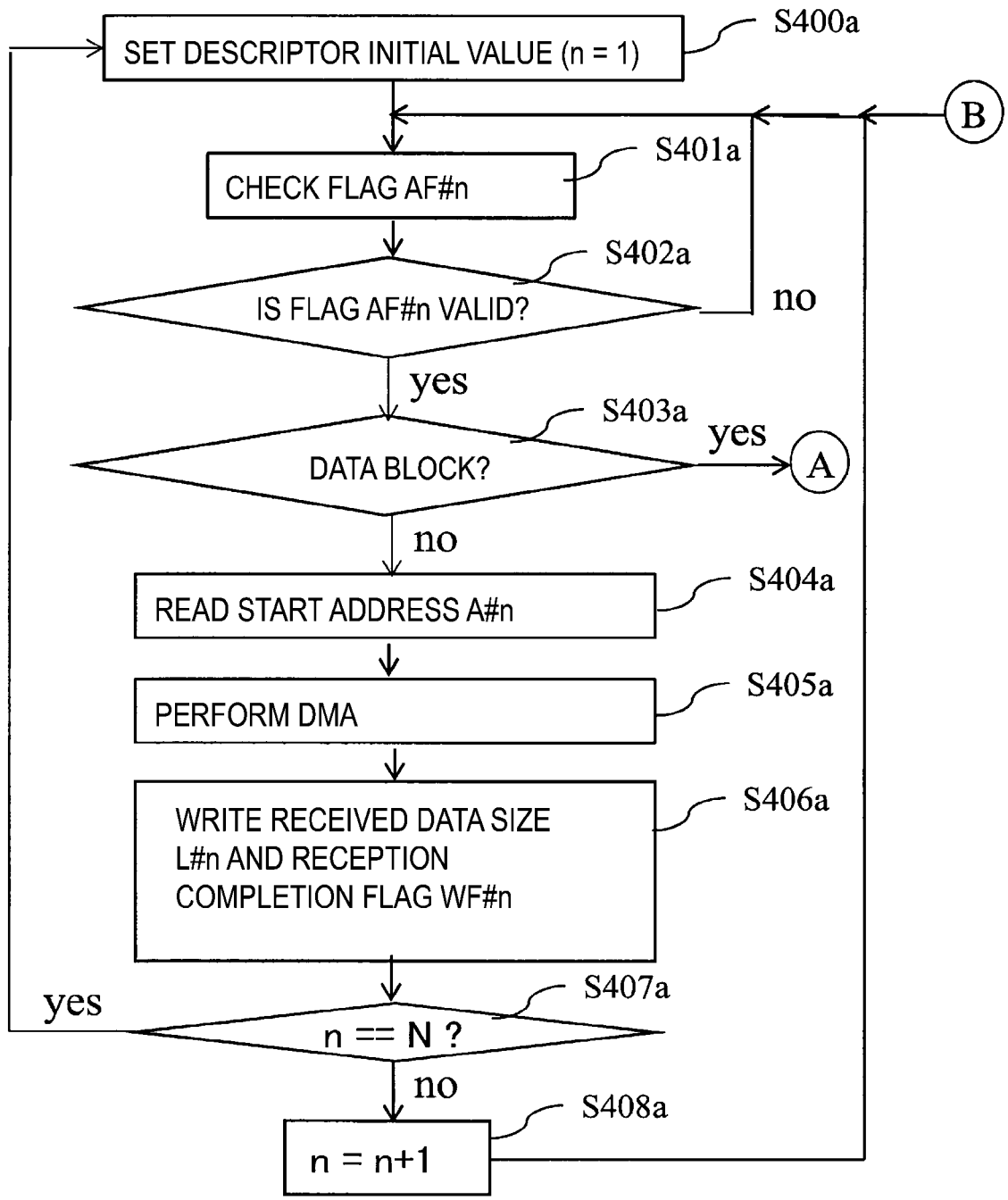
FIG. 13 is a flowchart illustrating an operation of a DMA controller in the packet processing apparatus according to the first embodiment of the present invention.

First, the DMA controller 1211 in the combination data transfer unit 121 initializes a variable n indicating the order of reading and writing from and to the descriptor 1210 to 1 (step S400a in FIG. 13).

Then, when the data combining unit 120 has issued a transfer request, the DMA controller 1211 checks an nth valid flag AF #n in the descriptor 1210 (step S401a in FIG. 13).

When the valid flag AF #n indicates that an nth start address A #n is "valid" (yes in step S402a of FIG. 13), the DMA controller 1211 checks information from the data combining unit 120 (the number of pieces of data combined and the size of each piece of data) and checks whether data to be transferred to the data memory 115 is a single piece of data which has not been combined or a data block (step S403a in FIG. 13).

When the data to be transferred to the data memory 115 is not a data block (when the number of pieces of data combined is 1), the DMA controller 1211 reads the nth start address A #n confirmed as "valid" by the corresponding valid flag AF #n from the descriptor 1210 (step S404a in FIG. 13) and performs a DMA transfer to write a corresponding nth piece of data to an area starting from the start address A #n in the data memory 115 (step S405a in FIG. 13).

After completing this DMA transfer, the DMA controller 1211 writes a received data size L #n indicating the data length of the nth piece of data to the descriptor 1210 and rewrites a reception completion flag WF #n set in the descriptor 1210 indicating that writing of the nth piece of data has been completed from "not completed" to "completed" (step S406a in FIG. 13).

The DMA controller 1211 determines whether or not the variable n is equal to N (step S407a in FIG. 13). When the variable n has not reached N (no in step S407a), the DMA controller 1211 increments the variable n by 1 (step S408a in FIG. 13) and returns to step S401a. When the variable n has reached N (yes in step S407a), the DMA controller 1211 returns to step S400a.

Similar to the first reference example, the order in which the valid flags AF #1 to AF #N are checked is predetermined. For example, in the examples of FIGS. 2 and 13, the DMA controller 1211 checks the valid flags in the order of the first valid flag AF #1, the second valid flag AF #2, . . . , and the Nth valid flag AF #N. After checking all valid flags, the DMA controller 1211 initializes the variable n to 1 (step S400a) and checks again the valid flags in order from the first valid flag AF #1.

On the other hand, when the data to be transferred to the data memory 115 is a data block (when the number k of pieces of data combined is 2 or more), the DMA controller 1211 checks the number k of pieces of data combined (step S409a in FIG. 14) and checks "k-1" valid flags AF #(n+1) to AF #(n+k-1) in the descriptor 1210 (step S410a in FIG. 14).

Similar to the first reference example, when n=N, the DMA controller 1211 checks the valid flags AF #1 to AF #(k-1). When n<N and n+k-1>N, the DMA controller 1211 checks the valid flags AF #(n+1) to AF #N and AF #1 to AF #(k-1-(N-n)).

When all k valid flags checked in the processing of steps S402a and S410a are "valid" (yes in step S410a), the DMA controller 1211 reads an nth start address A #n corresponding to the first valid flag AF #n among the k checked valid flags from the descriptor 1210 (step S411a in FIG. 14) and performs a DMA transfer to write a corresponding data block to an area starting from the start address A #n in the data memory 115 (step S412a in FIG. 14).

After completing this DMA transfer, the DMA controller 1211 writes to the descriptor 1210 received data sizes L #n to L #(n+k-1) indicating the data lengths of pieces of data constituting the data block DMA-transferred to the data memory 115 based on information of which the data combining unit 120 has notified (the size of each piece of data combined) (step S413a in FIG. 14).

Similar to the first reference example, when n=N, the DMA controller 1211 writes the received data sizes L #n and L #1 to L #(k-1) to the descriptor 1210. When n<N and n+k−1>N, the DMA controller 1211 writes the received data sizes L #n, L #(n+1) to L #N, and L #1 to L #(k−1−(N−n)) to the descriptor 1210.

Subsequently, the DMA controller 1211 rewrites "k−1" start addresses A #(n+1) to A #(n+k−1) in the descriptor 1210 according to the data lengths of the first "k−1" pieces of data among the k pieces of data constituting the data block (step S414a in FIG. 14).

Specifically, the DMA controller 1211 rewrites the start address A #(n+1) to a value obtained by adding the start address A #n and the data length of the first piece of data among the k pieces of data constituting the data block (a value indicated by the received data size L #n). Further, the DMA controller 1211 rewrites the start address A #(n+k−1) to a value obtained by adding the start address A #(n+k−2) and the data length of the "k−1"th piece of data among the k pieces of data constituting the data block (a value indicated by the received data size L #(n+k−2)).

In this way, the DMA controller 1211 rewrites a start address A #i to a value obtained by adding an immediately previous start address A #(i−1) and the data length of an "i−1"th piece of data among the pieces of data constituting the data block.

Next, the DMA controller 1211 rewrites reception completion flags WF #n to WF #(n+k−1) corresponding to the pieces of data constituting the data block DMA-transferred to the data memory 115 from "not completed" to "completed" (step S415a in FIG. 14).

Similar to the first reference example, when n=N, the DMA controller 1211 rewrites the reception completion flags WF #n and WF #1 to WF #(k−1) from "not completed" to "completed." When n<N and n+k−1>N, the DMA controller 1211 rewrites the reception completion flags WF #n, WF #(n+1) to WF #N, and WF #1 to WF #(k−1−(N−n)) to "completed."

Then, the DMA controller 1211 checks whether or not n+k>N is satisfied (step S416a in FIG. 14), and when n+k is larger than N, sets the variable n such that n=n+k−N (step S417a in FIG. 14) and returns to step S401a. When n+k is N or less, the DMA controller 1211 sets the variable n such that n=n+k (step S418a in FIG. 14) and returns to step S401a.

In the DMA transfer of the present embodiment, a data block into which k pieces of data have been concatenated is collectively transferred to the data memory 115 and information on start addresses in the descriptor 1210 is partially rewritten in the above manner, thereby notifying the processor of the packet processing apparatus (the reception processing unit 117 and the data processing unit 116) of addresses where the beginnings of the pieces of data have been written.

The reception processing unit 117 (software executed by the processor) periodically checks the reception completion flags WF #n (where n is 1 to N) of the descriptor 1210, and when a reception completion flag WF #n indicates "completed" (yes in step S501a in FIG. 15), reads an nth piece of data from the data memory 115 based on information on a corresponding nth start address A #n and a corresponding received data size L #n and passes the read nth piece of data to the data processing unit 116 (step S502a in FIG. 15).

After necessary processing has been performed by the data processing unit 116 (yes in step S503a in FIG. 15), the reception processing unit 117 (software executed by the processor) rewrites an nth valid flag AF #n in the descriptor 1210 corresponding to the nth piece of data for which the processing has been completed from "valid" to "invalid" and rewrites the nth reception completion flag WF #n in the descriptor 1210 from "completed" to "not completed" (step S504a in FIG. 15).

Similar to the first reference example, the descriptor 1210 has (a set of) N areas of reception completion flags WF #1 to WF #N, while the order in which the reception completion flags WF #1 to WF #N are checked is predetermined.

Instead of periodically checking the reception completion flags WF #n in the descriptor 1210, the DMA controller 1211 may issue an interrupt processing request to the processor after completion of a DMA transfer and the reception processing unit 117 (software executed by the processor) may check the reception completion flags WF #n (where n is 1 to N) of the descriptor 1210 in response to the interrupt processing request.

As described above, the packet processing apparatus of the present embodiment includes the combination data transfer unit 121 having built-in means (the DMA controller 1211) which can realize collective DMA transfer and writes information for restoring a plurality of original pieces of data from a data block to the descriptor 1210. Because the DMA controller 1211 can be implemented by hardware, it is not necessary to execute the restoration processing by software and it is possible to achieve high reception performance due to the effects of collective DMA transfer.

Figure 42:
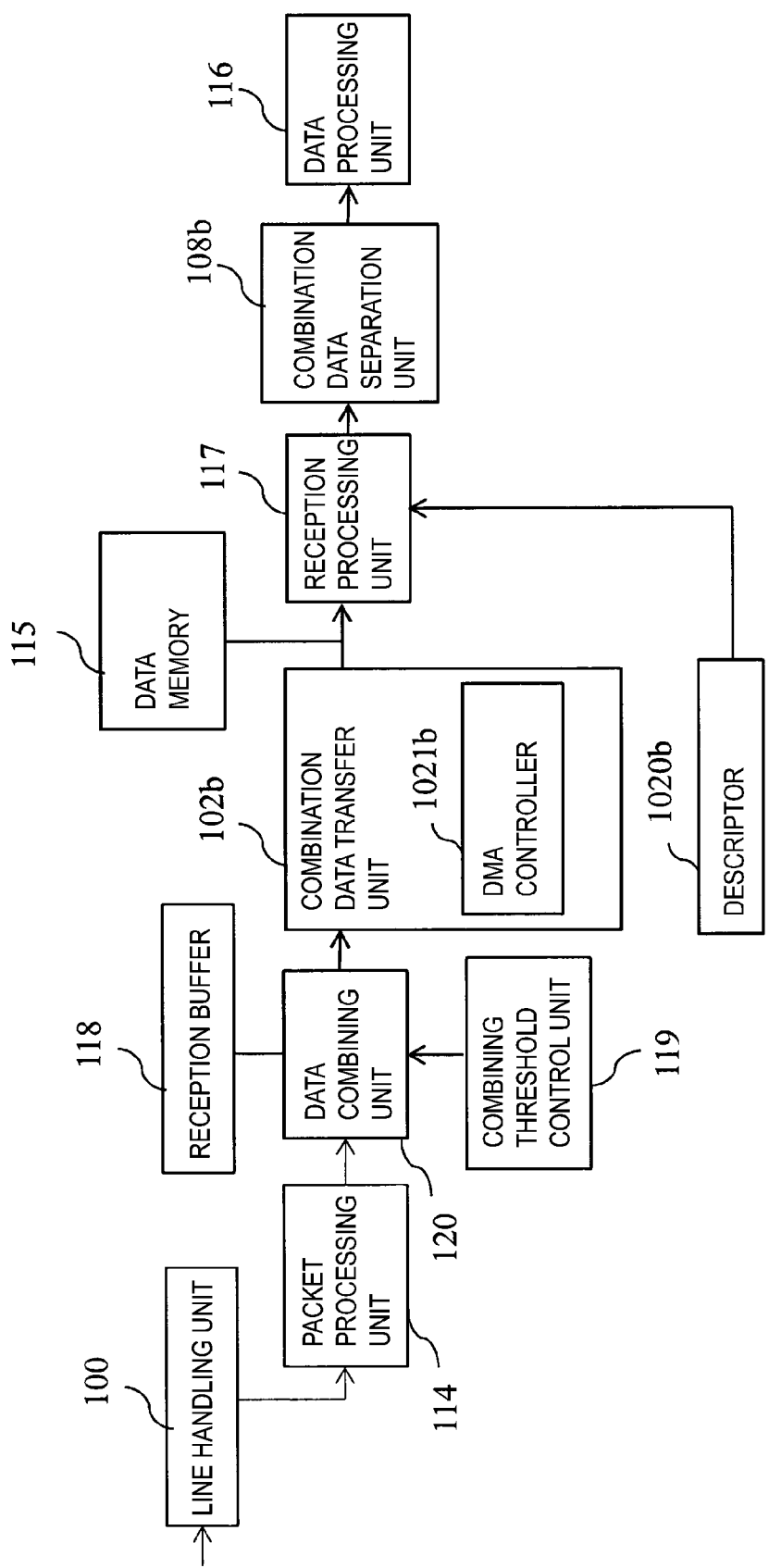
FIG. 42 is a block diagram illustrating another configuration of a packet processing apparatus of the related scheme.

Compared to when the processor (software) executes the processing of restoring a plurality of original pieces of data from a data block into which the pieces of data have been combined in the packet processing apparatus of the related scheme having the configuration of FIG. 42, the present embodiment has advantages that the processing of the processor required to process one piece of data (processing for one packet) becomes lighter and the reception performance is improved (the number of pieces of data that can be processed per unit time increases) because the restoration processing does not need to be performed by the processor (software). The present embodiment also has an advantage that power consumption of the processor required to process one piece of data (processing for one packet) is reduced.

Further, in the present embodiment, the software for the reception processing unit 117 and the data processing unit 116 in the configuration of FIG. 42 can be used as it is in the packet processing apparatus of the present embodiment. This indicates that the improvement of the reception performance through collective DMA can be achieved simply by changing the hardware (DMA controller 1211).

When the restoration processing is realized by hardware of the reception processing unit 117, the data processing unit 116, or the combination data separation unit 108b of FIG. 42, it is necessary to provide means for the data combining unit 120 to notify the reception processing unit 117, the data processing unit 116, or the combination data separation unit 108b of FIG. 42 of information required for the restoration processing (the number of pieces of data combined and the size of each piece of data).

Further, when the restoration processing is realized by hardware of the reception processing unit 117, the data processing unit 116, or the combination data separation unit 108b of FIG. 42, there is a need to take into account that it is sometimes necessary to hold information required for the restoration processing for a plurality of data blocks until reception processing is activated after a DMA transfer is completed.

On the other hand, in the packet processing apparatus of the present embodiment, it is not necessary to hold information on a plurality of data blocks because the restoration processing for a data block has already been completed when a DMA transfer of the data block has been completed. Thus, the scale of hardware in the present embodiment is smaller than that when the restoration processing is realized by hardware of the reception processing unit 117, the data processing unit 116, or the combination data separation unit 108b of FIG. 42.

Writing information required for the restoration processing to a portion of a data block may also be applied as the means for the data combining unit 120 to notify the reception processing unit 117, the data processing unit 116, or the combination data separation unit 108b of FIG. 42 of information required for the restoration processing. Specifically, a method can be considered in which, for example, a header in which a data size or the like is written is added in front of each piece of data combined and the added header is DMA-transferred together with data in order to notify of the size of each piece of data combined.

However, if information required for the restoration processing is written to a portion of a data block, a part of the bandwidth of a bus used for the DMA transfer is occupied by the information required for the restoration processing, such that the effective bandwidth originally available for transfer of data is reduced, and as a result, a problem arises that the performance of the DMA transfer deteriorates.

In the packet processing apparatus of the present embodiment, such effective bandwidth deterioration does not occur because it is not necessary to write information required for the restoration processing to a data block.

In the present embodiment, an example in which the combination data transfer unit 121 is realized by hardware has been illustrated. However, at least a part of the processing of the combination data transfer unit 121 may be implemented by software and a processor other than the processor used for the reception processing. When at least a part of the processing of the combination data transfer unit 121 is realized by software in this way, it is also not necessary for the reception processing unit 117 or the data processing unit 116 to perform the processing of restoring a plurality of original pieces of data from a data block, such that it is possible to achieve high reception performance due to the effects of collective DMA transfer.

When at least a part of the processing of the combination data transfer unit 121 is realized by software, it is also possible to achieve the advantage of reducing the scale of hardware required for the processing of restoring a plurality of original pieces of data from a data block (which is an advantage due to not having to hold information on a plurality of data blocks) and the advantage of not deteriorating the effective bandwidth available for data transfer (which is an advantage due to not adding information required for the restoration processing to a portion of a data block), similar to when the combination data transfer unit 121 is realized by hardware.

Further, the present embodiment may have a configuration in which a plurality of DMA controllers 1211 and a plurality of descriptors 1210 corresponding to the DMA controllers 1211 are provided. The present embodiment may also have a configuration in which the data combining unit 120 determines the types of pieces of data and group pieces of data of the same type into a data block or a configuration in which a plurality of DMA controllers 1211 and a plurality of descriptors 1210 are selectively used according to the data type.

With a configuration in which a DMA controller 1211 and a descriptor 1210 are prepared for each data type and a plurality of DMA controllers 1211 and a plurality of descriptors 1210 are selectively used according to the data type, it becomes easier to perform different reception processing for each data type.

The present embodiment may also have a configuration in which a plurality of DMA controllers 1211 and a plurality of descriptors 1210 are selectively used for each core of a processor which has a plurality of CPU cores or a configuration in which a plurality of DMA controllers 1211 and a plurality of descriptors 1210 are selectively used for each virtual machine.

With the configuration in which a plurality of DMA controllers 1211 and a plurality of descriptors 1210 are selectively used for each CPU core or each virtual machine, it is possible to improve the performance of reception processing by software as compared to when there is only one DMA controller or the like.

Second Embodiment

Figure 16:
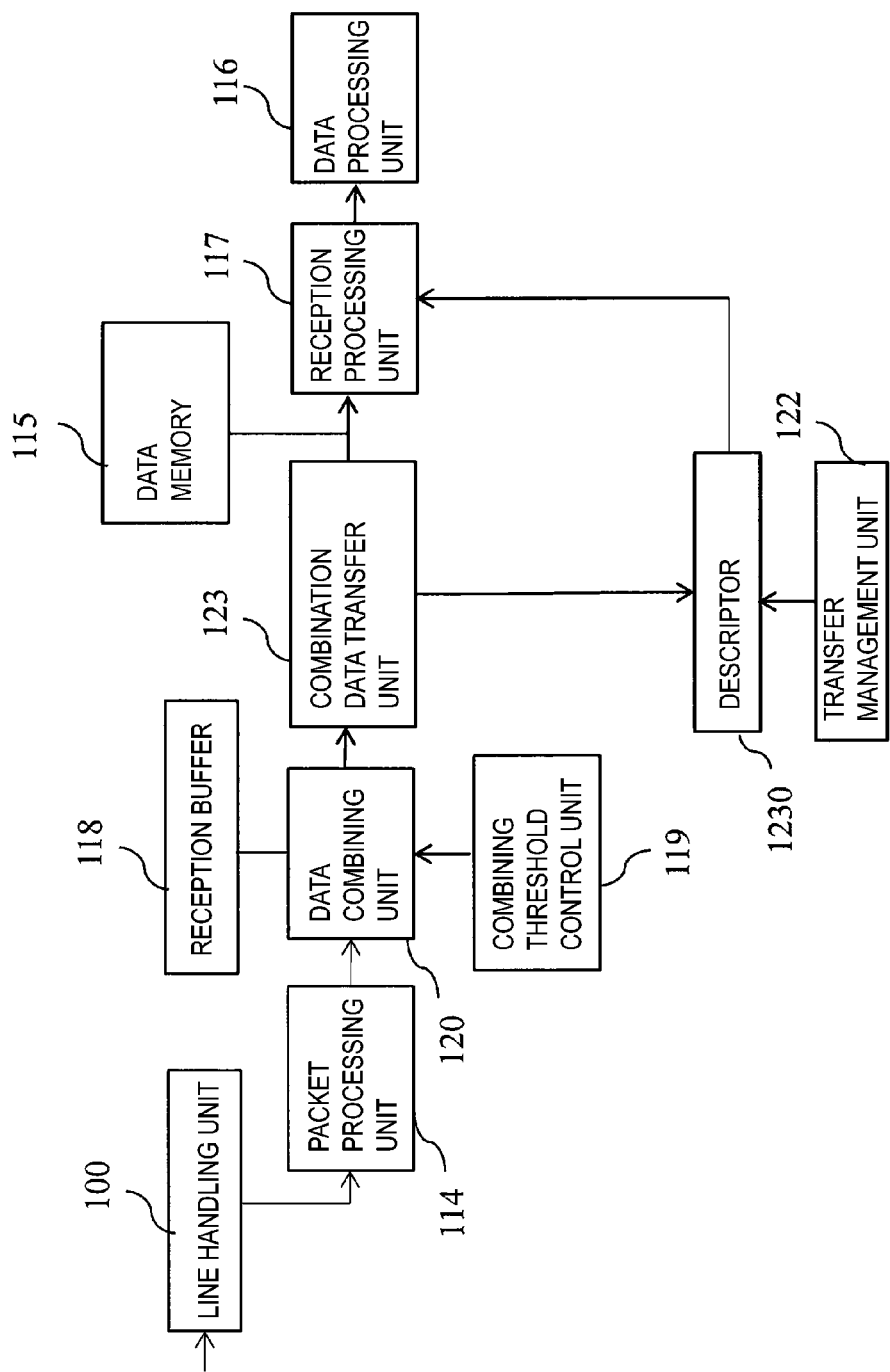
FIG. 16 is a block diagram illustrating a configuration of a packet processing apparatus according to a second embodiment of the present invention.

Next, a second embodiment of the present invention will be described. FIG. 16 is a block diagram illustrating a configuration of a packet processing apparatus according to the second embodiment of the present invention. The packet processing apparatus of FIG. 16 includes a line handling unit 100, a packet processing unit 114, a data memory 115, a data processing unit 116, a reception processing unit 117, a reception buffer 118, a combining threshold control unit 119, a data combining unit 120, a transfer management unit 122, and a combination data transfer unit 123.

The configuration of FIG. 16 differs from that of FIG. 11 in that the transfer means in FIG. 11 is replaced with writing means implemented by the processor (software) of the packet processing apparatus. That is, in the present embodiment, the combination data transfer unit 121 of FIG. 11 is replaced with the combination data transfer unit 123 implemented by software.

The line handling unit 100, the data memory 115, the data processing unit 116, the reception processing unit 117, the reception buffer 118, the combining threshold control unit 119, and the transfer management unit 122 are equivalent to those in the configuration of FIG. 11.

The data combining unit 120 in FIG. 16 transfers data output by the packet processing unit 114 to the reception buffer 118 for data combining. At this time, the data combining unit 120 stores a piece of data output by the packet processing unit 114 in the reception buffer 118 such that the piece of output data and pieces of data already stored in the reception buffer 118 are combined into one data block. Then, when the size of the data block in the reception buffer 118 has exceeded the threshold set in the combining threshold control unit 119, the data combining unit 120 issues a request to transfer the data block to the data memory 115.

Here, the data combining unit 120 may also issue a transfer request when a timeout has occurred (such as when the interval between packets has exceeded a predetermined period) before the size of the data block in the reception buffer 118 has exceeded the threshold.

The data combining unit 120 records the number of pieces of data combined in the reception buffer 118 and the size of each piece of data and notifies the combination data transfer unit 123 of information on the number of pieces of data combined and the size of each piece of data when issuing a request to transfer the data block.

Here, notification of the size of data can be omitted if the size of each piece of data output by the packet processing unit 114 is a predetermined constant value (does not change for each packet). However, in that case, it is still necessary to notify of the number of pieces of data combined, for example, when a transfer has occurred due to a timeout.

The combination data transfer unit 123 (software executed by the processor) writes a data block into which a plurality of pieces of data have been combined to the data memory 115 and issues a request to activate the reception processing unit 117. The combination data transfer unit 123 (software executed by the processor) writes information such as the size of each piece of data to the descriptor 1230 which has been prepared for each piece of data by the transfer management unit 122 (software executed by the processor) using information on the number of pieces of data combined and the size of each piece of data of which the data combining unit 120 has notified.

The configuration of the descriptor 1230 is equivalent to that of the descriptor 1210 of the first embodiment. However, the present embodiment differs in that the combination data transfer unit 123 (software executed by the processor), instead of the combination data transfer unit 121, performs writing to the descriptor 1230.

Figure 17:
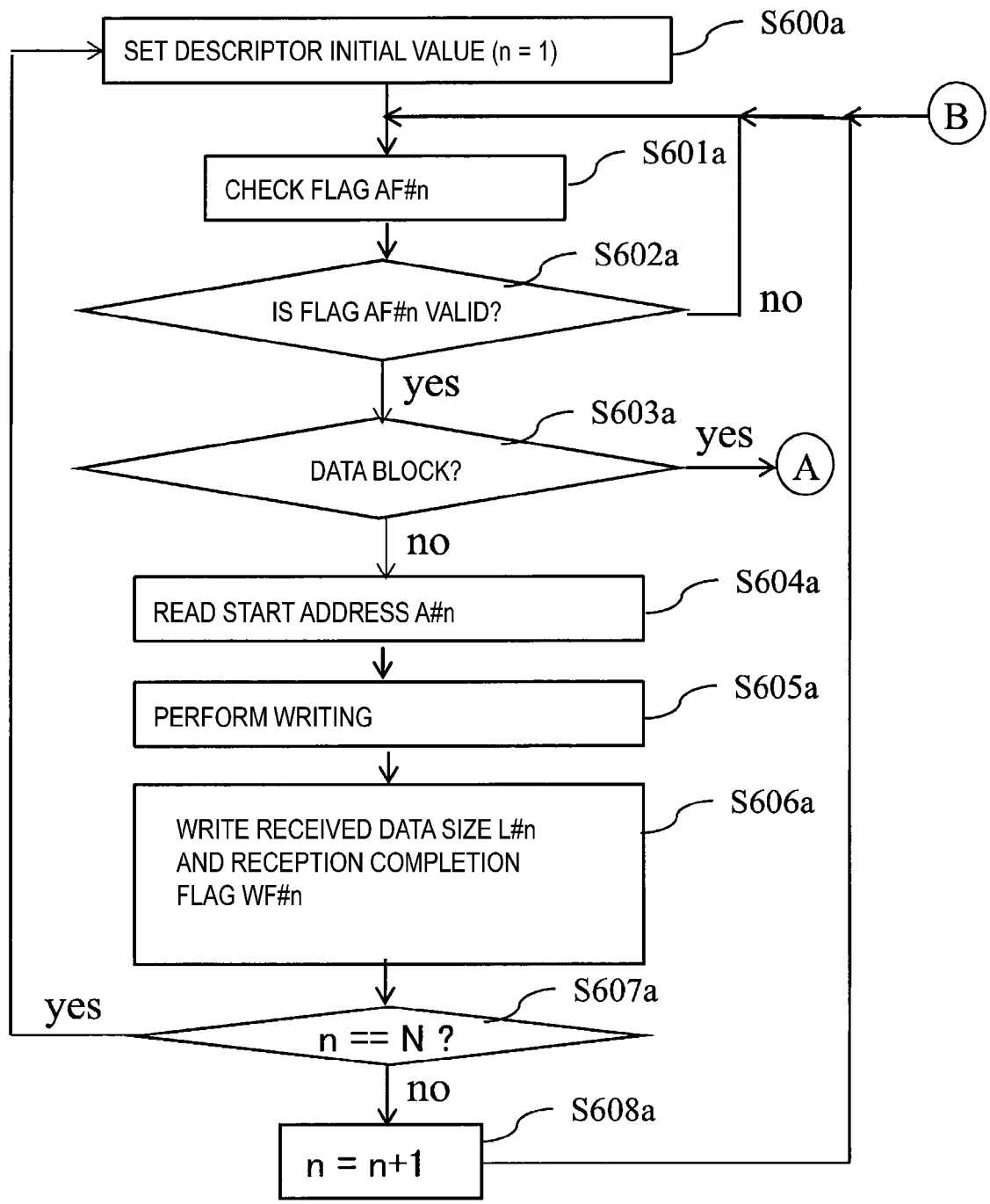
FIG. 17 is a flowchart illustrating an operation of a combination data transfer unit in the packet processing apparatus according to the second embodiment of the present invention.
Figure 18:
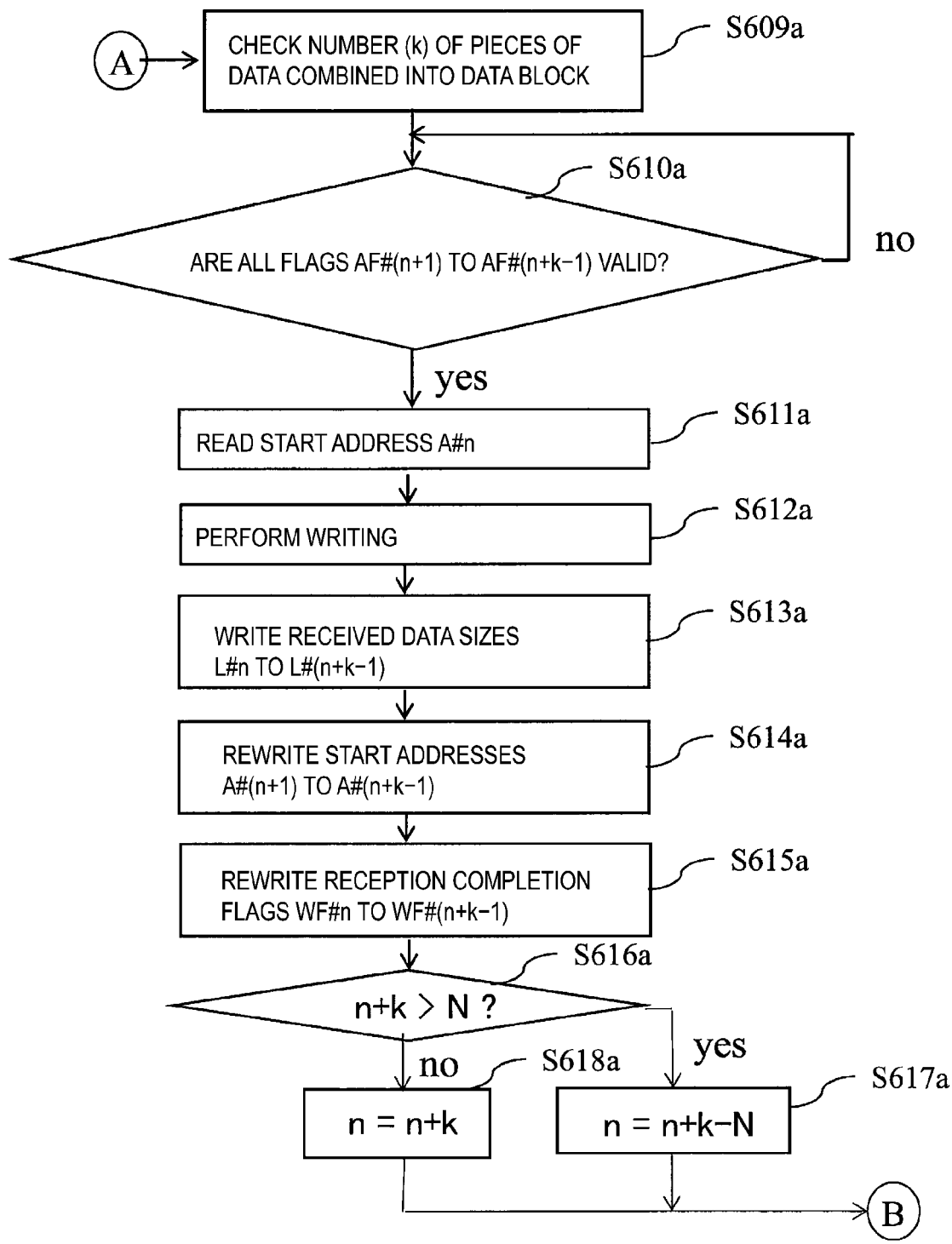
FIG. 18 is a flowchart illustrating an operation of the combination data transfer unit in the packet processing apparatus according to the second embodiment of the present invention.

FIGS. 17 and 18 are flowcharts illustrating operations of the combination data transfer unit 123 (software executed by the processor). First, the combination data transfer unit 123 initializes a variable n to 1 (step S600a in FIG. 17), and checks a valid flag AF #n in the descriptor 1230 (step S601a in FIG. 17) after a transfer request is issued from the data combining unit 120.

When the valid flag AF #n indicates that a start address A #n is "valid" (yes in step S602a of FIG. 17), the combination data transfer unit 123 checks information from the data combining unit 120 and checks whether data to be transferred to the data memory 115 is a single piece of data or a data block (step S603a in FIG. 17).

When the data to be transferred to the data memory 115 is not a data block, the combination data transfer unit 123 reads the start address A #n confirmed as "valid" by the valid flag AF #n from the descriptor 1230 (step S604a in FIG. 17) and writes a corresponding nth piece of data to an area starting from the start address A #n in the data memory 115 (step S605a in FIG. 17).

After completing this writing, the combination data transfer unit 123 writes a received data size L #n to the descriptor 1230 and rewrites a reception completion flag WF #n set in the descriptor 1230 from "not completed" to "completed" (step S606a in FIG. 17). The above processing of steps S600a to S606a and steps S607a and S608a is equivalent to the processing of steps S400a to S408a of FIG. 13.

On the other hand, when the data to be transferred to the data memory 115 is a data block, the combination data transfer unit 123 checks the number k of pieces of data combined (step S609a in FIG. 18) and checks "k−1" valid flags AF #(n+1) to AF #(n+k−1) in the descriptor 1230 (step S610a in FIG. 18).

When all checked k valid flags are "valid" (yes in step S610a), the combination data transfer unit 123 reads a start address A #n corresponding to the first valid flag AF #n among the k checked valid flags from the descriptor 1230 (step S611a in FIG. 18) and writes a corresponding data block to an area starting from the start address A #n in the data memory 115 (step S612a in FIG. 18).

After completing this writing, the combination data transfer unit 123 writes to the descriptor 1230 received data sizes L #n to L #(n+k−1) indicating the data lengths of pieces of data constituting the data block written to the data memory 115 (step S613a in FIG. 18).

Subsequently, the combination data transfer unit 123 rewrites "k−1" start addresses A #(n+1) to A #(n+k−1) in the descriptor 1230 according to the data lengths of the first "k−1" pieces of data among the k pieces of data constituting the data block (step S614a in FIG. 18).

Next, the combination data transfer unit 123 rewrites reception completion flags WF #n to WF #(n+k−1) corresponding to the pieces of data constituting the data block written to the data memory 115 from "not completed" to "completed" (step S615a in FIG. 18).

The above processing of steps S609a to S615a and steps S616a to S618a is equivalent to the processing of steps S409a to S418a of FIG. 14. In steps S610a, S613a and S615a, processing described in steps S410a, S413a and S415a is executed when n=N or when n<N and n+k−1>N.

Thus, the packet processing apparatus of the present embodiment includes means (the combination data transfer unit 123) which can realize collective writing and writes information for restoring a plurality of original pieces of data from a data block to the descriptor 1230. According to the present embodiment, it is possible to eliminate the need to execute the restoration processing in the reception processing unit 117, the data processing unit 116, or the combination data separation unit 108b in FIG. 42 and it is possible to achieve high reception performance due to the effects of collective writing.

Further, in the present embodiment, the software for the reception processing unit 117 and the data processing unit 116 in the configuration of FIG. 42 can be used as it is in the packet processing apparatus of the present embodiment.

When the restoration processing is realized by the reception processing unit 117, the data processing unit 116, or the combination data separation unit 108b of FIG. 42, it is necessary to provide means for the data combining unit 120 to notify the reception processing unit 117, the data processing unit 116, or the combination data separation unit 108b of FIG. 42 of information required for the restoration processing (the number of pieces of data combined and the size of each piece of data).

Further, when the restoration processing is realized by the reception processing unit 117, the data processing unit 116, or the combination data separation unit 108b of FIG. 42, there is a need to take into account that it is sometimes necessary to hold information required for the restoration processing for a plurality of data blocks until reception processing is activated after collective writing is completed.

On the other hand, in the packet processing apparatus of the present embodiment, it is not necessary to hold information on a plurality of data blocks because the restoration processing for a data block has already been completed when collective writing of the data block has been completed. Thus, the scale of hardware in the present embodiment is smaller than that when the restoration processing is realized by the reception processing unit 117, the data processing unit 116, or the combination data separation unit 108b of FIG. 42. The same is true for comparison when the processing of restoring a plurality of original pieces of data from a data block is implemented by software.

For example, when all components other than the data memory 115 and the line handling unit 100 are realized by software in the configuration of FIG. 42, it is necessary to hold information required for the restoration processing for a plurality of data blocks (the number of pieces of data combined and the size of each piece of data) in the data memory 115 or the like.

On the other hand, when all components other than the data memory 115 and the line handling unit 100 are realized by software in the configuration of the present embodiment, it is not necessary to hold information on a plurality of data blocks (the number of pieces of data combined and the size of each piece of data). That is, it is only necessary to hold information (the number of pieces of data combined and the size of each piece of data) required for the restoration processing for only one data block in the data memory 115 or the like.

Namely as compared to the configuration of FIG. 42, the configuration of the present embodiment can reduce the capacity (the number of writable bits) of the data memory 115 or the like for use in holding information required for the restoration processing (the number of pieces of data combined and the size of each piece of data), thus reducing the scale of required hardware.

Writing information required for the restoration processing to a portion of a data block may also be applied as the means for the data combining unit 120 to notify the reception processing unit 117, the data processing unit 116, or the combination data separation unit 108b of FIG. 42 of information required for the restoration processing. Specifically, a method can be considered in which, for example, a header in which a data size or the like is written is added in front of each piece of data combined and the added header is written together with data in order to notify of the size of each piece of data combined. However, in this case, a part of the bandwidth of a bus used for the collective writing is occupied by the information required for the restoration processing, such that the effective bandwidth originally available for data writing is reduced, and as a result, the performance of the collective writing deteriorates.

In the packet processing apparatus of the present embodiment, information required for the restoration processing can be held in a memory other than the data memory 115 which does not use the bus to which the data memory 115 is connected (a memory which permits only writing by the data combining unit 120 and reading by the combination data transfer unit 123), such that the deterioration of the effective bandwidth described above does not occur.

The present embodiment may also have a configuration in which the data combining unit 120 determines the types of pieces of data and group pieces of data of the same type into a data block or a configuration in which a plurality of descriptors 1230 are selectively used according to the data type. With a configuration in which a descriptor 1230 is prepared for each data type and a plurality of descriptors 1230 are selectively used according to the data type, it becomes easier to perform different reception processing for each data type.

The present embodiment may also have a configuration in which a plurality of descriptors 1230 are selectively used for each core of a processor which has a plurality of CPU cores or a configuration in which a plurality of descriptors 1230 are selectively used for each virtual machine. The configuration in which a plurality of descriptors 1230 are selectively used for each CPU core or each virtual machine improves the performance of write and read processing by software as compared to when there is only one descriptor 1230 or the like.

Third Embodiment

Figure 19:
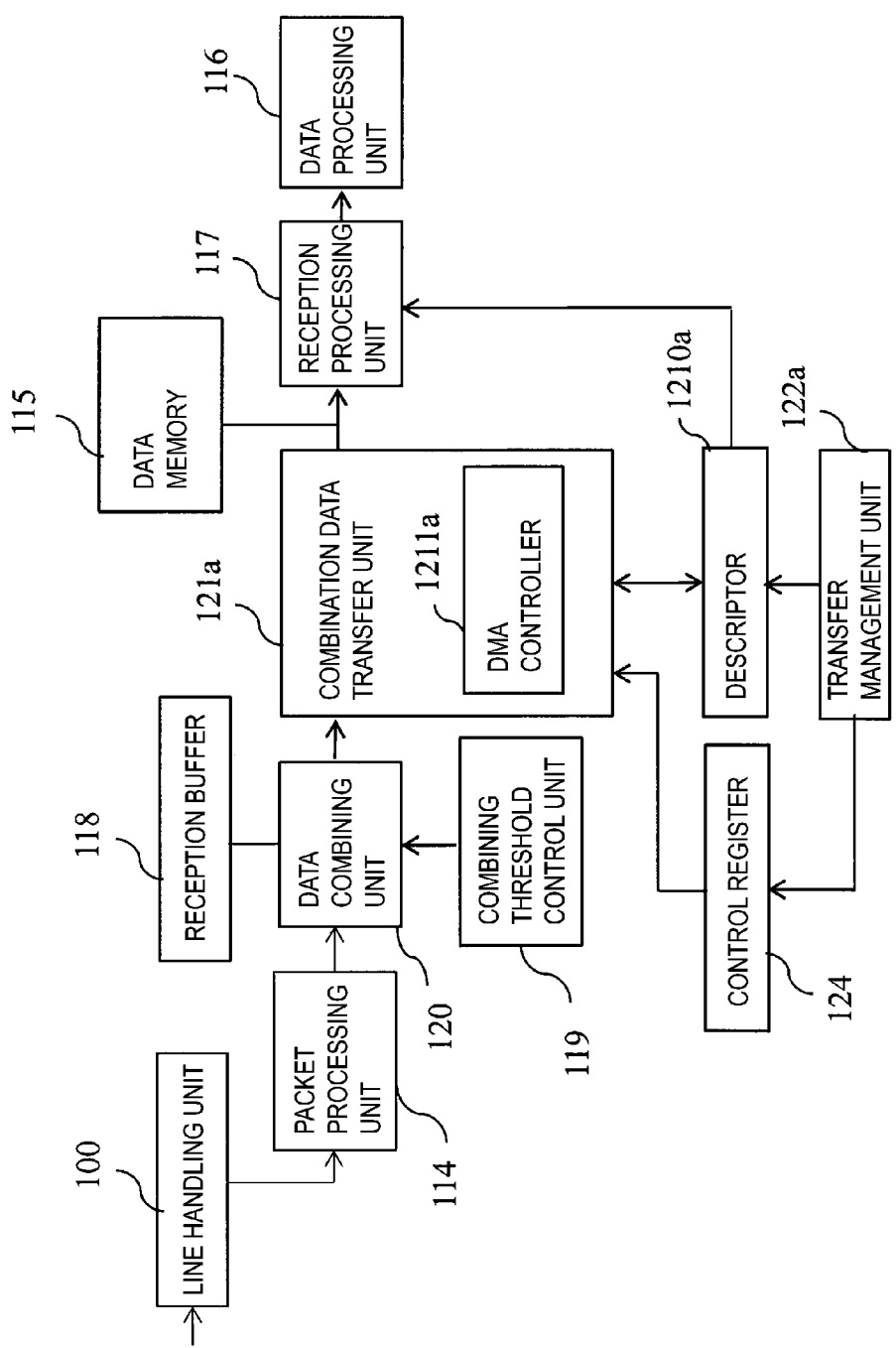
FIG. 19 is a block diagram illustrating a configuration of a packet processing apparatus according to a third embodiment of the present invention.

Next, a third embodiment of the present invention will be described. FIG. 19 is a block diagram illustrating a configuration of a packet processing apparatus according to the third embodiment of the present invention. The packet processing apparatus of FIG. 19 includes a line handling unit 100, a packet processing unit 114, a data memory 115, a data processing unit 116, a reception processing unit 117, a reception buffer 118, a combining threshold control unit 119, a data combining unit 120, a combination data transfer unit 121a, and a transfer management unit 122a.

The line handling unit 100, the packet processing unit 114, the data memory 115, the data processing unit 116, the reception processing unit 117, the reception buffer 118, the combining threshold control unit 119, and the data combining unit 120 in FIG. 19 are equivalent to those in the configuration of FIG. 11.

The combination data transfer unit 121a in FIG. 19 includes a DMA controller 1211a. The combination data transfer unit 121a transfers a data block into which a plurality of pieces of data have been combined to the data memory 115 through one DMA transfer, generates a hardware interrupt, and issues a request to activate the reception processing unit 117.

Here, the combination data transfer unit 121a may not generate a hardware interrupt to the processor (not illustrated) of the packet processing apparatus.

The combination data transfer unit 121a writes the size of each piece of data and the like to the descriptor 1210a which has been prepared for each piece of data by the transfer management unit 122a (software executed by the processor) using information on the number of pieces of data combined and the size of each piece of data of which the data combining unit 120 has notified.

Figure 20:
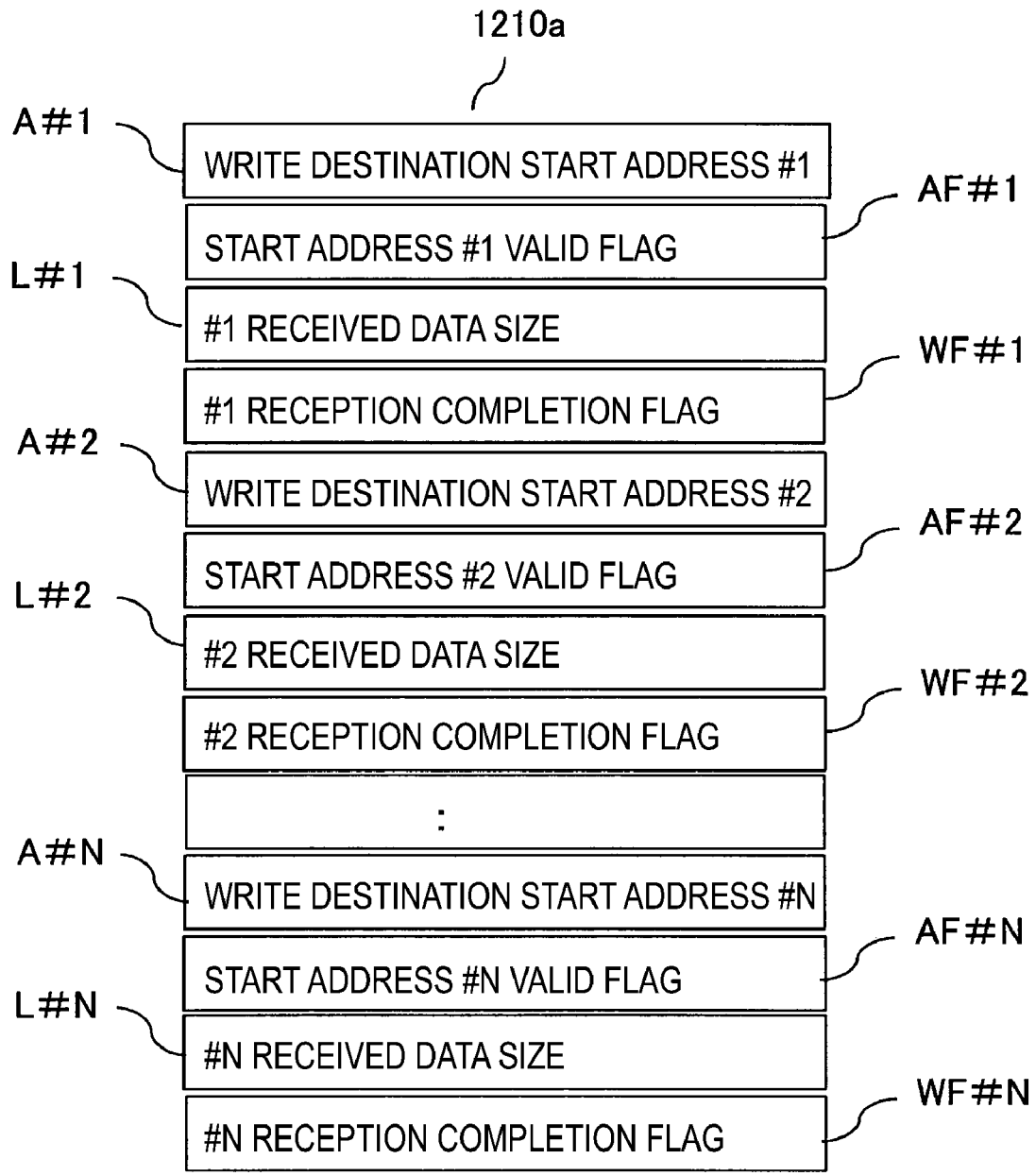
FIG. 20 is a diagram illustrating an outline of a descriptor for the packet processing apparatus according to the third embodiment of the present invention.

FIG. 20 illustrates an exemplary configuration of the descriptor 1210a used by the combination data transfer unit 121a of the present embodiment. The example of FIG. 20 illustrates the case where N pieces of data are stored in the data memory 115.

The descriptor 1210a of FIG. 20 is a data structure in which a plurality (N sets) of start addresses A #1 to A #N of the write destinations of received pieces of data, valid flags AF #1 to AF #N indicating whether or not the start addresses A #1 to A #N are valid, received data sizes L #1 to L #N indicating the lengths of the received pieces of data, and reception completion flags WF #1 to WF #N indicating whether or not reading of data from the data memory 115 has been completed can be written.

The descriptor 1210a is actually arranged in a memory on a personal computer, a communication device, or a communication board, similar to the data memory 115.

The descriptor 1210a can be arranged in the same memory as the data memory 115, in which case the purpose can be distinguished by the address in the memory.

Figure 21:
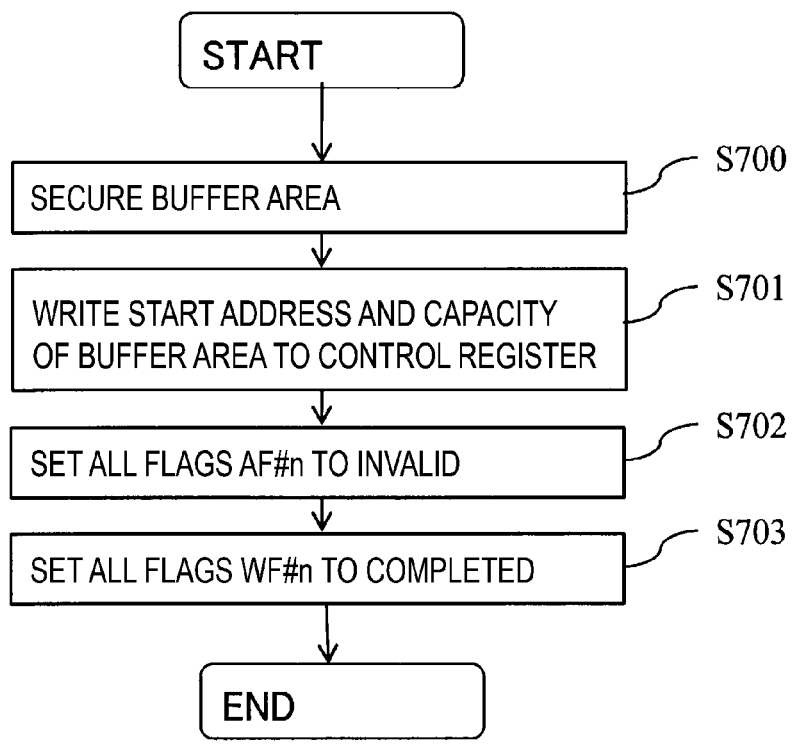
FIG. 21 is a flowchart illustrating an operation of a transfer management unit in the packet processing apparatus according to the third embodiment of the present invention.

Next, an exemplary operation of the present embodiment using the descriptor 1210a having the configuration of FIG. 20 will be described with reference to FIGS. 19 to 27. FIG. 21 is a flowchart illustrating an operation of the transfer management unit 122a, FIGS. 22 to 25 and 27 are flowcharts illustrating operations of the DMA controller 1211a, and FIG. 26 is a flowchart illustrating an operation of the reception processing unit 117.

First, as an initial setting of the packet processing apparatus, the transfer management unit 122a (software executed by the processor) secures a continuous area in the data memory 115 as a buffer area for data blocks (step S700 in FIG. 21) and writes information indicating a start address A0 and the capacity (size) C0 of this buffer area to the control register 124 (step S701 in FIG. 21). The control register 124 is provided, for example, in the processor.

A plurality of control registers 124 may also be prepared although there is no problem with only one (set of) control register 124. When a plurality of control registers 124 are provided, the order in which they are used to write data is predetermined. The control register 124 is set at the time of initial setting and the setting is not changed during operation.

Next, as an initial setting of the descriptor 1210a, the transfer management unit 122a sets all valid flags AF #n indicating whether start addresses A #n (where n is 1 to N) are valid or not to "invalid" (step S702 in FIG. 21) and sets all reception completion flags WF #n indicating that reading of data from the data memory 115 has been completed to "completed" (step S703 in FIG. 21).

Figure 22:
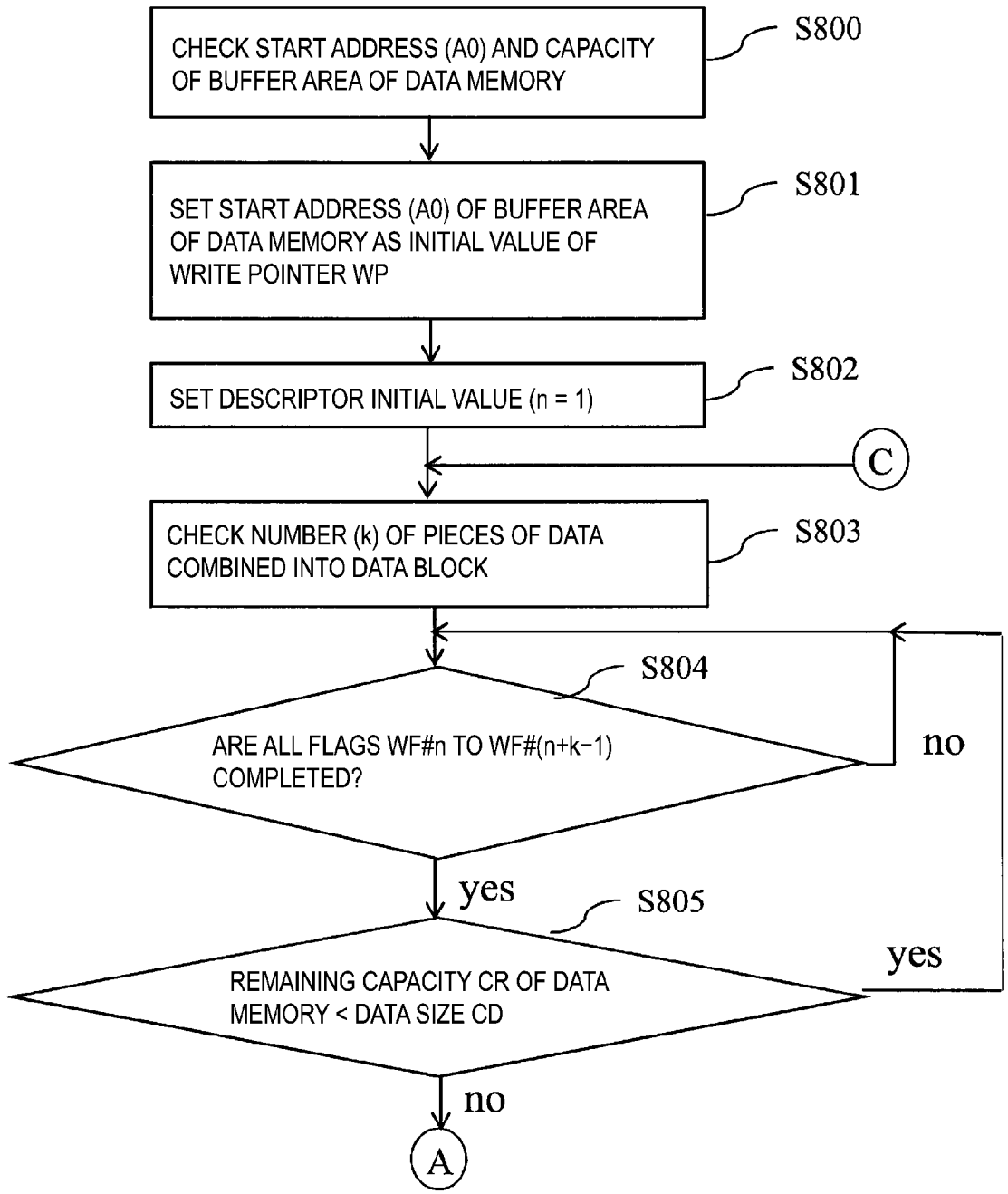
FIG. 22 is a flowchart illustrating an operation of a DMA controller in the packet processing apparatus according to the third embodiment of the present invention.

When the data combining unit 120 has issued a transfer request, the DMA controller 1211a in the combination data transfer unit 121a reads the start address A0 and the capacity (size) C0 set by the transfer management unit 122a from the control register 124 if the transfer request is the first after the above initial setting (step S800 in FIG. 22). Then, the DMA controller 1211a sets the start address A0 read in step S800 as an initial value of a write pointer WP to be used to transfer data to the data memory 115 (step S8oi in FIG. 22). That is, in the present embodiment, the DMA controller 1211a calculates the range of addresses of a writable buffer area in the data memory 115 from the setting of the control register 124 and uses the writable buffer area as a ring buffer.

Subsequently, the DMA controller 1211a initializes a variable n indicating the order of reading and writing from and to the descriptor 1210a to 1 (step S802 in FIG. 22).

The DMA controller 1211a checks information from the data combining unit 120, checks whether data to be transferred to the data memory 115 is a single piece of data which has not been combined or a data block, and checks the number k of pieces of data combined (step S803 in FIG. 22). The number k of pieces of data combined is included in the information of which the data combining unit 120 has notified (k=1 when no pieces of data have been combined) as described above. Then, the DMA controller 1211a checks k reception completion flags WF #n to WF #n (n+k−1) in the descriptor 1210a (step S804 in FIG. 22).

When n=N, the DMA controller 1211a checks reception completion flags of WF #N and WF #1 to WF #(k−1). When n<N and n+k−1>N, the DMA controller 1211a checks reception completion flags WF #n to WF #N and WF #1 to WF #(k−1−(N−n)).

When all k reception completion flags checked through the processing of step S804 are "completed" (yes in step S804), the DMA controller 1211a compares a remaining capacity CR of the buffer area for data blocks in the data memory 115 with the size CD of the data to be transferred to the data memory 115 (step S805 in FIG. 22). When the data to be transferred to the data memory 115 is a single piece of data which has not been combined, the DMA controller 1211a compares the size of the single piece of data with the remaining capacity CR, and when the data to be transferred to the data memory 115 is a data block, compares the size of the data block with the remaining capacity CR. The data combining unit 120 has notified the DMA controller 1211a of the size CD of the data to be transferred to the data memory 115 as described above.

In the comparison, the DMA controller 1211a calculates the remaining capacity CR of the buffer area for data blocks in the data memory 115 based on the write pointer WP and a read pointer RP. Specifically, in an initial state (where write pointer WP=read pointer RP), the DMA controller 1211a uses the value of the capacity (size) C0 read from the control register 124 in step S800 as the remaining capacity CR as it is.

When write pointer WP>read pointer RP, the DMA controller 1211a calculates C0−WP+RP as the remaining capacity CR, and when write pointer WP<read pointer RP, calculates RP−WP as the remaining capacity CR. When write pointer WP=read pointer RP other than in the initial state, the DMA controller 1211a calculates 0 or C0 as the remaining capacity CR. Specifically, when a transition has been made from the state of write pointer WP>read pointer RP to the state of write pointer WP=read pointer RP, the DMA controller 1211a determines that the read pointer has been updated and sets the remaining capacity CR to C0, and when a transition has been made from the state of write pointer WP<read pointer RP to the state of write pointer WP=read pointer RP, the DMA controller 1211a determines that the write pointer has been updated and sets the remaining capacity CR to 0.

As described above, the descriptor 1210a has (a set of) N prepared areas of reception completion flags WF #1 to WF #N, while the order in which the reception completion flags WF #1 to WF #N are checked is predetermined. For example, in the examples of FIGS. 20 and 22, the DMA controller 1211a checks the reception completion flags in the order of the nth reception completion flag WF #n, the (n+1)th reception completion flag WF #(n+1), . . . , and the Nth reception completion flag WF #N (step S804). If checking of a set of k reception completion flags has not been completed after checking the Nth reception completion flag WF #N, the DMA controller 1211a checks the reception completion flags in order from the first reception completion flag WF #1.

When the remaining capacity CR of the buffer area for data blocks in the data memory 115 is smaller than the size CD of the data to be transferred to the data memory 115 (yes in step S805), the DMA controller 1211a returns to step S804. The state where the remaining capacity CR of the buffer area is smaller than the data size CD is resolved when the remaining capacity CR of the buffer area has been recovered by reading data from the data memory 115 by software.

Figure 23:
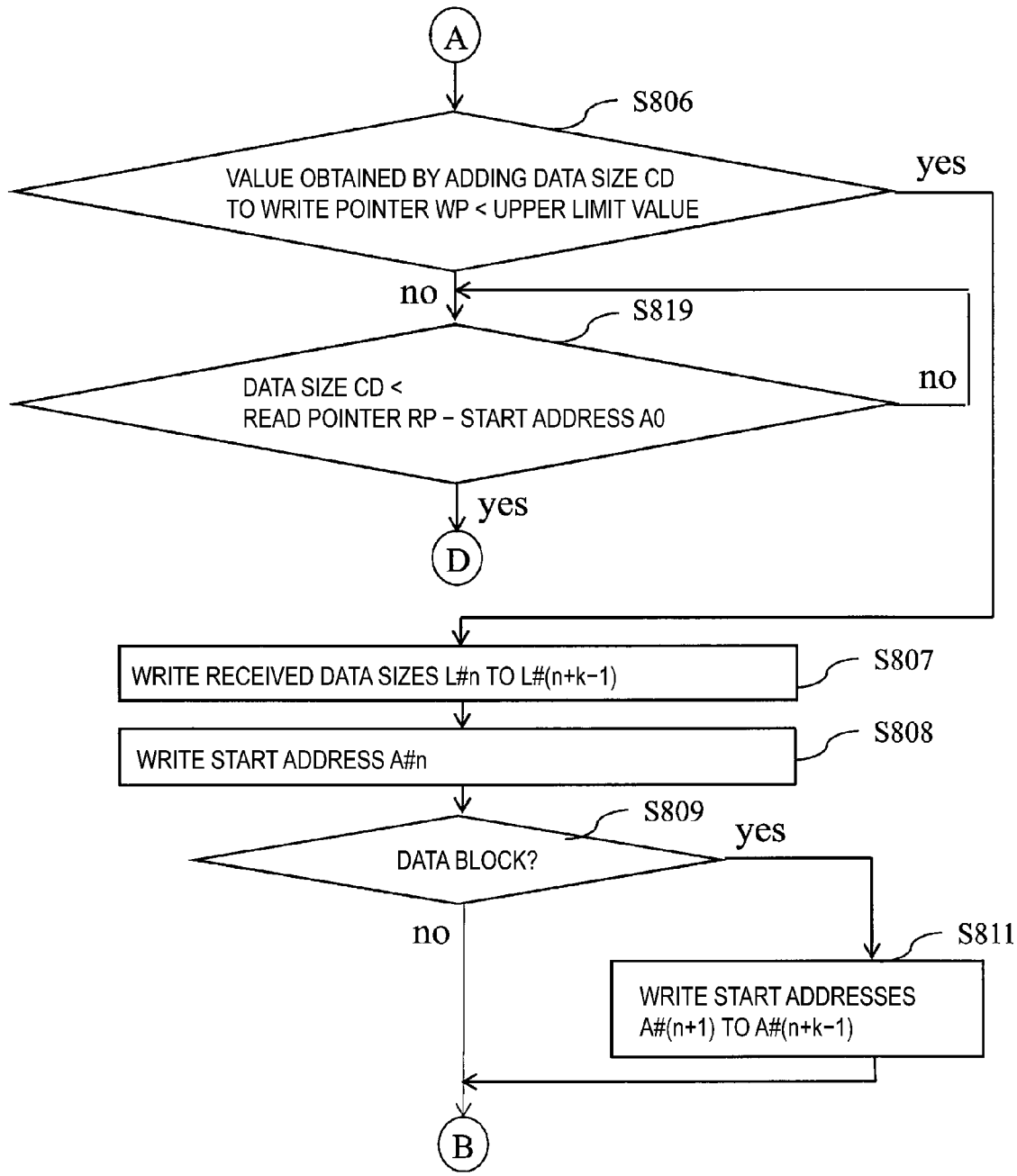
FIG. 23 is a flowchart illustrating an operation of the DMA controller in the packet processing apparatus according to the third embodiment of the present invention.

When the remaining capacity CR of the buffer area is not less than the size CD of the data to be transferred to the data memory 115 (no in step S805), the DMA controller 1211a compares a value (WP+CD) obtained by adding the size CD of the data to be transferred to the data memory 115 to the write pointer WP with a predetermined upper limit value (step S806 in FIG. 23). This upper limit value is a value (A0+C0) obtained by adding the capacity C0 of the buffer area in the data memory 115 to the start address A0 of the buffer area.

When the value (WP+CD) obtained by adding the data size CD to the write pointer WP is smaller than the upper limit value (A0+C0) (yes in step S806), the DMA controller 1211a writes received data sizes L #n to L #(n+k−1) indicating the data lengths of k pieces of data constituting the data to be transferred to the data memory 115 to the descriptor 1210a based on the information (the size of each piece of data combined) of which the data combining unit 120 has notified (step S807 in FIG. 23).

Subsequently, the DMA controller 1211a writes the value of the write pointer WP to the descriptor 1210a as the value of the nth start address A #n (step S808 in FIG. 23). Further, when the data to be transferred to the data memory 115 is a single piece of data which has not been combined (k=1) (no in step S809 in FIG. 23), the DMA controller 1211a proceeds to step S812 of FIG. 24.

On the other hand, when the data to be transferred to the data memory 115 is a data block (yes in step S809), the DMA controller 1211a writes "k−1" start addresses A #(n+1) to A #(n+k−1) to the descriptor 1210a according to the data lengths of the first "k−1" pieces of data among the k pieces of data constituting the data block (step S811 in FIG. 23).

Specifically, as the start address A #(n+1), the DMA controller 1211a writes a value obtained by adding the start address A #n and the data length of the first piece of data among the k pieces of data constituting the data block (a value indicated by the received data size L #n). Further, as the start address A #(n+k−1), the DMA controller 1211a writes a value obtained by adding the start address A #(n+k−2) and the data length of the "k−1"th piece of data among the k pieces of data constituting the data block (a value indicated by the received data size L #(n+k−2)).

In this way, as a start address A #i, the DMA controller 1211a writes a value obtained by adding an immediately previous start address A #(i−1) and the data length of an "i−1"th piece of data among the pieces of data constituting the data block.

When n=N, the DMA controller 1211a writes the received data sizes L #n and L #1 to L #(k−1) to the descriptor 1210a and writes the start addresses A #n and A #1 to A #(k−1) to the descriptor 1210a. When n<N and n+k−1>N, the DMA controller 1211a writes the received data sizes L #n, L #(n+1) to L #N, and L #1 to L #(k−1−(N−n)) to the descriptor 1210a and writes the start addresses A #n and A #(n+1) to A #N and A #1 to A #(k−1−(N−n)) to the descriptor 1210a.

Figure 24:
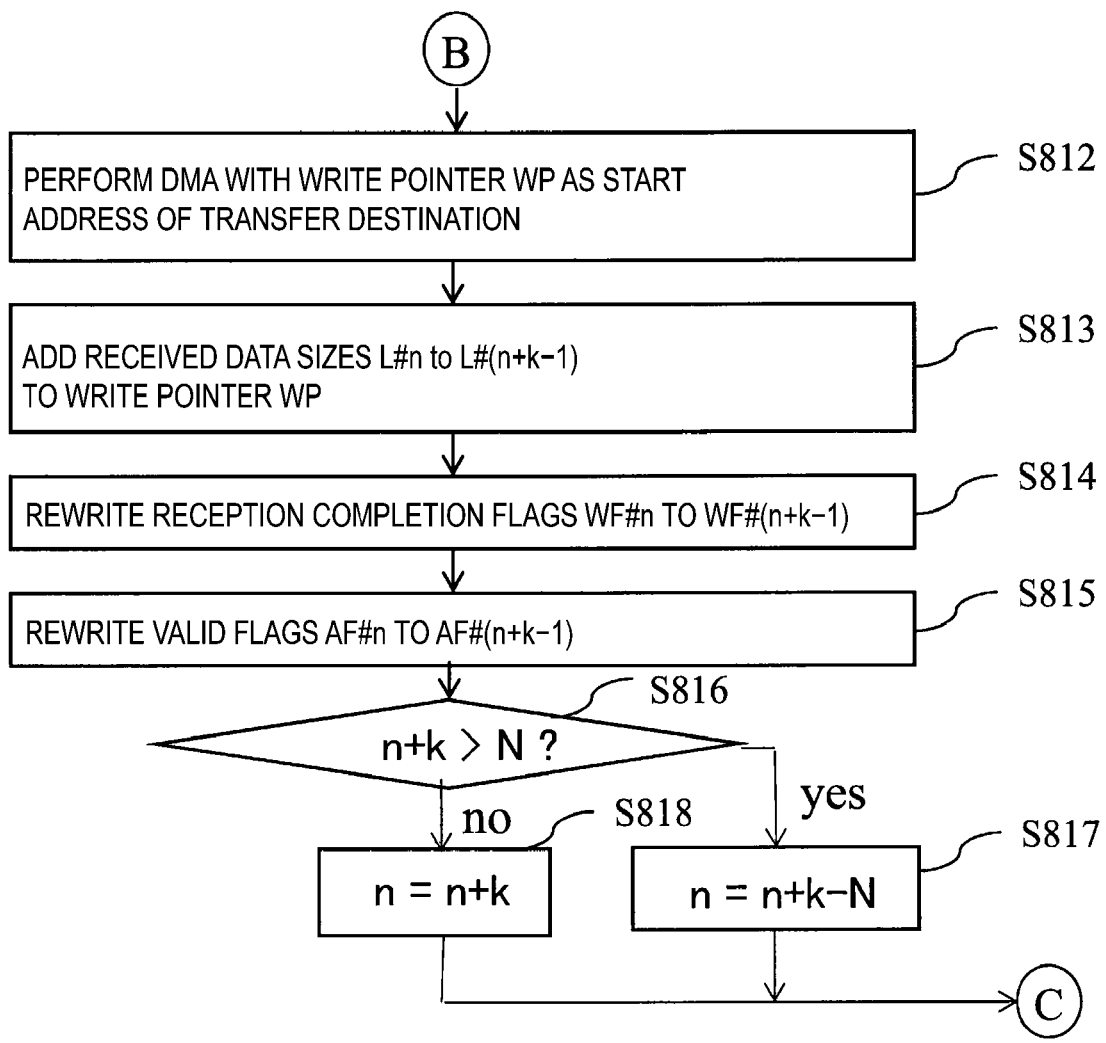
FIG. 24 is a flowchart illustrating an operation of the DMA controller in the packet processing apparatus according to the third embodiment of the present invention.

Next, the DMA controller 1211a performs a DMA transfer to write the data to be transferred to the data memory 115 (a single piece of data or a data block) to a buffer area starting from a start address of the transfer destination in the data memory 115 using the write pointer WP as the start address of the transfer destination in the data memory 115 (step S812 in FIG. 24). That is, the DMA controller 1211a performs a DMA transfer using the write pointer WP as a start address of the transfer destination when a value (A0+C0) obtained by adding the capacity C0 of the buffer area in the data memory 115 to the start address A0 of the buffer area is larger than a value obtained by adding the data size CD to the write pointer WP (WP+CD).

Then, the DMA controller 1211a adds the size of the data DMA-transferred to the data memory 115 (a single piece of data or a data block) to the write pointer WP (step S813 in FIG. 24). Specifically, when the data DMA-transferred to the data memory 115 by the DMA controller 1211a is a single piece of data which has not been combined (k=1), the DMA controller 1211a adds the data length of the data (a value indicated by the received data size L #n) to the write pointer WP. When the data to be transferred to the data memory 115 is a data block, the DMA controller 1211a adds the received data sizes L #n to L #(n+k−1) to the write pointer WP.

When n=N, the DMA controller 1211a adds the received data sizes L #n and L #i to L #(k−1) to the write pointer WP. When n<N and n+k−1>N, the DMA controller 1211a adds the received data sizes L #n, L #(n+1) to L #N, and L #1 to L #(k−1−(N−n)) to the write pointer WP.

Next, the DMA controller 1211a rewrites the reception completion flags WF #n to WF #(n+k−1) corresponding to the pieces of data constituting the data DMA-transferred to the data memory 115 from "completed" to "not completed" (step S814 in FIG. 24). Further, the DMA controller 1211a rewrites the valid flags AF #n to AF #(n+k−1) corresponding to the pieces of data constituting the data DMA-transferred to the data memory 115 from "invalid" to "valid" (step S815 in FIG. 24).

When n=N, the DMA controller 1211a rewrites the reception completion flags WF #n and WF #i to WF #(k−1) from "completed" to "not completed" and rewrites the valid flags AF #n and AF #i to AF #(k−1) from "invalid" to "valid."

When n<N and n+k−1>N, the DMA controller 1211a rewrites the reception completion flags WF #n, WF #(n+1) to WF #N, and WF #i to WF #(k−1−(N−n)) to "not completed" and rewrites the valid flags AF #n, AF #(n+1) to AF #N, and AF #1 to AF #(k−1−(N−n)) to "valid."

Then, the DMA controller 1211a checks whether n+k>N is satisfied (step S816 in FIG. 24), and when n+k is larger than N, sets the variable n such that n=n+k−N (step S817 in FIG. 24) and returns to step S803. When n+k is N or less, the DMA controller 1211a sets the variable n such that n=n+k (step S818 in FIG. 24) and returns to step S803.

On the other hand, when the value (WP+CD) obtained by adding the size CD of the data to be transferred to the data memory 115 to the write pointer WP is not less than the upper limit value (A0+C0) (no in step S806), the DMA controller 1211a compares the size CD of the data with the value (RP−A0) obtained by subtracting the start address A0 of the buffer area in the data memory 115 from the read pointer RP (step S819 in FIG. 23).

Figure 25:
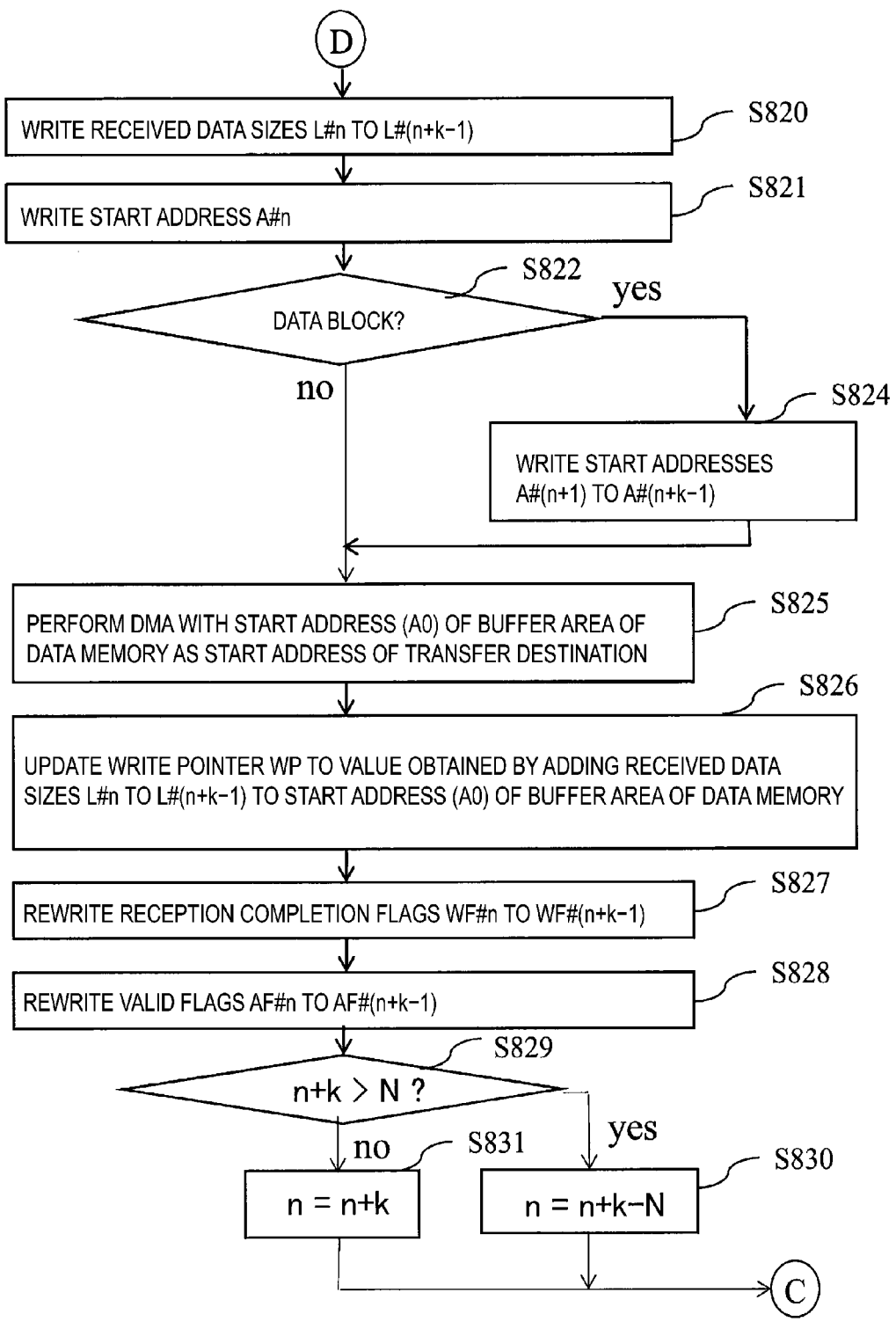
FIG. 25 is a flowchart illustrating an operation of the DMA controller in the packet processing apparatus according to the third embodiment of the present invention.
Figure 26:
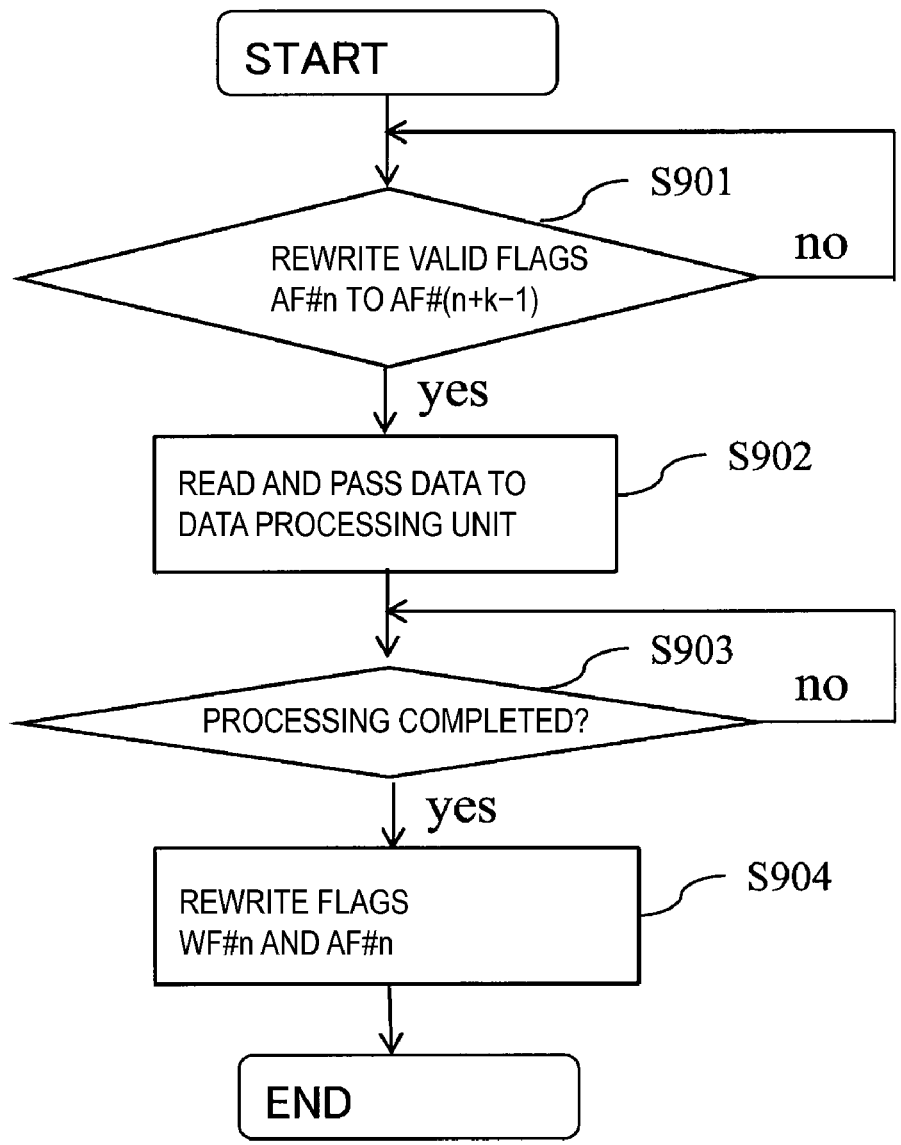
FIG. 26 is a flowchart illustrating an operation of a reception processing unit in the packet processing apparatus according to the third embodiment of the present invention.

When the data size CD is smaller than the subtraction result (RP−A0) (yes in step S819), the DMA controller 1211a writes received data sizes L #n to L #(n+k−1) indicating the data lengths of k pieces of data constituting the data to be transferred to the data memory 115 to the descriptor 1210a based on the information (the size of each piece of data combined) of which the data combining unit 120 has notified (step S820 in FIG. 25).

Subsequently, the DMA controller 1211a writes the value of the start address A0 of the buffer area in the data memory 115 to the descriptor 1210a as the value of the nth start address A #n (step S821 in FIG. 25). Further, when the data to be transferred to the data memory 115 is a single piece of data which has not been combined (k=1) (no in step S822 in FIG. 25), the DMA controller 1211a proceeds to step S825 of FIG. 25.

On the other hand, when the data to be transferred to the data memory 115 is a data block (yes in step S822), the DMA controller 1211a writes "k−1" start addresses A #(n+1) to A #(n+k−1) to the descriptor 1210a according to the data lengths of the first "k−1" pieces of data among the k pieces of data constituting the data block (step S824 in FIG. 25).

Specifically, as the start address A #(n+1), the DMA controller 1211a writes a value obtained by adding the start address A #n and the data length of the first piece of data among the k pieces of data constituting the data block (a value indicated by the received data size L #n). Further, as the start address A #(n+k−1), the DMA controller 1211a writes a value obtained by adding the start address A #(n+k−2) and the data length of the "k−1"th piece of data among the k pieces of data constituting the data block (a value indicated by the received data size L #(n+k−2)). In this way, as a start address A #i, the DMA controller 1211a writes a value obtained by adding an immediately previous start address A #(i−1) and the data length of an "i−1"th piece of data among the pieces of data constituting the data block.

When n=N, the DMA controller 1211a writes the received data sizes L #n and L #1 to L #(k−1) to the descriptor 1210a and writes the start addresses A #n and A #1 to A #(k−1) to the descriptor 1210a. When n<N and n+k−1>N, the DMA controller 1211a writes the received data sizes L #n, L #(n+1) to L #N, and L #1 to L #(k−1−(N−n)) to the descriptor 1210a and writes the start addresses A #n and A #(n+1) to A #N and A #1 to A #(k−1−(N−n)) to the descriptor 1210a.

Next, the DMA controller 1211a performs a DMA transfer to write the data to be transferred to the data memory 115 (a single piece of data or a data block) to a buffer area starting from the start address A0 in the data memory 115

(step S825 in FIG. 25). That is, the DMA controller 1211*a* performs a DMA transfer using the start address A0 of the data memory 115 instead of the write pointer WP as a start address of the transfer destination when "A0+C0−WP" is smaller than the size CD of the data to be transferred to the data memory 115 and the capacity of an area from the start address A0 of the buffer area to the read pointer RP is larger than the size CD of the data to be transferred.

Then, the DMA controller 1211*a* updates the write pointer WP to a new value obtained by adding the size of the data DMA-transferred to the data memory 115 (a single piece of data or a data block) to the start address A0 of the buffer area of the data memory 115 (step S826 in FIG. 25). Specifically, when the data DMA-transferred to the data memory 115 by the DMA controller 1211*a* is a single piece of data which has not been combined (k=1), the DMA controller 1211*a* sets a value obtained by adding the data length of the data (a value indicated by the received data size L #n) to the start address A0 as a new value of the write pointer WP. When the data to be transferred to the data memory 115 is a data block, the DMA controller 1211*a* sets a value obtained by adding the received data sizes L #n to L #(n+k−1) to the start address A0 as a new value of the write pointer WP.

When n=N, the DMA controller 1211*a* sets a value obtained by adding the received data sizes L #n and L #i to L #(k−1) to the start address A0 as a new value of the write pointer WP. When n<N and n+k−1>N, the DMA controller 1211*a* sets a value obtained by adding the received data sizes L #n, L #(n+1) to L #N, and L #i to L #(k−1−(N−n)) to the start address A0 as a new value of the write pointer WP.

Next, the DMA controller 1211*a* rewrites the reception completion flags WF #n to WF #(n+k−1) corresponding to the pieces of data constituting the data DMA-transferred to the data memory 115 from "completed" to "not completed" (step S827 in FIG. 25). Further, the DMA controller 1211*a* rewrites the valid flags AF #n to AF #(n+k−1) corresponding to the pieces of data constituting the data DMA-transferred to the data memory 115 from "invalid" to "valid" (step S828 in FIG. 25).

When n=N, the DMA controller 1211*a* rewrites the reception completion flags WF #n and WF #i to WF #(k−1) from "completed" to "not completed" and rewrites the valid flags AF #n and AF #i to AF #(k−1) from "invalid" to "valid." When n<N and n+k−1>N, the DMA controller 1211*a* rewrites the reception completion flags WF #n, WF #(n+1) to WF #N, and WF #i to WF #(k−1−(N−n)) to "not completed" and rewrites the valid flags AF #n, AF #(n+1) to AF #N, and AF #1 to AF #(k−1−(N−n)) to "valid."

Then, the DMA controller 1211*a* checks whether n+k>N is satisfied (step S829 in FIG. 25), and when n+k is larger than N, sets the variable n such that n=n+k−N (step S830 in FIG. 25) and returns to step S803. When n+k is N or less, the DMA controller 1211*a* sets the variable n such that n=n+k (step S831 in FIG. 25) and returns to step S803.

In the DMA transfer of the present embodiment, a data block into which k pieces of data have been concatenated is collectively transferred to the data memory 115 and information on start addresses in the descriptor 1210*a* is written by the DMA controller 1211*a* in the above manner, thereby notifying the processor of the packet processing apparatus (the reception processing unit 117 and the data processing unit 116) of addresses where the beginnings of the pieces of data have been written.

The DMA controller 1211*a* also performs processing of updating the read pointer RP in accordance with processing of the reception processing unit 117 and the like (software executed by the processor) which is described below, and details of the update processing of the read pointer RP will be described later.

The reception processing unit 117 (software executed by the processor) periodically checks the valid flags AF #n (where n is 1 to N) of the descriptor 1210*a*, and when a valid flag AF #n indicates "valid" (yes in step S901 in FIG. 26), reads an nth piece of data from the data memory 115 based on information on a corresponding nth start address A #n and a corresponding received data size L #n and passes the read nth piece of data to the data processing unit 116 (step 902 in FIG. 26).

After necessary processing has been performed by the data processing unit 116 (yes in step S903 in FIG. 26), the reception processing unit 117 (software executed by the processor) rewrites an nth reception completion flag WF #n in the descriptor 1210*a* corresponding to the nth piece of data for which the processing has been completed from "not completed" to "completed" and rewrites the nth valid flag AF #n in the descriptor 1210*a* from "valid" to "invalid" (step S904 in FIG. 26).

Similar to the first embodiment, the descriptor 1210*a* has (a set of) N areas of valid flags AF #1 to AF #N, while the order in which the valid flags AF #1 to AF #N are checked is predetermined.

Instead of periodically checking the valid flags AF #n in the descriptor 1210*a*, the DMA controller 1211*a* may issue an interrupt processing request to the processor after completion of a DMA transfer and the reception processing unit 117 (software executed by the processor) may check the valid flags AF #n (where n is 1 to N) of the descriptor 1210*a* in response to the interrupt processing request.

Next, the update processing of the read pointer RP performed by the DMA controller 1211*a* will be described. First, the DMA controller 1211*a* sets the start address A0 of the buffer area for data blocks in the data memory 115 as an initial value of the read pointer RP (step S840 in FIG. 27). The DMA controller 1211*a* also initializes a variable n indicating the order of checking the valid flags to 1 (step S841 in FIG. 27). The processing of step S841 is the same as that of step S802 because this variable n is the same value as the variable n in FIGS. 22 to 25.

Figure 27:
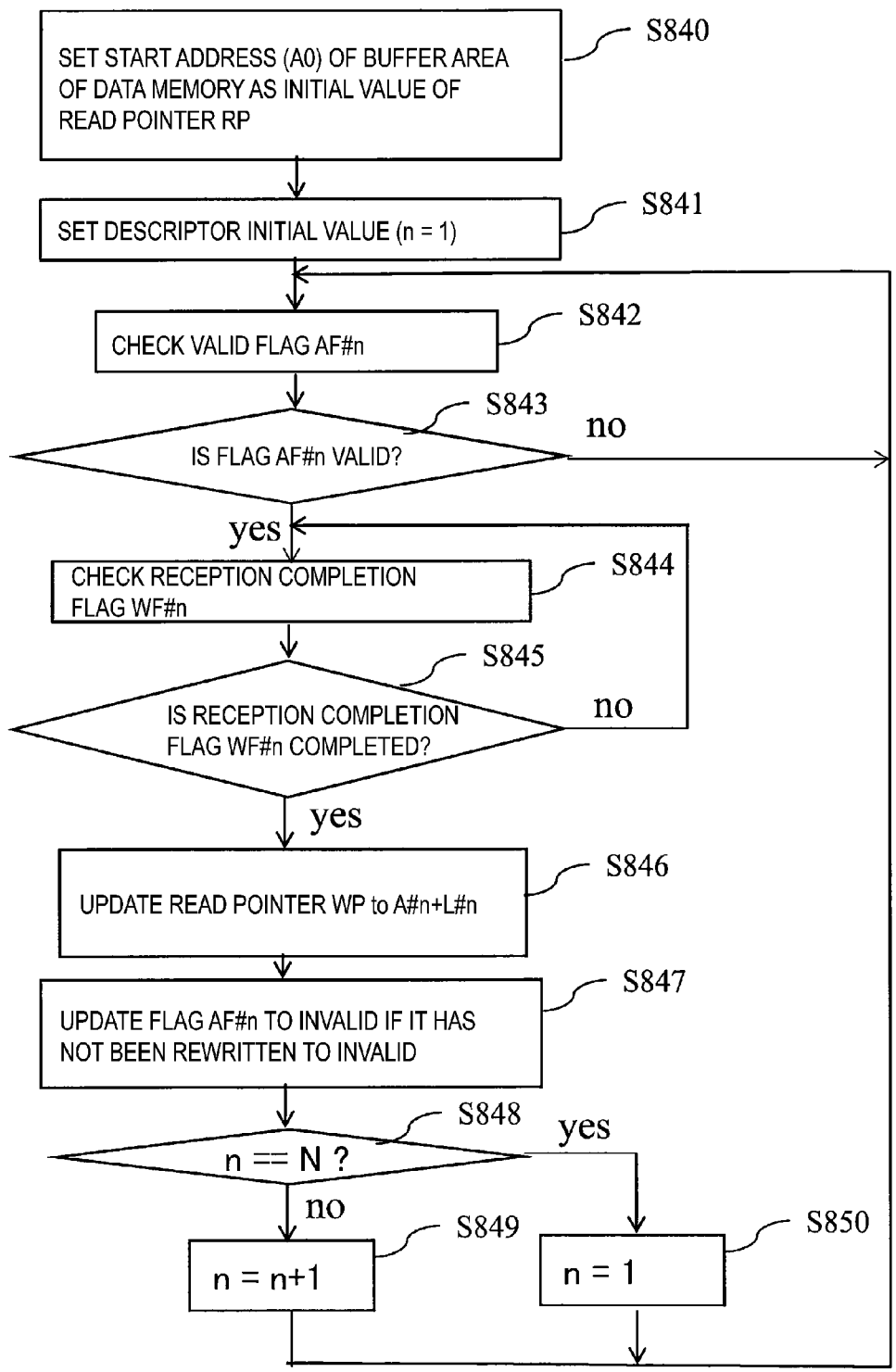
FIG. 27 is a flowchart illustrating an operation of the DMA controller in the packet processing apparatus according to the third embodiment of the present invention.

The DMA controller 1211*a* periodically checks the nth valid flags AF #n in the descriptor 1210*a* during the processing of FIGS. 22 to 25 (step S842 of FIG. 27). After detecting that a valid flag AF #n indicates that an nth start address A #n is "valid" (yes in step S843 of FIG. 27), the DMA controller 1211*a* checks an nth reception completion flag WF #n in the descriptor 1210*a* corresponding to the nth start address A #n (step S844 in FIG. 27).

When the nth reception completion flag WF #n in the descriptor 1210*a* indicates "completed" (yes in step S845 of FIG. 27), the DMA controller 1211*a* updates the read pointer RP to a new value obtained by adding the nth reception data size L #n to the nth start address A #n (step S846 in FIG. 27).

When the valid flag AF #n has not been rewritten to "invalid" by software executed by the processor, the DMA controller 1211*a* updates the valid flag AF #n to "invalid" (step S847 in FIG. 27).

The DMA controller 1211*a* determines whether the variable n is equal to N (step S848 in FIG. 27). When the variable n has not reached N (no in step S848), the DMA controller 1211*a* increments the variable n by 1 (step S849 in FIG. 27) and returns to step S842. When the variable n has reached N (yes in step S848), the DMA controller 1211*a* sets the variable n to 1 (step S850 in FIG. 27) and returns to step S842.

The reception completion flag WF #n becomes "completed" by the operation of the reception processing unit 117 in FIG. 26.

Here, the DMA controller 1211a uses the read pointer RP described above to calculate the remaining capacity of the buffer area for data blocks in the data memory 115, and use of the read pointer RP for reading by software or the like is not assumed.

As described above, the packet processing apparatus of the present embodiment includes the combination data transfer unit 121a having built-in means (the DMA controller 1211a) which can realize collective DMA transfer and writes information for restoring a plurality of original pieces of data from a data block to the descriptor 1210a. Because the DMA controller 12n1a can be implemented by hardware, it is not necessary to execute the restoration processing by software and it is possible to achieve high reception performance due to the effects of collective DMA transfer.

Compared to when the processor (software) executes the processing of restoring a plurality of original pieces of data from a data block into which the pieces of data have been combined in the packet processing apparatus of the related scheme having the configuration of FIG. 42, the present embodiment has advantages that the processing of the processor required to process one piece of data (processing for one packet) becomes lighter and the reception performance is improved (the number of pieces of data that can be processed per unit time increases) because the restoration processing does not need to be performed by the processor (software). The present embodiment also has an advantage that power consumption of the processor required to process one piece of data (processing for one packet) is reduced.

In order to properly perform collective DMA transfer in the configuration of the related scheme of FIG. 42, it is necessary to secure a buffer area of size N×DB_mux (where DB_mux is the maximum size of a data block) in advance in the data memory 115 by software. On the other hand, in the packet processing apparatus of the present embodiment, collective DMA transfer can be properly performed with a smaller buffer area.

The maximum size of a data block DB_mux is a value obtained by adding the allowable maximum data length to the threshold set in the combining threshold control unit 119. Thus, for example, when the threshold is 500 bytes, the maximum allowable data length is 2000 bytes, and N is 10, the size of a buffer area that needs to be secured in the data memory 115 in the configuration of the related scheme of FIG. 42 is 10×2500=25000 bytes.

The size of a buffer area that needs to be secured in the data memory 115 in the packet processing apparatus of the present embodiment is the maximum size of a data block DB_mux without depending on N. That is, the size of a buffer area that needs to be secured in the data memory 115 in the packet processing apparatus of the present embodiment is 2500 bytes under the same conditions as above. This reduction in the size of the buffer area is an advantage due to implementation of a function of, when the remaining capacity CR of the buffer area is small, suspending a DMA transfer until the remaining capacity CR reaches the required amount (step S805 in FIG. 22 and step S819 in FIG. 23).

Thus, in the present embodiment, the probability that the next DMA transfer will be suspended until reading of data from the data memory 115 by software is completed increases when the size of the buffer area secured in the data memory 115 decreases.

The following is a comparison of the size of an area wasted when the size of the buffer area secured in the data memory 115 in the packet processing apparatus of the present embodiment is the same as the size required in the configuration of the related scheme of FIG. 42.

When the threshold is 500 bytes, the maximum allowable data length is 2000 bytes, and N is 10, the sizes of data blocks actually transferred to the data memory 115 are 501 to 2500 bytes as described above. That is, in the configuration of the related scheme of FIG. 42, an area obtained by adding (2500-S) the same number of times as the number of 10 data blocks is wasted when the size of each data block is S. This indicates that an area of 10000 bytes out of 25000 bytes is wasted if the average size S of a data block is 1500 bytes.

When the size of the buffer area secured in the data memory 115 in the configuration of the present embodiment is 25000 bytes, 25000 bytes is secured as a continuous area, such that a plurality of data blocks can be written to the continuous area. Thus, in the present embodiment, only a value obtained by subtracting 1 byte from the maximum size of a data block of 2500 bytes, that is, 2499 bytes, is wasted. This value indicates that 11 or more data blocks can be written to a buffer of the same capacity (25000 bytes) when the average size S of a data block is smaller than (25000-2499)/10=2250.1 and N is 11 or more. In order to write 11 or more data blocks in the configuration of the related scheme of FIG. 42, a buffer area of 27500 bytes or more is required while N is 11 or more.

Thus, when the size of the buffer area secured in the data memory 115 in the packet processing apparatus of the present embodiment is the same as the size required in the configuration of the related scheme of FIG. 42, a smaller area is wasted than in the configuration of the related scheme of FIG. 42 and more data blocks can sometimes be written to the buffer area of the same size.

When the size of a buffer area to be secured in the data memory 115 in the packet processing apparatus of the present embodiment is calculated assuming that the average size S of a data block is 1500 bytes and the maximum number of data blocks to be written to the buffer area is 10, the size of the buffer area to be secured is 1500×10=15000 bytes, which is smaller than the size (25000 bytes) required in the configuration of the related scheme of FIG. 42.

In the configuration of the present embodiment, the maximum number of data blocks to be written to the buffer area of the data memory 115 and N of the descriptor 1210a can be independently determined. As described above, the size of the buffer area may be determined from the maximum number of data blocks to be written to the buffer area and N may be set to the maximum number of pieces of data to be written to the buffer area. However, the maximum number of pieces of data that can be actually written to the buffer area is N or less because the maximum number of pieces of data depends on the size of data to be stored and the size of the buffer area. Assuming that the average size S of a data block is 1500 bytes, the average of the number k of pieces of data combined is 2, and the maximum number of data blocks to be written to the buffer area is 10, it is desirable that the size of the buffer area be 1500×10=15000 bytes and N be 2×10=20.

When the processing of restoring a plurality of original pieces of data from a data block into which the plurality of pieces of data have been combined is realized by hardware of the reception processing unit 117, the data processing unit 116, or the combination data separation unit 108b of FIG. 42, it is necessary to provide means for the data combining unit 120 to notify the reception processing unit 117, the data processing unit 116, or the combination data separation unit 108b of FIG. 42 of information required for the restoration processing (the number of pieces of data combined and the size of each piece of data).

Further, when the restoration processing is realized by hardware of the reception processing unit 117, the data processing unit 116, or the combination data separation unit 108b of FIG. 42, there is a need to take into account that it is sometimes necessary to hold information required for the restoration processing for a plurality of data blocks until reception processing is activated after a DMA transfer is completed.

On the other hand, in the packet processing apparatus of the present embodiment, it is not necessary to hold information on a plurality of data blocks because the restoration processing for a data block has already been completed when a DMA transfer of the data block has been completed. Thus, the scale of hardware in the present embodiment is smaller than that when the restoration processing is realized by hardware of the reception processing unit 117, the data processing unit 116, or the combination data separation unit 108b of FIG. 42.

Writing information required for the restoration processing to a portion of a data block may also be applied as the means for the data combining unit 120 to notify the reception processing unit 117, the data processing unit 116, or the combination data separation unit 108b of FIG. 42 of information required for the restoration processing. However, if information required for the restoration processing is written to a portion of a data block, a part of the bandwidth of a bus used for the DMA transfer is occupied by the information required for the restoration processing, such that the effective bandwidth originally available for transfer of data is reduced, and as a result, a problem arises that the performance of the DMA transfer deteriorates.

In the packet processing apparatus of the present embodiment, such effective bandwidth deterioration does not occur because it is not necessary to write information required for the restoration processing to a data block.

In the present embodiment, an example in which the combination data transfer unit 121a is realized by hardware has been illustrated. However, at least a part of the processing of the combination data transfer unit 121a may be implemented by software and a processor other than the processor used for the reception processing. When at least a part of the processing of the combination data transfer unit 121a is realized by software in this way, it is also not necessary for the reception processing unit 117 or the data processing unit 116 to perform the processing of restoring a plurality of original pieces of data from a data block, such that it is possible to achieve high reception performance due to the effects of collective DMA transfer.

When at least a part of the processing of the combination data transfer unit 121a is realized by software, it is also possible to achieve the advantage of reducing the scale of hardware required for the processing of restoring a plurality of original pieces of data from a data block (which is an advantage due to not having to hold information on a plurality of data blocks) and the advantage of not deteriorating the effective bandwidth available for data transfer (which is an advantage due to not adding information required for the restoration processing to a portion of a data block), similar to when the combination data transfer unit 121a is realized by hardware.

Further, the present embodiment may have a configuration in which a plurality of DMA controllers 1211a and a plurality of descriptors 1210a corresponding to the DMA controllers 1211a are provided. The present embodiment may also have a configuration in which the data combining unit 120 determines the types of pieces of data and group pieces of data of the same type into a data block or a configuration in which a plurality of DMA controllers 1211a and a plurality of descriptors 1210a are selectively used according to the data type.

With a configuration in which a DMA controller 1211a and a descriptor 1210a are prepared for each data type and a plurality of DMA controllers 1211a and a plurality of descriptors 1210a are selectively used according to the data type, it becomes easier to perform different reception processing for each data type.

The present embodiment may also have a configuration in which a plurality of DMA controllers 1211a and a plurality of descriptors 1210a are selectively used for each core of a processor which has a plurality of CPU cores or a configuration in which a plurality of DMA controllers 1211a and a plurality of descriptors 1210a are selectively used for each virtual machine.

With the configuration in which a plurality of DMA controllers 1211a and a plurality of descriptors 1210a are selectively used for each CPU core or each virtual machine, it is possible to improve the performance of reception processing by software as compared to when there is only one DMA controller or the like.

Fourth Embodiment

Figure 28:
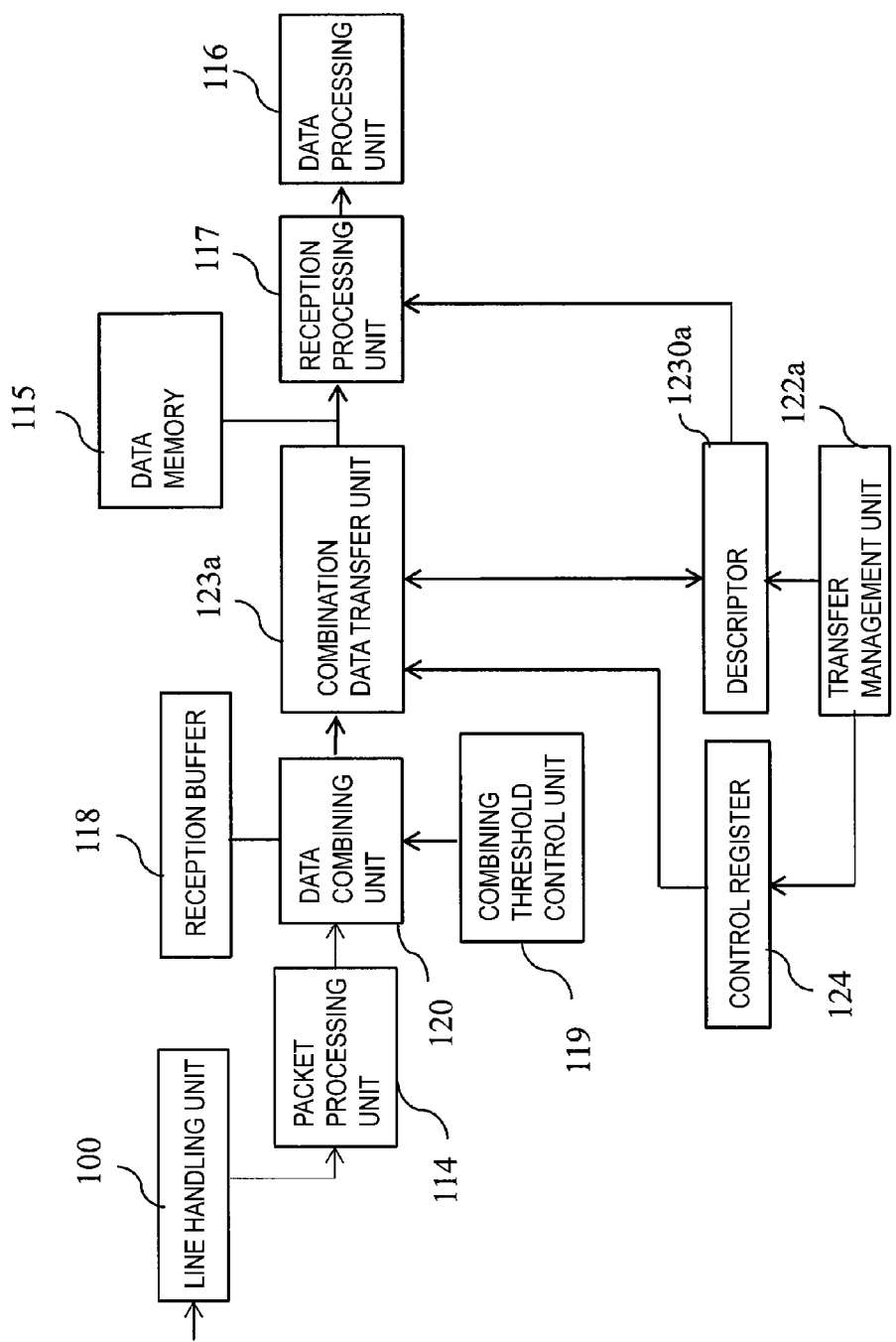
FIG. 28 is a block diagram illustrating a configuration of a packet processing apparatus according to a fourth embodiment of the present invention.
Figure 29:
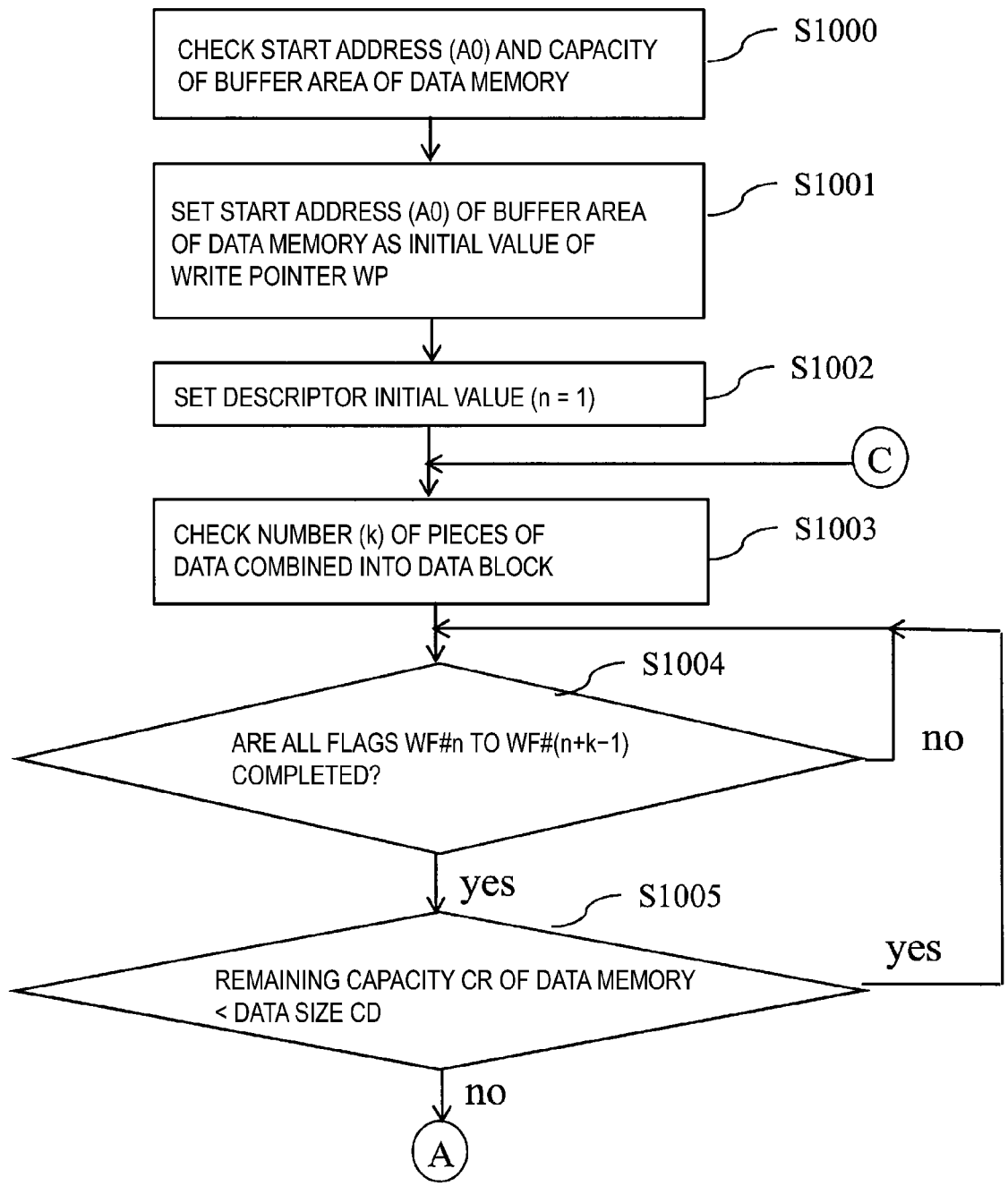
FIG. 29 is a flowchart illustrating an operation of a combination data transfer unit in the packet processing apparatus according to the fourth embodiment of the present invention.

Next, a fourth embodiment of the present invention will be described. FIG. 28 is a block diagram illustrating a configuration of a packet processing apparatus according to the fourth embodiment of the present invention. The packet processing apparatus of FIG. 28 includes a line handling unit 100, a packet processing unit 114, a data memory 115, a data processing unit 116, a reception processing unit 117, a reception buffer 118, a combining threshold control unit 119, a data combining unit 120, a transfer management unit 122a, and a combination data transfer unit 123a.

The configuration of FIG. 28 differs from that of FIG. 19 in that the transfer means in FIG. 19 is replaced with writing means implemented by the processor (software) of the packet processing apparatus. That is, in the present embodiment, the combination data transfer unit 121a of FIG. 19 is replaced with the combination data transfer unit 123a implemented by software.

The line handling unit 100, the data memory 115, the data processing unit 116, the reception processing unit 117, the reception buffer 118, the combining threshold control unit 119, the transfer management unit 122a, and the control register 124 are equivalent to those in the configuration of FIG. 19. The data combining unit 120 is equivalent to that in the configuration of FIG. 11.

The combination data transfer unit 123a (software executed by the processor) writes a data block into which a plurality of pieces of data have been combined to the data memory 115 and issues a request to activate the reception processing unit 117. The combination data transfer unit 123a writes information such as the size of each piece of data to the descriptor 1230a which has been prepared for each piece of data by the transfer management unit 122a (software executed by the processor) using information on the number of pieces of data combined and the size of each piece of data of which the data combining unit 120 has notified.

The configuration of the descriptor 1230a is equivalent to that of the descriptor 1210a of the third embodiment. However, the present embodiment differs in that the combination data transfer unit 123a (software executed by the processor), instead of the combination data transfer unit 121a, performs writing to the descriptor 1230a.

FIGS. 29 to 33 are flowcharts illustrating operations of the combination data transfer unit 123a (software executed by the processor). When the data combining unit 120 has issued a transfer request, the combination data transfer unit 123a reads the start address A0 and the capacity (size) C0 set by the transfer management unit 122a from the control register 124 if the transfer request is the first after the initial setting (step S1000 in FIG. 29). Then, the combination data transfer unit 123a sets the start address A0 as an initial value of the write pointer WP (step S1001 in FIG. 22).

Subsequently, the combination data transfer unit 123a performs processing of steps S1002 to S1006 equivalent to the processing of steps S802 to S806. When the value (WP+CD) obtained by adding the data size CD to the write pointer WP is smaller than the upper limit value (A0+C0) (yes in step S1006 in FIG. 30), the combination data transfer unit 123a writes received data sizes L #n to L #(n+k−1) indicating the data lengths of k pieces of data constituting the data to be transferred to the data memory 115 to the descriptor 1230a based on the information (the size of each piece of data combined) of which the data combining unit 120 has notified (step S1007 in FIG. 30).

Figure 30:
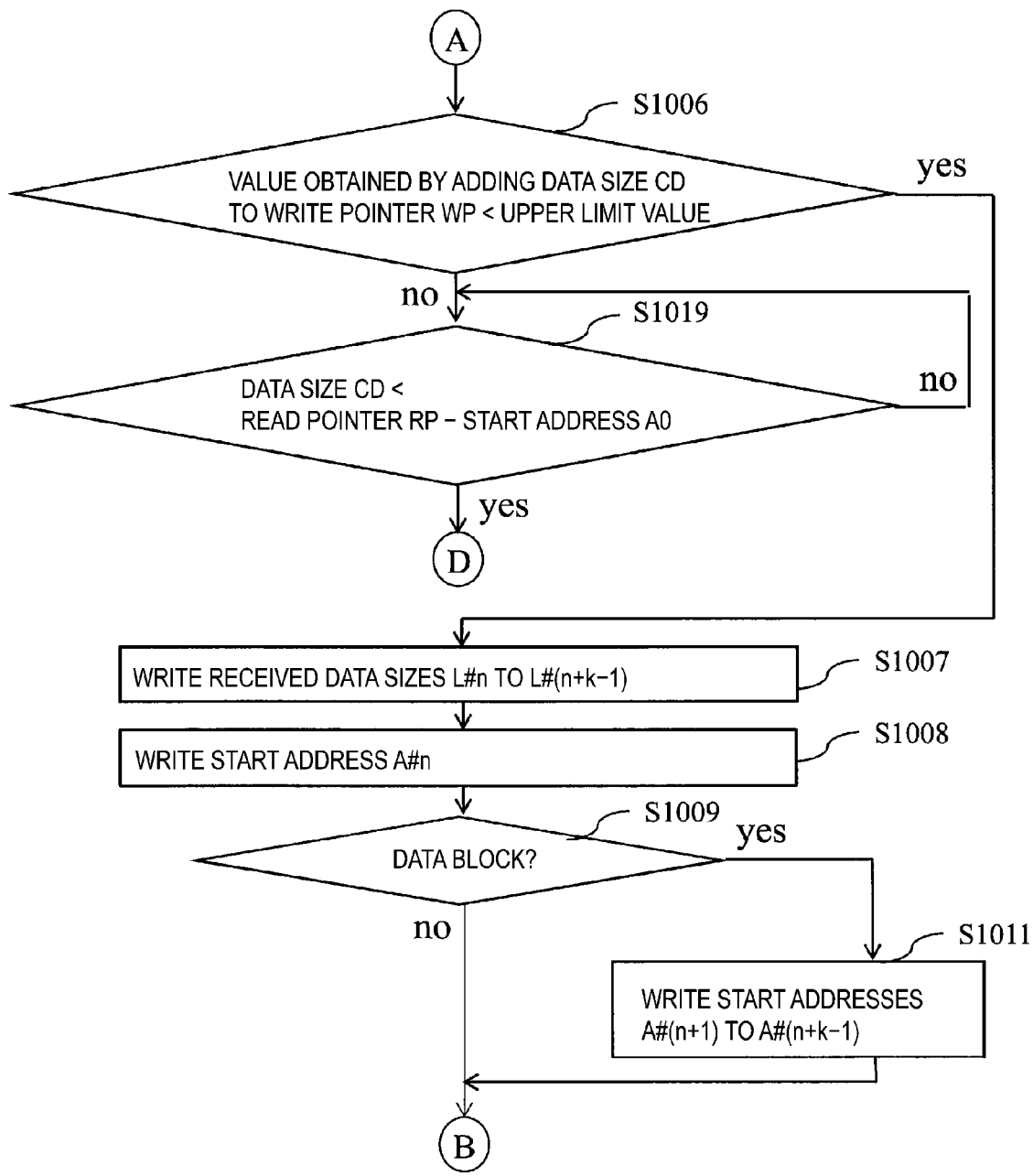
FIG. 30 is a flowchart illustrating an operation of the combination data transfer unit in the packet processing apparatus according to the fourth embodiment of the present invention.

Processing of steps S1008 to S1011 of FIG. 30 is equivalent to the processing of steps S808 to S811 of FIG. 23.

Figure 31:
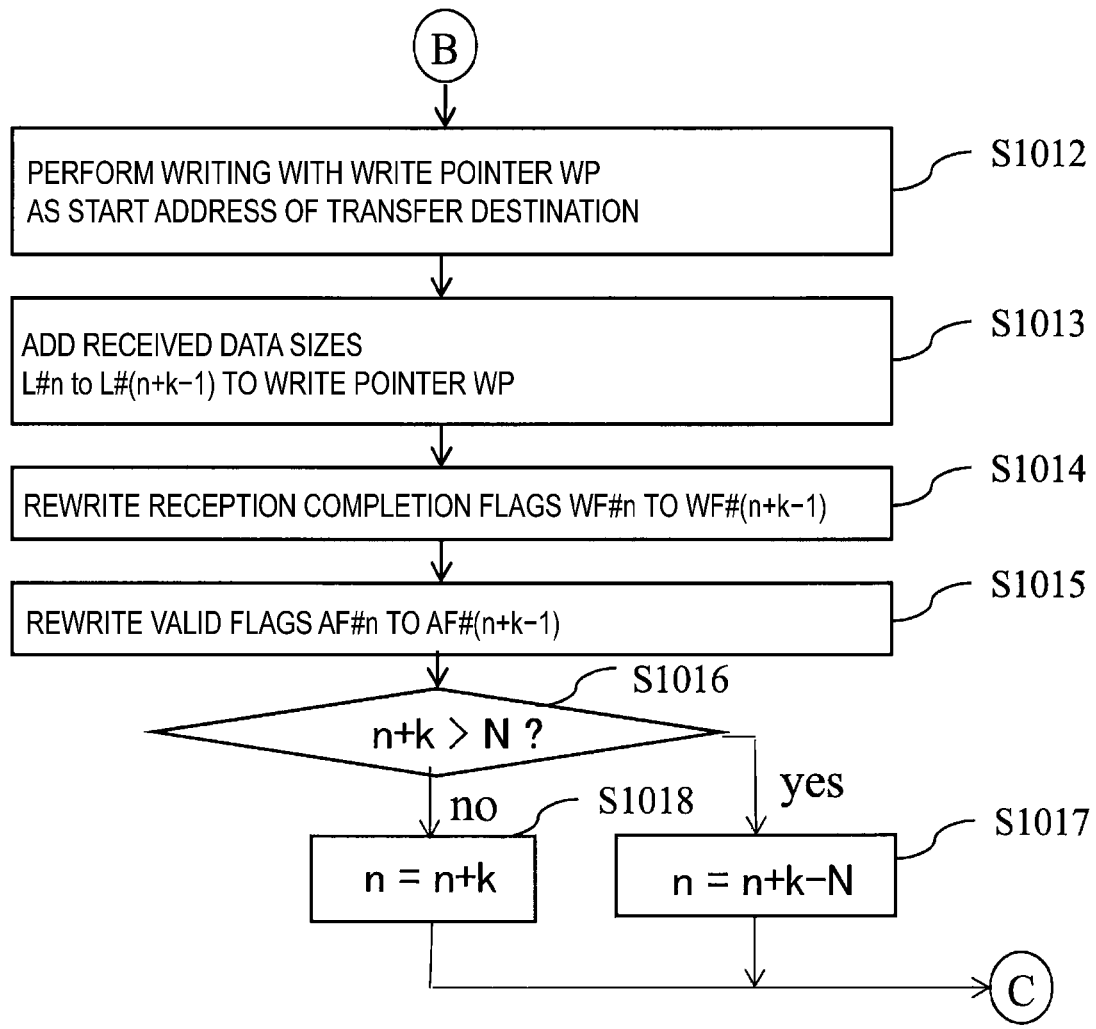
FIG. 31 is a flowchart illustrating an operation of the combination data transfer unit in the packet processing apparatus according to the fourth embodiment of the present invention.

Next, the combination data transfer unit 123a writes the data to be transferred to the data memory 115 (a single piece of data or a data block) to a buffer area starting from a start address of the transfer destination in the data memory 115 using the write pointer WP as the start address of the transfer destination in the data memory 115 (step S1012 in FIG. 31).

Processing of steps S1013 to S1018 of FIG. 31 is equivalent to the processing of steps S813 to S818 of FIG. 24. The combination data transfer unit 123a returns to step S1003 after the processing of step S1017 or S1018.

When the value (WP+CD) obtained by adding the size CD of the data to be transferred to the data memory 115 to the write pointer WP is not less than the upper limit value (A0+C0) (no in step S1006 in FIG. 30), the combination data transfer unit 123a compares the size CD of the data with the value (RP−A0) obtained by subtracting the start address A0 of the buffer area in the data memory 115 from the read pointer RP (step S1019 in FIG. 30).

Figure 32:
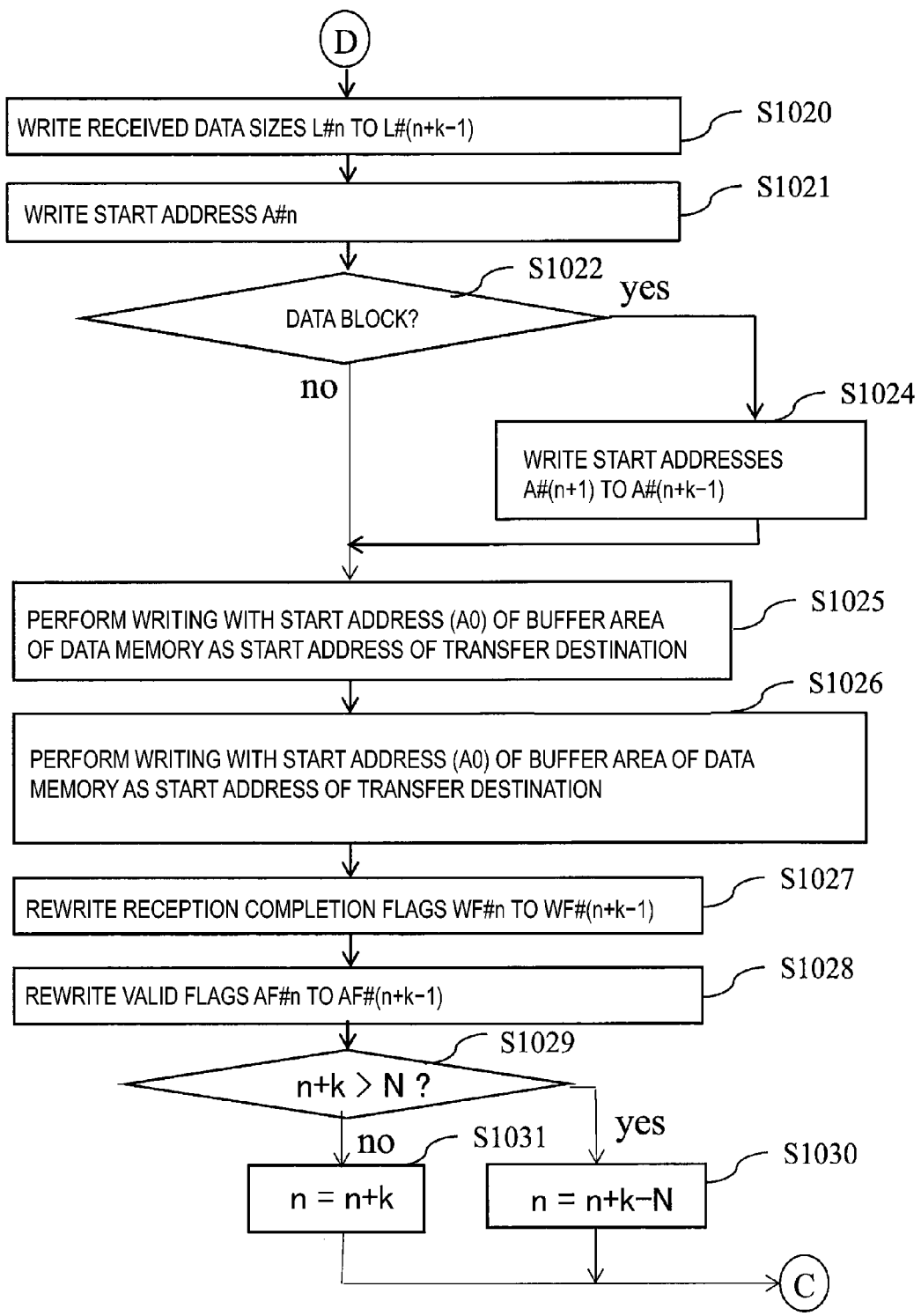
FIG. 32 is a flowchart illustrating an operation of the combination data transfer unit in the packet processing apparatus according to the fourth embodiment of the present invention.

When the data size CD is smaller than the subtraction result (RP−A0) (yes in step S1019), the combination data transfer unit 123a writes received data sizes L #n to L #(n+k−1) indicating the data lengths of k pieces of data constituting the data to be transferred to the data memory 115 to the descriptor 1210a based on the information (the size of each piece of data combined) of which the data combining unit 120 has notified (step S1020 in FIG. 32).

Processing of steps S1021 to S1024 of FIG. 32 is equivalent to the processing of steps S821 to S824 of FIG. 25.

Next, the combination data transfer unit 123a writes the data to be transferred to the data memory 115 (a single piece of data or a data block) to a buffer area starting from the start address A0 in the data memory 115 (step S1025 in FIG. 32).

Processing of steps S1026 to S1031 of FIG. 32 is equivalent to the processing of steps S826 to S831 of FIG. 25. The combination data transfer unit 123a returns to step S1003 after the processing of step S1030 or S1031.

Next, the update processing of the read pointer RP performed by the combination data transfer unit 123a will be described. First, the combination data transfer unit 123a sets the start address A0 of the buffer area for data blocks in the data memory 115 as an initial value of the read pointer RP (step S1040 in FIG. 33). The combination data transfer unit 123a also initializes a variable n indicating the order of checking the valid flags to 1 (step S1041 in FIG. 33). The processing of step S1041 is the same as that of step S1002 because this variable n is the same value as the variable n in FIGS. 29 to 32.

Figure 33:
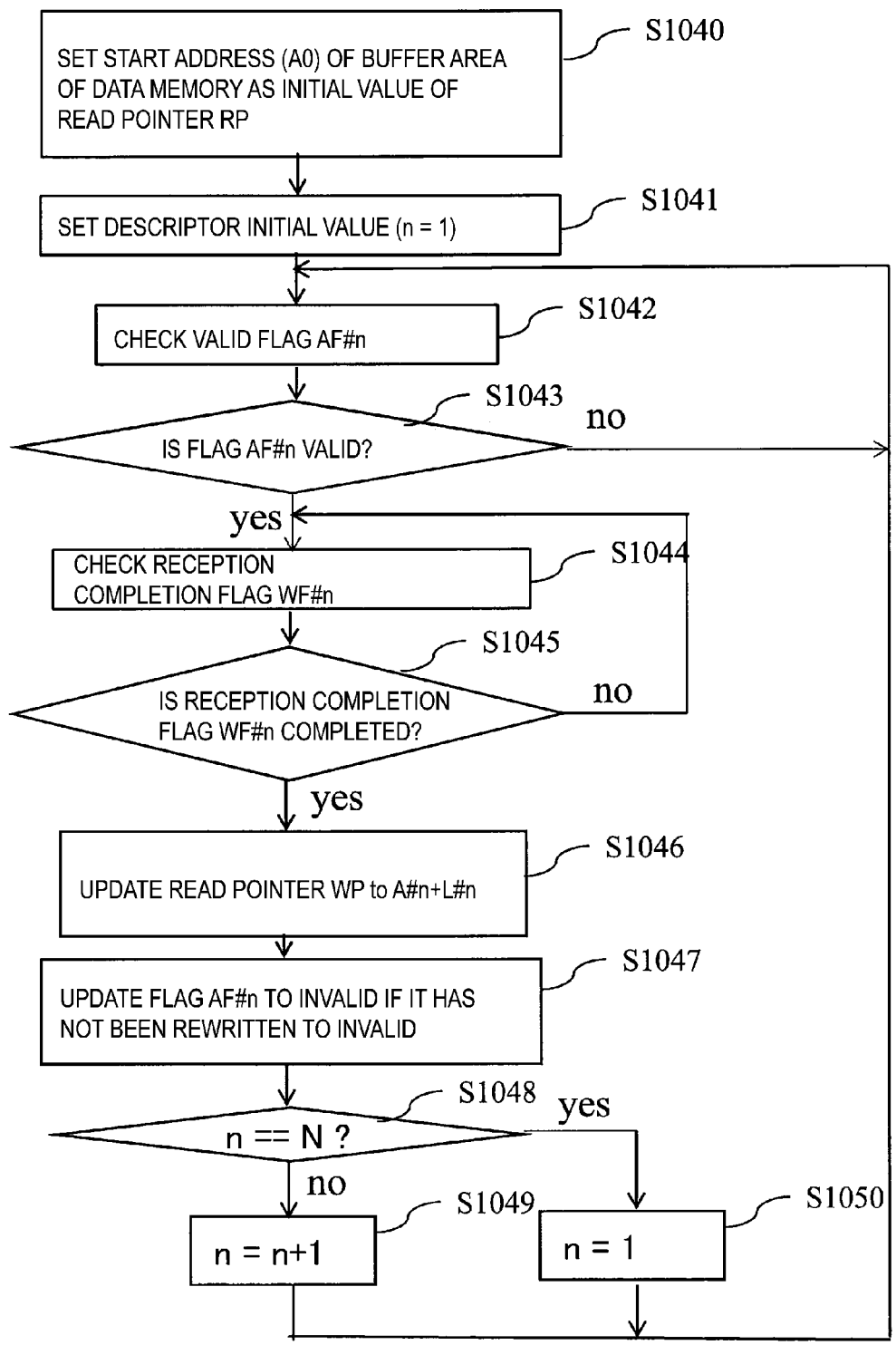
FIG. 33 is a flowchart illustrating an operation of the combination data transfer unit in the packet processing apparatus according to the fourth embodiment of the present invention.

Processing of steps S1042 to S1050 in FIG. 33 is equivalent to the processing of steps S842 to S850 of FIG. 27.

Thus, the packet processing apparatus of the present embodiment includes means (the combination data transfer unit 123a) which can realize collective writing and writes information for restoring a plurality of original pieces of data from a data block into which the plurality of pieces of data have been combined to the descriptor 1230a. According to the present embodiment, it is possible to eliminate the need to execute the restoration processing in the reception processing unit 117, the data processing unit 116, or the combination data separation unit 108b in FIG. 42 and it is possible to achieve high reception performance due to the effects of collective writing.

In order to properly perform collective writing in the configuration of the related scheme of FIG. 42, it is necessary to secure a buffer area of size N×DB_mux (where DB_mux is the maximum size of a data block) in advance in the data memory 115 by software for reception processing (read processing).

On the other hand, in the packet processing apparatus of the present embodiment, collective writing can be properly performed with a smaller buffer area, similar to the configuration of FIG. 19.

In the packet processing apparatus of the present embodiment, the combination data transfer unit 123a writes information (such as start addresses, received data sizes, and reception completion flags) to the descriptor 1230a, thus eliminating the need for the restoration processing.

When the restoration processing is realized by the reception processing unit 117, the data processing unit 116, or the combination data separation unit 108b of FIG. 42, it is necessary to provide means for the data combining unit 120 to notify the reception processing unit 117, the data processing unit 116, or the combination data separation unit 108b of FIG. 42 of information required for the restoration processing (the number of pieces of data combined and the size of each piece of data).

Further, when the restoration processing is realized by the reception processing unit 117, the data processing unit 116, or the combination data separation unit 108b of FIG. 42, there is a need to take into account that it is sometimes necessary to hold information required for the restoration processing for a plurality of data blocks until reception processing is activated after collective writing is completed.

On the other hand, in the packet processing apparatus of the present embodiment, it is not necessary to hold information on a plurality of data blocks because the restoration processing for a data block has already been completed when collective writing of the data block has been completed. Thus, the scale of hardware in the present embodiment is smaller than that when the restoration processing is realized by the reception processing unit 117, the data processing unit 116, or the combination data separation unit 108b of FIG. 42. The same is true for comparison when the processing of restoring a plurality of original pieces of data from a data block is implemented by software.

For example, if the processing of writing to the data memory 115 and the reception processing including the restoration processing are implemented by different processors (or virtual machines or the like) when all components other than the data memory 115 and the line handling unit 100 are realized by software in the configuration of FIG. 42, it is sometimes necessary to hold information required for the restoration processing for a plurality of data blocks until reception processing is activated after writing to the data memory 115 is completed. Thus, it is necessary to hold information required for the restoration processing for a plurality of data blocks (the number of pieces of data combined and the size of each piece of data) in the data memory 115 or the like.

On the other hand, if the processing of writing to the data memory 115 and the reception processing not including the restoration processing are implemented by different processors (or virtual machines or the like) when all components other than the data memory 115 and the line handling unit 100 are realized by software in the configuration of the present embodiment, the processing of writing to the data memory 115 and the restoration processing are implemented by the same processor (or virtual machine or the like), such that it is not necessary to hold information on a plurality of data blocks (the number of pieces of data combined and the size of each piece of data), that is, it is only necessary to hold information required for the restoration processing for only one data block (the number of pieces of data combined and the size of each piece of data) in the data memory 115 or the like.

Namely as compared to the configuration of FIG. 42, the configuration of the present embodiment can reduce the capacity (the number of writable bits) of the data memory 115 or the like for use in holding information required for the restoration processing (the number of pieces of data combined and the size of each piece of data), thus reducing the scale of required hardware.

Writing information required for the restoration processing to the data memory 115 may also be applied as the means for the data combining unit 120 to notify the reception processing unit 117, the data processing unit 116, or the combination data separation unit 108b of FIG. 42 of information required for the restoration processing. However, in this case, a part of the bandwidth of a bus used for the collective writing is occupied by the information required for the restoration processing, such that the effective bandwidth originally available for data writing is reduced, and as a result, the performance of the collective writing deteriorates.

In the packet processing apparatus of the present embodiment, information required for the restoration processing can be held in a memory other than the data memory 115 which does not use the bus to which the data memory 115 is connected (a memory which permits only writing by the data combining unit 120 and reading by the combination data transfer unit 123a), such that the deterioration of the effective bandwidth described above does not occur.

Similar to the third embodiment, a modification of the present embodiment may have a configuration in which the data combining unit 120 determines the types of pieces of data and group pieces of data of the same type into a data block or a configuration in which a plurality of descriptors 1230a are selectively used according to the data type. With a configuration in which a descriptor 1230a is prepared for each data type and a plurality of descriptors 1230a are selectively used according to the data type, it becomes easier to perform different reception processing for each data type.

The present embodiment may also have a configuration in which a plurality of descriptors 1230a are selectively used for each core of a processor which has a plurality of CPU cores or a configuration in which a plurality of descriptors 1230a are selectively used for each virtual machine. The configuration in which a plurality of descriptors 1230a are selectively used for each CPU core or each virtual machine improves the performance of write and read processing by software as compared to when there is only one descriptor 1230a or the like.

In the packet processing apparatus of the second embodiment and the fourth embodiment, the data memory 115, the transfer management units 122 and 122a, the data processing unit 116, the reception processing unit 117, and the combination data transfer units 123 and 123a can be realized by a computer including a processor, a storage device, and an interface and a program that controls these hardware resources. Also, part of the processing of the combination data transfer units 121 and 121a can be realized by a computer as described above.

Figure 34:
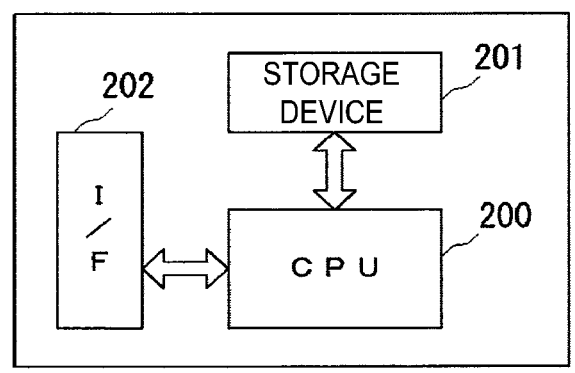
FIG. 34 is a block diagram illustrating an exemplary configuration of a computer that realizes the packet processing apparatus according to the first to fourth embodiments of the present invention.

An exemplary configuration of the computer is illustrated in FIG. 34. The computer includes a central processing unit (CPU) 200, a storage device 201, and an interface device (hereinafter abbreviated as I/F) 202. In such a computer, a program for realizing the packet processing method of the present invention is stored in the storage device 201. The CPU 200 executes the processes described in the second and fourth embodiments in accordance with the program stored in the storage device.

INDUSTRIAL APPLICABILITY

The present invention can be applied to a technology for performing protocol processing, transfer processing, or the like of communication data.

REFERENCE SIGNS LIST

100 Line handling unit
114 Packet processing unit
115 Data memory
116 Data processing unit
117 Reception processing unit
118 Reception buffer
119 Combining threshold control unit
120 Data combining unit
121, 121a, 123, 123a Combination data transfer unit
122, 122a Transfer management unit
124 Control register
1210, 1210a, 1230, 1230a Descriptor
1211, 1211a DMA controller.

The invention claimed is:

1. A packet processing apparatus comprising:
a packet processor configured to perform processing on a packet received from a communication line and output a plurality of pieces of data that is a result of the processing;
a data combiner configured to concatenate the plurality of pieces of data output from the packet processor to generate a data block;
a data memory configured to store data output from the packet processor, wherein the data memory is a dynamic random access memory (DRAM); and
a combination data transferor configured to DMA-transfer the data block generated by the data combiner to the data memory or write the data block to the data memory through a processor,
wherein the combination data transferor is configured to write first information to a descriptor data structure, wherein the first information includes a plurality of beginning addresses of the plurality of pieces of data in the data block, wherein each of the plurality of beginning addresses indicates a storage location, in the data memory, of a corresponding one of a respective beginning address in the data memory of each of the plurality of pieces of data in the data block, and
wherein the descriptor data structure is stored a data area on a predetermined memory.

2. The packet processing apparatus according to claim 1, wherein the combination data transferor is further configured to write second information to the descriptor data structure, wherein the second information includes a plurality of data lengths, wherein each of the plurality of data lengths is a respective data length of a corresponding one of the plurality of pieces of data in the data block.

3. The packet processing apparatus according to claim 1, further comprising a processor configured to read data stored in the data memory, wherein the processor is configured to:
read data from the data memory based on the first information written to the descriptor data structure; and
perform processing on the data read from the data memory.

4. The packet processing apparatus according to claim 1, wherein the descriptor data structure comprises:
a plurality of first flags having a one-to-one correspondence with a plurality of beginning addresses of the plurality of pieces of data in the data block, wherein each of the plurality of first flags indicates whether a respective beginning address of the plurality of beginning addresses is valid, wherein the combination data transferor is further configured to:
after DMA-transferring the data block generated by the data combiner to the data memory or writing the data block to the data memory through a processor, rewriting each of the plurality of first flags to indicate that the respective beginning address of the plurality of beginning addresses is valid.

5. The packet processing apparatus according to claim 4, wherein the descriptor data structure comprises:
a plurality of second flags having a one-to-one correspondence with the plurality of pieces of data in the data block, wherein each of the plurality of second flags indicates whether writing of a respective piece of data of the plurality of pieces of data in the data block is completed, wherein the combination data transferor is further configured to:
after DMA-transferring the data block generated by the data combiner to the data memory or writing the data block to the data memory through a processor, rewriting each of the plurality of second flags to indicate that writing of the respective piece of data of the plurality of pieces of data in the data block is completed.

6. The packet processing apparatus according to claim 5, wherein the combination data transferor is configured to rewrite each of the plurality of second flags is performed after rewriting each of the plurality of first flags.

7. A packet processing apparatus comprising:
a packet processor configured to perform processing on a packet received from a communication line and output data that is a result of the processing;
a data combiner configured to concatenate a plurality of pieces of data output from the packet processor to generate a data block;
a data memory configured to store data output from the packet processor, wherein the data memory is a dynamic random access memory (DRAM); and
a combination data transferor configured to DMA-transfer the data block generated by the data combiner to the data memory or write the data block to the data memory through a processor,
wherein the combination data transferor is configured to determine a respective beginning address in the data memory of each of the plurality of pieces of data in the data block and write first information to a descriptor data structure, wherein the first information includes a plurality of beginning addresses of the plurality of pieces of data in data block, wherein each of the plurality of beginning addresses indicates a storage location, in the data memory, of a corresponding one of the respective beginning address in the data memory of each of the plurality of pieces of data in the data block, and
wherein the descriptor data structure is a data area on a predetermined memory.

8. The packet processing apparatus according to claim 7, wherein the combination data transferor is further configured to write second information to the descriptor data structure, wherein the second information includes a plurality of data lengths, wherein each of the plurality of data lengths is a respective data length of a corresponding one of the plurality of pieces of data in the data block.

9. The packet processing apparatus according to claim 7, further comprising a processor configured to:
read data from the data memory based on the first information written to the descriptor data structure; and
perform processing on the data read from the data memory.

10. The packet processing apparatus according to claim 7, wherein the descriptor data structure comprises:
a plurality of first flags having a one-to-one correspondence with a plurality of beginning addresses of the plurality of pieces of data in the data block, wherein each of the plurality of first flags indicates whether a respective beginning address of the plurality of beginning addresses is valid, wherein the combination data transferor is further configured to:
after DMA-transferring the data block generated by the data combiner to the data memory or writing the data block to the data memory through a processor, rewriting each of the plurality of first flags to indicate that the respective beginning address of the plurality of beginning addresses is valid.

11. The packet processing apparatus according to claim 10, wherein the descriptor data structure comprises:
a plurality of second flags having a one-to-one correspondence with the plurality of pieces of data in the data block, wherein each of the plurality of second flags indicates whether writing of a respective piece of data of the plurality of pieces of data in the data block is completed, wherein the combination data transferor is further configured to:
after rewriting each of the plurality of first flags to indicate that the respective beginning address of the plurality of beginning addresses is valid, rewriting each of the plurality of second flags to indicate that writing of the respective piece of data of the plurality of pieces of data in the data block is completed.

12. A packet processing method comprising:
a first step of performing processing on a packet received from a communication line and outputting data that is a result of the processing;
a second step of concatenating a plurality of pieces of data obtained in the first step to generate a data block;

a third step of DMA-transferring the data block to a data memory, from which data reading is performed by a processor that performs processing on data obtained in the first step, or writing the data block to the data memory through a processor, wherein the data memory is a dynamic random access memory (DRAM); and a fourth step of writing first information to a descriptor data structure, wherein the first information includes a plurality of beginning addresses of the plurality of pieces of data in data block, wherein each of the plurality of beginning addresses indicates a storage location, in the data memory, of a corresponding one of a respective beginning address in the data memory of each of the plurality of pieces of data in the data block, wherein the descriptor data structure is stored a data area on a predetermined memory.

13. The packet processing method according to claim 12, wherein the fourth step further comprises writing second information to the descriptor data structure, wherein the second information includes a plurality of data lengths, wherein each of the plurality of data lengths is a respective data length of a corresponding one of the plurality of pieces of data in the data block.

14. The packet processing method according to claim 12, further comprising the step of reading data from the data memory based on the first information written to the descriptor data structure and performing processing on the read data.

15. The packet processing method according to claim 12 further comprising before writing the first information, determining a respective beginning address, in the data memory, of each of the plurality of pieces of data in the data block.

16. The packet processing method according to claim 12, wherein the descriptor data structure comprises:

a plurality of first flags having a one-to-one correspondence with a plurality of beginning addresses of the plurality of pieces of data in the data block, wherein each of the plurality of first flags indicates whether a respective beginning address of the plurality of beginning addresses is valid, and wherein the packet processing method further comprises:

after performing the third step, rewriting each of the plurality of first flags to indicate that the respective beginning address of the plurality of beginning addresses is valid.

17. The packet processing method according to claim 16, wherein the descriptor data structure comprises:

a plurality of second flags having a one-to-one correspondence with the plurality of pieces of data in the data block, wherein each of the plurality of second flags indicates whether writing of a respective piece of data of the plurality of pieces of data in the data block is completed, and wherein the packet processing method further comprises:

after performing the third step, rewriting each of the plurality of second flags to indicate that writing of the respective piece of data of the plurality of pieces of data in the data block is completed.

18. The packet processing method according to claim 17, wherein rewriting each of the plurality of second flags is performed after rewriting each of the plurality of first flags.

* * * * *